United States Patent
Kaneko et al.

(10) Patent No.: US 10,834,315 B2
(45) Date of Patent: Nov. 10, 2020

(54) IMAGE TRANSFER APPARATUS AND MOVING IMAGE GENERATING SYSTEM FOR TRANSFERRING MOVING IMAGE DATA

(71) Applicant: SONY CORPORATION, Tokyo (JP)

(72) Inventors: Tetsuo Kaneko, Kanagawa (JP);
Yasuhiro Iizuka, Kanagawa (JP);
Kazuhiro Uchida, Kanagawa (JP);
Shigeo Nakatsuka, Tokyo (JP);
Masashi Wakatsuki, Tokyo (JP);
Shinnosuke Usami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/340,582

(22) PCT Filed: Oct. 2, 2017

(86) PCT No.: PCT/JP2017/035855
§ 371 (c)(1),
(2) Date: Apr. 9, 2019

(87) PCT Pub. No.: WO2018/088061
PCT Pub. Date: May 17, 2018

(65) Prior Publication Data
US 2019/0260929 A1    Aug. 22, 2019

(30) Foreign Application Priority Data
Nov. 8, 2016   (JP) .................................. 2016-217997

(51) Int. Cl.
*H04N 5/232*   (2006.01)
*H04N 21/2365*   (2011.01)
(Continued)

(52) U.S. Cl.
CPC .......... *H04N 5/23238* (2013.01); *H04N 5/04* (2013.01); *H04N 5/232* (2013.01); *H04N 5/265* (2013.01);
(Continued)

(58) Field of Classification Search
CPC ...... H04N 5/23238; H04N 5/04; H04N 5/232; H04N 21/2365
See application file for complete search history.

(56) References Cited

U.S. PATENT DOCUMENTS

| 10,389,920 B2 * | 8/2019 | Shiohara ................ G09G 5/006 |
| 2007/0013807 A1 * | 1/2007 | Kanai ................ H04N 5/23203 |
| | | 348/362 |

(Continued)

FOREIGN PATENT DOCUMENTS

| JP | 2002-209208 A | 7/2002 |
| JP | 2003-304529 A | 10/2003 |

(Continued)

OTHER PUBLICATIONS

International Search Report and Written Opinion of PCT Application No. PCT/JP2017/035855, dated Dec. 26, 2017, 10 pages of ISRWO.

*Primary Examiner* — Jamie J Atala
*Assistant Examiner* — Michael Robert Cammarata
(74) *Attorney, Agent, or Firm* — Chip Law Group

(57) ABSTRACT

An imaging apparatus having no synchronization support function by a time code and to cut down a system cost, in synchronizing respective moving images in the case of outputting and displaying moving images input from a plurality of imaging apparatuses through network transmission. A vertical synchronization signal input from a particular imaging apparatus among a plurality of imaging apparatuses is used as a reference to select frame image data (Continued)

items from moving image data input from the plurality of imaging apparatuses, and the selected frame image data items are integrated into a single stream and sent. Even in a case where the plurality of imaging apparatuses captures videos asynchronously, it becomes possible to select, from the respective moving images, frame images with a small imaging timing difference on the basis of the vertical synchronization signal of the particular imaging apparatus.

21 Claims, 24 Drawing Sheets

(51) Int. Cl.
*H04N 5/04* (2006.01)
*H04N 5/265* (2006.01)
*H04N 21/242* (2011.01)
*H04N 7/18* (2006.01)

(52) U.S. Cl.
CPC ........... *H04N 7/18* (2013.01); *H04N 21/2365* (2013.01); *H04N 21/242* (2013.01)

(56) References Cited

U.S. PATENT DOCUMENTS

| | | |
|---|---|---|
| 2011/0234800 A1 | 9/2011 | Terasaki |
| 2014/0232929 A1* | 8/2014 | Ichikawa ............. H04N 5/2355 348/362 |
| 2019/0215420 A1* | 7/2019 | Kaneko ................... H04N 5/12 |
| 2020/0014859 A1* | 1/2020 | Masuda ............... H04N 5/2353 |

FOREIGN PATENT DOCUMENTS

| | | |
|---|---|---|
| JP | 2005-333552 A | 12/2005 |
| JP | 2009-141456 A | 6/2009 |
| JP | 2011-199735 A | 10/2011 |

* cited by examiner

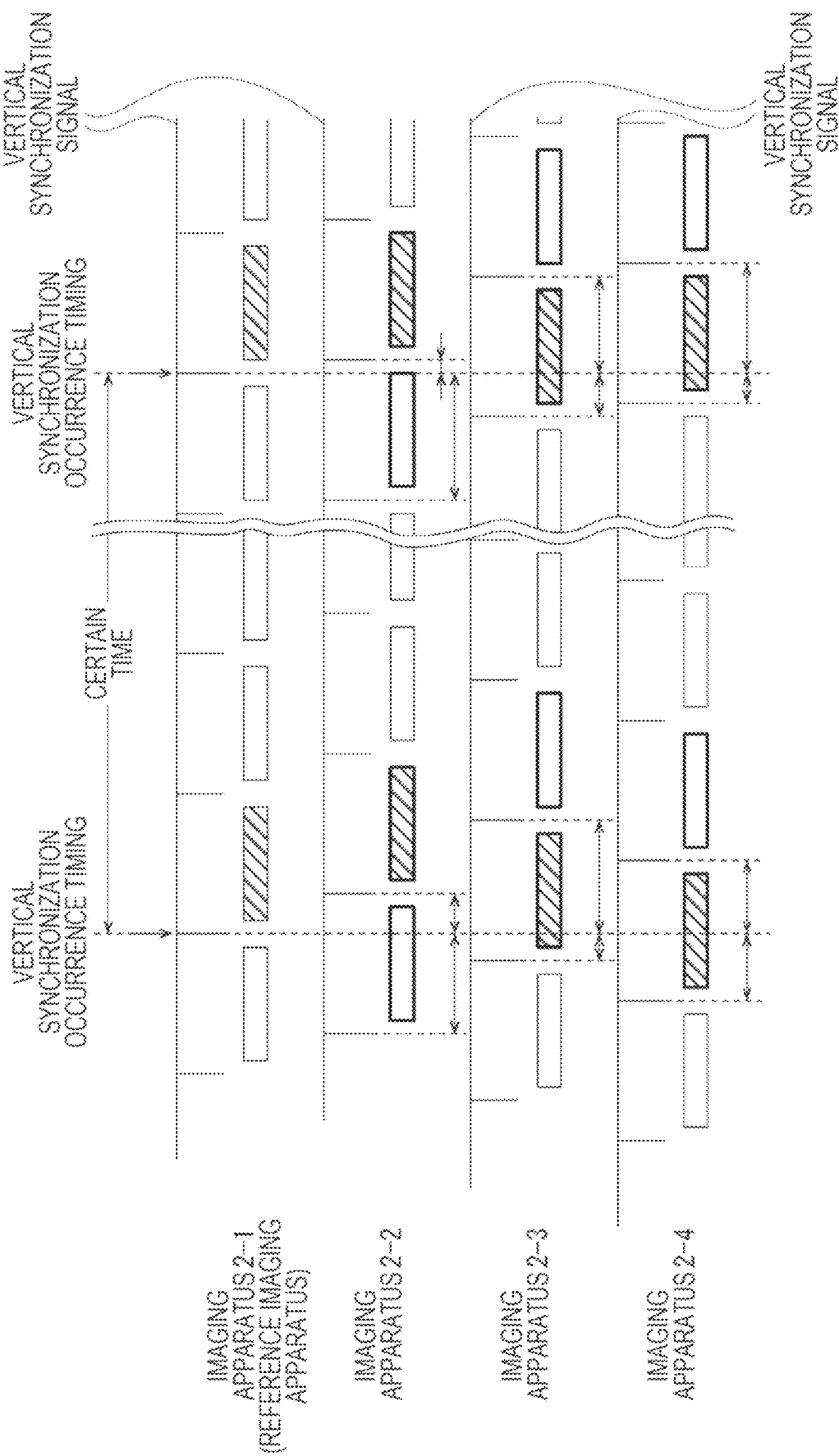

IMAGE TRANSFER APPARATUS AND MOVING IMAGE GENERATING SYSTEM FOR TRANSFERRING MOVING IMAGE DATA

CROSS REFERENCE TO RELATED APPLICATIONS

This application is a U.S. National Phase of International Patent Application No. PCT/JP2017/035855 filed on Oct. 2, 2017, which claims priority benefit of Japanese Patent Application No. JP 2016-217997 filed in the Japan Patent Office on Nov. 8, 2016. Each of the above-referenced applications is hereby incorporated herein by reference in its entirety.

TECHNICAL FIELD

The present technology relates to an image transfer apparatus, a method therefor, a program, and a moving image generating system for transferring moving image data input from a plurality of imaging apparatuses.

BACKGROUND ART

It is conceivable to perform panoramic composition of moving images input from a plurality of imaging apparatuses and to output and display the composite panorama.

Patent Document 1 below discloses a technology for achieving synchronization (frame matching) between respective moving images using a time code in the case of performing such a panoramic composite display.

CITATION LIST

Patent Document

Patent Document 1: Japanese Patent Application Laid-Open No. 2002-209208

SUMMARY OF THE INVENTION

Problems to be Solved by the Invention

However, an imaging apparatus having a synchronization support function by the time code, generator lock (GenLock), or the like is generally expensive.

Furthermore, when the aforementioned panoramic composite display is performed, the conceivable configuration is to transmit moving images input from a plurality of imaging apparatuses to a display side by way of a network; at this time, however, if moving images from respective imaging apparatus are each transmitted in an independent stream, the transmission speed of each moving image varies depending on communication traffic and accordingly it is difficult to achieve the synchronization between the respective moving images.

The present technology has been made in view of the above circumstances and it is an object of the present technology to make it possible to use an inexpensive imaging apparatus having no synchronization support function by a time code or the like, and to cut down a system cost, in synchronizing respective moving images in the case of outputting and displaying moving images input from a plurality of imaging apparatuses through network transmission.

Solutions to Problems

An image transfer apparatus according to the present technology includes: a frame selecting unit that uses a vertical synchronization signal input from a particular imaging apparatus among a plurality of imaging apparatuses that capture moving images as a reference to select frame image data items from moving image data input from the plurality of imaging apparatuses; and an integrating and sending unit that integrates the frame image data items selected by the frame selecting unit into a single stream and sending the integrated single stream.

With this configuration, even in a case where the plurality of imaging apparatuses captures videos asynchronously, it becomes possible to select, from the respective moving images, frame images with a small imaging timing difference on the basis of the vertical synchronization signal of the particular imaging apparatus.

Furthermore, since a plurality of images is integrated into a single stream and sent, synchronization between the respective images will not become difficult as in the case of parallel transmission in individual streams.

In the above-described image transfer apparatus according to the present technology, it is preferable that the frame selecting unit select one of the frame image data items from the moving image data of another imaging apparatus among the imaging apparatuses excluding the particular imaging apparatus, on the basis of an exposure start timing difference with respect to reference frame image data, which is one of the frame image data items selected from the moving image data of the particular imaging apparatus.

This makes it possible to select a frame image data item whose exposure start timing is proximate to the exposure start timing of the reference frame image data, as the frame image data item of the imaging apparatus other than the particular imaging apparatus.

In the above-described image transfer apparatus according to the present technology, it is preferable that the frame selecting unit select a frame image data item whose exposure start timing is closer to the exposure start timing of the reference frame image data, from among two frame image data items of the moving image data of the another imaging apparatus, of which frame periods overlap with the frame period of the reference frame image data.

With this process, a frame image whose imaging timing is closest to the imaging timing of the frame image of the reference imaging apparatus is selected.

In the above-described image transfer apparatus according to the present technology, it is preferable that the frame selecting unit determine whether or not an exposure start timing difference with respect to the reference frame image data is less than a half frame period, for one frame image data item among the two frame image data items of which the frame periods overlap with the frame period of the reference frame image data, select the one frame image data item when the exposure start timing difference is less than the half frame period, and select the other frame image data item when the exposure start timing difference is not less than the half frame period.

This eliminates the need to measure the exposure start timing difference with respect to the reference frame image for the other frame image data item out of the two frame image data items to be selected.

In the above-described image transfer apparatus according to the present technology, it is preferable that the frame selecting unit select one of the frame image data items from the moving image data of another imaging apparatus among the imaging apparatuses excluding the particular imaging apparatus, on the basis of a timing difference between an exposure end timing of reference frame image data, which is one of the frame image data items selected from the moving image data of the particular imaging apparatus, and an exposure start timing of the one of the frame image data items of the moving image data of the another imaging apparatus.

This makes it possible to select a frame image data item whose exposure start timing is proximate to the exposure end timing of the reference frame image data, as the frame image data item of another imaging apparatus.

In the above-described image transfer apparatus according to the present technology, it is preferable that the frame selecting unit perform the selection for each frame of the moving image data of the particular imaging apparatus.

With this configuration, a frame matching process is performed for each frame.

In the above-described image transfer apparatus according to the present technology, it is preferable that the frame selecting unit perform the selection at a time interval longer than one frame period of the moving image data of the particular imaging apparatus.

With this configuration, the number of times of a frame matching process is decreased.

In the above-described image transfer apparatus according to the present technology, it is preferable that the frame selecting unit have a switching function for the particular imaging apparatus.

This makes it possible to switch the particular imaging apparatus that does not cause skipping or repeating of the frame image due to the frame matching process to any imaging apparatus among the plurality of imaging apparatuses.

In the above-described image transfer apparatus according to the present technology, it is preferable that the frame selecting unit switch the particular imaging apparatus on the basis of operation input information.

This enables a user to arbitrarily switch the particular imaging apparatus.

In the above-described image transfer apparatus according to the present technology, it is preferable that the frame selecting unit switch the particular imaging apparatus on the basis of an amount of motion in the moving image data input from each of the imaging apparatuses.

This makes it possible to automatically switch an imaging apparatus imaging a subject with a high probability of being watched by an observer to the particular imaging apparatus.

In the above-described image transfer apparatus according to the present technology, it is preferable that the frame selecting unit output the vertical synchronization signal of the particular imaging apparatus to the integrating and sending unit as a reference vertical synchronization signal, and, when switching the particular imaging apparatus, switch the vertical synchronization signal to be output as the reference vertical synchronization signal such that a vertical synchronization occurrence timing immediately after the switching by the vertical synchronization signal of an imaging apparatus as a switching source is not mixed as the vertical synchronization occurrence timing represented by the reference vertical synchronization signal.

If the above mixing is permitted, there is a probability that the vertical synchronization occurrence timing will be repeated in a relatively short time in the reference vertical synchronization signal. If the vertical synchronization occurrence timing is repeated as mentioned above, malfunction may be caused in a post-stage process after frame selection, such as an integration process by the integrating and sending unit.

Therefore, by avoiding the above mixing from being caused, prevention of the occurrence of system malfunction is achieved.

In the above-described image transfer apparatus according to the present technology, it is preferable that the integrating and sending unit integrate the frame image data items selected by the frame selecting unit into one piece of image data to send.

This makes it possible to integrate, for example, four frame image data items of full high definition (HD) image size into one piece of image data of 4K image size, such that a codec compatible with a special image size can be made unnecessary.

In the above-described image transfer apparatus according to the present technology, it is preferable that the integrating and sending unit integrate the frame image data items selected by the frame selecting unit in a time axis direction to send.

This makes it possible to make a codec compatible with a special image size unnecessary.

In the above-described image transfer apparatus according to the present technology, it is preferable that the integrating and sending unit add delimiter information representing a delimiter per unit of integration of the frame image data items to stream data as the single stream.

If the delimiter information is not added, a process of discriminating each image constituting one unit of integration is expected on a receiving side of one piece of stream data, for example, by image decomposition, or the like; however, such a process is no longer necessary.

Furthermore, an image transfer method according to the present technology is an image transfer method in which an information processing apparatus executes: a frame selecting step of using a vertical synchronization signal input from a particular imaging apparatus among a plurality of imaging apparatuses that capture moving images as a reference to select frame image data items from moving image data input from the plurality of imaging apparatuses; and an integrating and sending step of integrating the frame image data items selected in the frame selecting step into a single stream and sending the integrated single stream.

Also with the above-described image transfer method according to the present technology, an action similar to the action of the above-described image transfer apparatus according to the present technology can be obtained.

Moreover, a program according to the present technology is a program that causes an information processing apparatus to execute a process executed as the above-described image transfer method.

The above-described image transfer apparatus is implemented by such a program.

Furthermore, a moving image generating system according to the present technology includes: a frame selecting unit that uses a vertical synchronization signal input from a particular imaging apparatus among a plurality of imaging apparatuses that capture moving images as a reference to select frame image data items from moving image data input from the plurality of imaging apparatuses; an integrating and sending unit that integrates the frame image data items selected by the frame selecting unit into a single stream and sending the integrated single stream; and a moving image generating unit that generates moving image data including, as a frame image, the frame image data items included in the single stream sent by the integrating and sending unit.

Also with such a moving image generating system, an action similar to the action of the above-described image transfer apparatus according to the present technology can be obtained.

Effects of the Invention

According to the present technology, it becomes possible to use an inexpensive imaging apparatus having no synchronization support function by a time code or the like, and to cut down a system cost, in synchronizing respective moving images in the case of outputting and displaying moving images input from a plurality of imaging apparatuses through network transmission.

Note that the effects described herein are not necessarily limited and any effects described in the present disclosure may be applied.

BRIEF DESCRIPTION OF DRAWINGS

FIG. 16 is an explanatory diagram of a frame matching technique as a first modification.

MODE FOR CARRYING OUT THE INVENTION

Hereinafter, embodiments will be described in the following order with reference to the accompanying drawings.
<1. System Summary>
<2. Apparatus Configuration>
<3. Frame Matching Technique as Embodiment>
<4. Processing Procedure>
<5. About Image Reading Process at Composite Video Generation>
<6. Various Modifications>
[6-1. First Modification]
[6-2. Second Modification]
[6-3. Third Modification]
[6-4. Fourth Modification]
[6-5. Other Modifications]
<7. Summary of Embodiments>
<8. Application Examples>
[8-1. First Application Example]
[8-2. Second Application Example]
<9. Program>
<10. Present Technology>

1. SYSTEM SUMMARY

Figure 1:
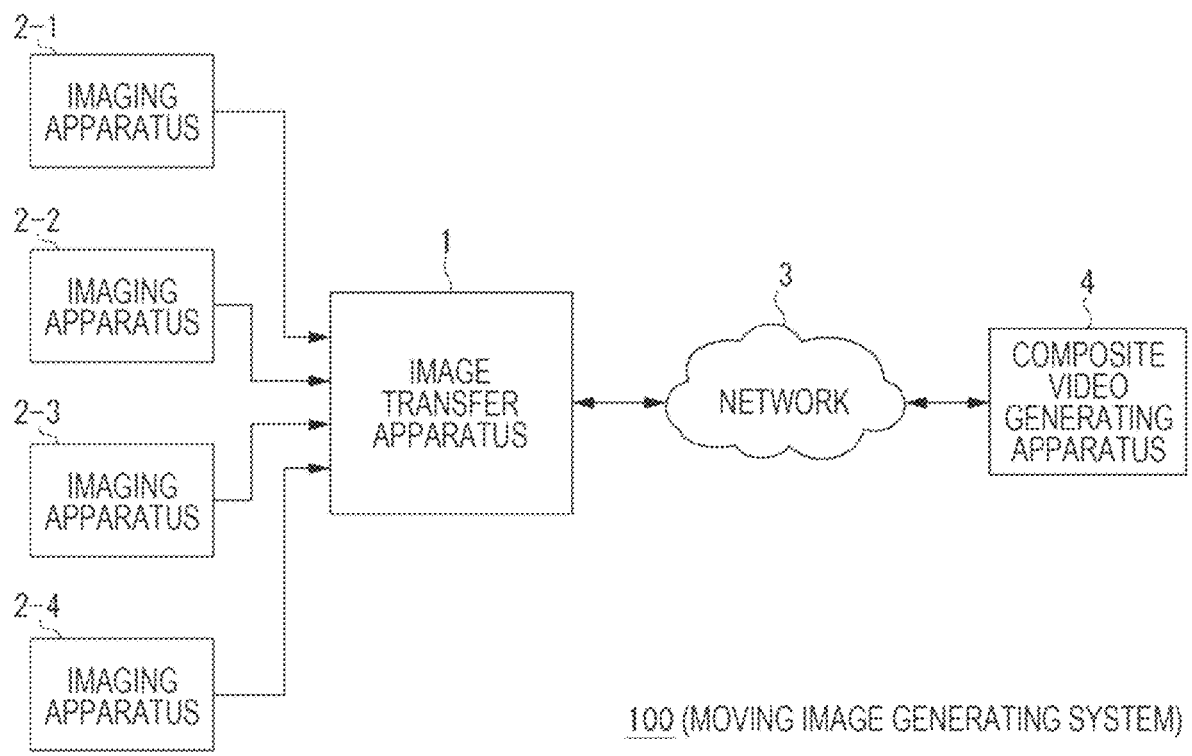
FIG. 1 is a block diagram for explaining a summary of a composite video generating system as an embodiment according to the present technology.

FIG. 1 is a block diagram illustrating a summary of the configuration of a moving image generating system 100 as an embodiment according to the present technology.

As illustrated in FIG. 1, the moving image generating system 100 includes a plurality of imaging apparatuses 2 that generate captured image data as a moving image, an image transfer apparatus 1 to which captured moving image data (hereinafter simply referred to as "moving image data") is input from the plurality of imaging apparatuses 2, a network 3 formed as, for example, the Internet, a local area network (LAN), or the like, and a composite video generating apparatus 4 enabled to communicate with the image transfer apparatus 1 via the network 3.

The moving image generating system 100 of the present example includes four imaging apparatuses 2-1, 2-2, 2-3, and 2-4 as the imaging apparatuses 2.

In the moving image generating system 100 of the present embodiment, the image transfer apparatus 1 transfers the moving image data input from the imaging apparatuses 2-1, 2-2, 2-3, and 2-4 to the composite video generating apparatus 4 via the network 3 and the composite video generating apparatus 4 generates panoramic moving image data obtained by panoramic composition of respective pieces of the transferred moving image data.

Figure 2:
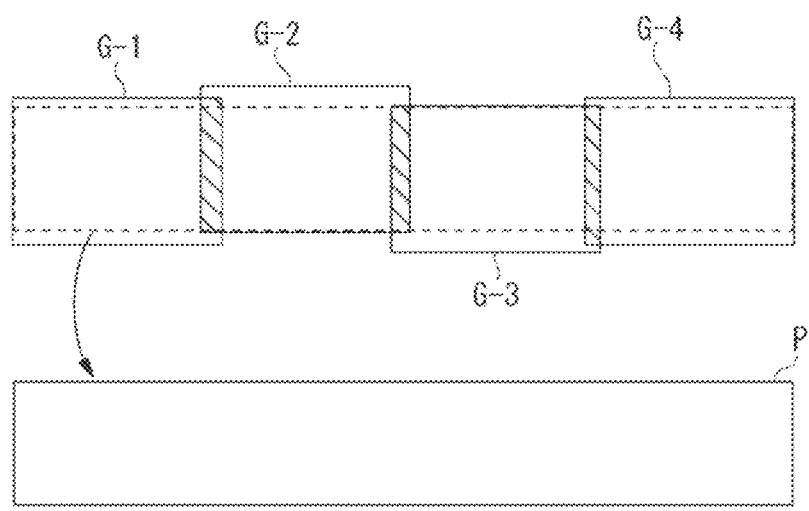
FIG. 2 is an explanatory diagram of panoramic composition.

FIG. 2 is an explanatory diagram of panoramic composition.

In FIG. 2, frame image data items G included in the moving image data of the imaging apparatuses 2-1, 2-2, 2-3, and 2-4 are indicated as frame image data items G-1, G-2, G-3, and G-4, respectively, by each appending identical final numerical values.

In the present example, the imaging apparatuses 2 are arranged in a line in a horizontal direction; specifically, the imaging apparatus 2-1 is arranged on the leftmost side and subsequently the imaging apparatuses 2-2, 2-3, and 2-4 are arrayed in this order toward the right side. Note that the left and right here mean left and right in a state facing a subject.

In a panoramic composition process by the composite video generating apparatus 4, stitching processes are carried out on respective overlapping portions produced between the frame image data items G-1 and G-2, the frame image data items G-2 and G-3, and the frame image data items G-3 and G-4, which are represented by shaded portions in FIG. 2, and a part of the entire images coupled by these stitching processes is cut out as panoramic image data P.

The composite video generating apparatus 4 generates such panoramic image data P for every frame of the moving image data and generates moving image data including each piece of the panoramic image data P as a frame image (hereinafter referred to as "panoramic video data M").

Note that FIG. 2 illustrates an example of a case where shifts are caused in arrangement positions of the imaging apparatuses 2 in an up-down direction; however, it is of course possible to arrange the imaging apparatuses 2 such that the positions thereof in the up-down direction are aligned. In that case, cutting out from the entire images after the stitching can be made unnecessary.

Here, in a case where it is premised that the moving image data is transferred by way of the network 3 as described above, the transfer speed of each stream varies depending on communication traffic in a case where the moving image data from each imaging apparatus 2 is separately transferred in an independent stream. In the present example, since it is premised that an imaging apparatus not having a synchronization support function by generator lock (GenLock), a time code, or the like is used as each imaging apparatus 2, in a case where the transfer speed of each stream varies as described above, it is difficult to achieve frame synchronization in generating a panoramic video.

Therefore, the image transfer apparatus 1 aggregates the moving image data input from respective imaging apparatuses 2 into one stream and transfers the aggregated one stream to the composite video generating apparatus 4.

Figure 3:
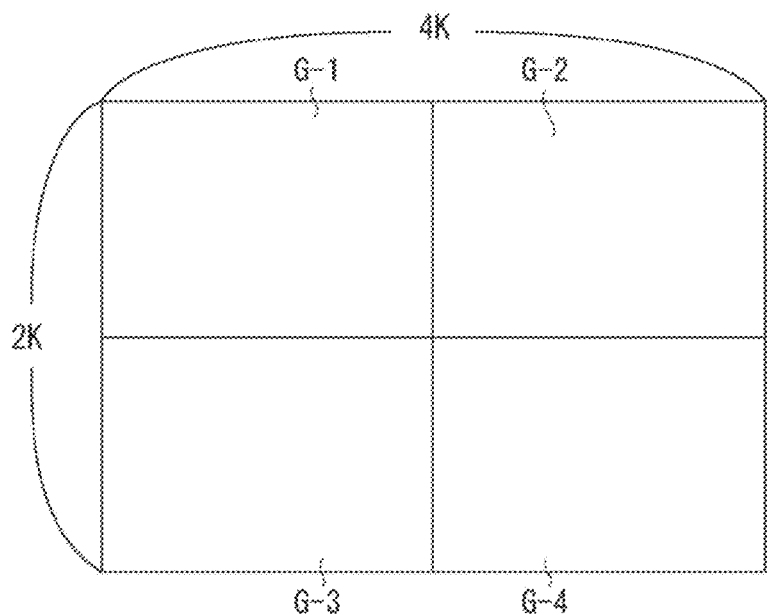
FIG. 3 is a diagram illustrating an example of integration of frame image data items.

Specifically, in the present example, the respective frame image data items G-1, G-2, G-3, and G-4 selected from respective pieces of the moving image data are merged as one piece of image data as illustrated in FIG. 3, and the moving image data including this merged image data as a frame image is transferred to the composite video generating apparatus 4. In this case, the frame image data items G are merged by arraying four frame images in a square lattice shape as illustrated in FIG. 3.

Here, in the present example, the image size of the moving image data from each imaging apparatus 2 is assumed as a full high definition (HD) size (the number of effective pixels in the horizontal direction and vertical direction are 1920 and 1080, respectively). Accordingly, as illustrated in FIG. 3, one piece of image data merged into a square lattice shape is formed as image data with a so-called 4K (4K2K) image size. That is, in the present example, 4K video stream data is generated as one piece of video stream data obtained by aggregating the moving image data input from each imaging apparatus 2, and transferred to the composite video generating apparatus 4.

By generating and transferring the 4K video stream data in this manner, the need to have an encoder and a decoder compatible with a special image size is eliminated on both sides of the image transfer apparatus 1 and the composite video generating apparatus 4.

In the moving image generating system 100 of the present example, the composite video generating apparatus 4 successively performs the panoramic composition process as described with reference to FIG. 2 on the frame image data items G (G-1 to G-4) from each imaging apparatus 2 included in the moving image data transferred in one stream as mentioned above and generates the panoramic moving image data including the panoramic image data P successively obtained by the above panoramic composition process, as a frame image.

Note that, in the case of employing a technique of merging the frame image data items G-1 to G-4 to aggregate into moving image data of one stream as in FIG. 3, a combination of imaging timings of images displayed as one frame image of the panoramic video data M is resolved depending on which frame image data item G on the time axis is selected from each piece of the moving image data, as an image to be merged. In other words, the selection significantly affects frame synchronization in the panoramic video data M.

The image transfer apparatus 1 achieves frame synchronization in the panoramic video data M by a selection process for the frame image data item G to be merged as described above, which will be described later in another section.

2. APPARATUS CONFIGURATION

Subsequently, the configuration of the imaging apparatus 2, the image transfer apparatus 1, and the composite video generating apparatus 4 included in the moving image generating system 100 will be described.

Figure 4:
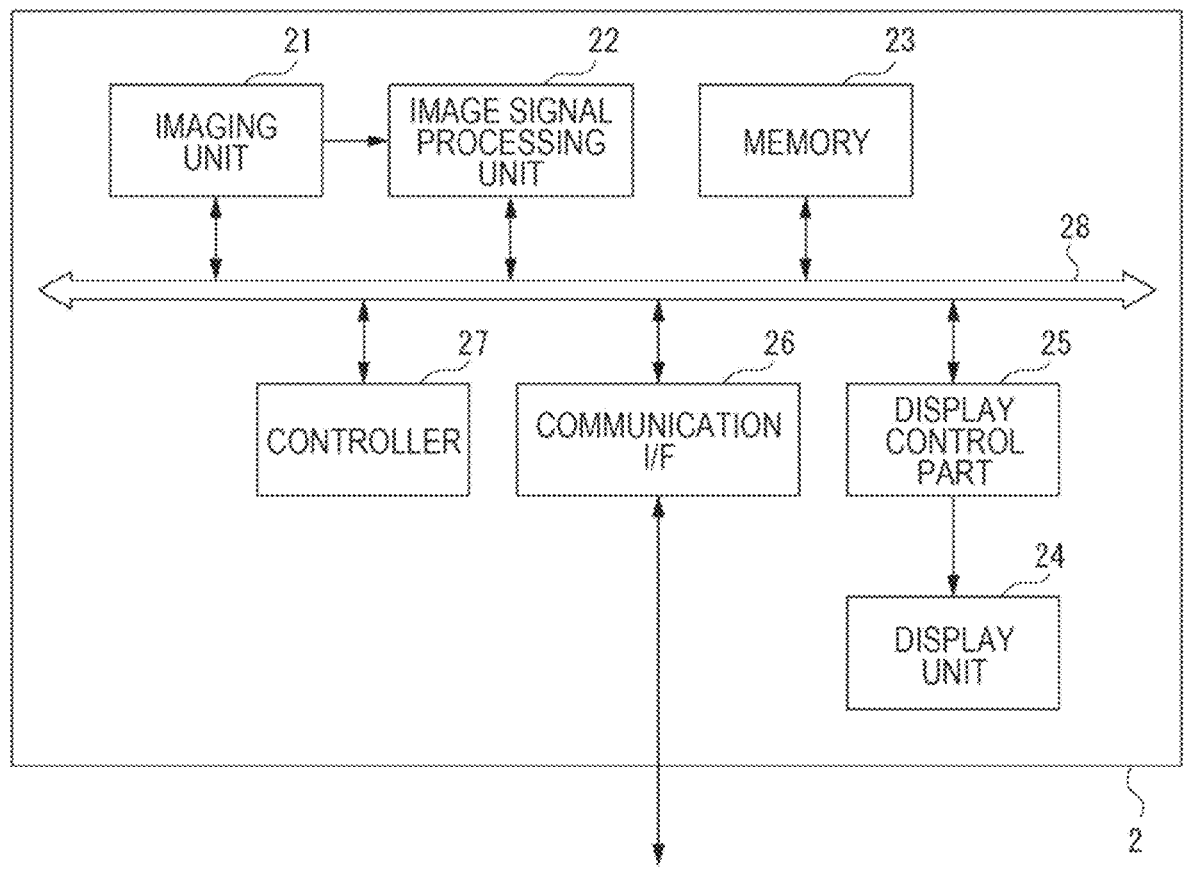
FIG. 4 is a block diagram illustrating an internal configuration of an imaging apparatus as an embodiment.

FIG. 4 is a block diagram illustrating an internal configuration of the imaging apparatus 2.

The imaging apparatus 2 includes an imaging unit 21, an image signal processing unit 22, a memory 23, a display unit 24, a display control part 25, a communication interface (I/F) 26, a controller 27, and a bus 28. The imaging unit 21, the image signal processing unit 22, the memory 23, the display control part 25, the communication I/F (interface) 26, and the controller 27 are connected to each other via the bus 28 so as to enable data communication.

The imaging unit 21 includes an imaging lens, an imaging element, a sampling circuit (reading circuit) that samples accumulated charges of the imaging element, and an analog-to digital (A/D) converter, and obtains a captured image signal as a digital signal.

In the present example, a charge coupled device (CCD) is used for the imaging element and an exposure time (the time from an exposure start timing to an exposure end timing) can be changed as a so-called electronic shutter function. The exposure time of the imaging element is changed on the basis of an instruction from the controller 27.

Here, the imaging unit 21 works on the basis of a vertical synchronization signal and a horizontal synchronization signal generated by a timing generating circuit (not illustrated) on the basis of a system clock. In the present example, a vertical synchronization occurrence cycle by the vertical synchronization signal, in other words, a frame cycle of the moving image data is assumed as approximately 60 frames per second (fps).

The image signal processing unit 22 carries out various image signal processes on the captured image signal as a digital signal obtained by the imaging unit 21 and also generates moving image data in a predetermined data format.

The memory 23 is, for example, a storage apparatus such as a dynamic random access memory (DRAM) and is used, for example, as a frame memory or the like at the time of generation of the moving image data by the image signal processing unit 22.

The display unit 24 is, for example, a display device such as a liquid crystal display (LCD) or an organic electro luminescence (EL) display and displays various types of information under the control of the display control part 25. It is possible to display, for example, moving image data generated by the image signal processing unit 22 in real time via the display unit 24, as a so-called through image.

The communication I/F 26 is a communication interface for transmitting the moving image data to an external apparatus and, in the present example, an interface of the high-definition multimedia interface (HDMI) is adopted.

The controller 27 has a configuration including a microcomputer having a central processing unit (CPU), a read only memory (ROM), a random access memory (RAM), and the like and performs overall control of the imaging apparatus 2. For example, the controller 27 controls the exposure timing of the imaging element in the imaging unit 21 by an exposure timing control signal generated on the basis of the vertical synchronization signal.

Furthermore, the controller 27 also controls, for example, communication of the moving image data via the communication I/F 26.

Figure 5:
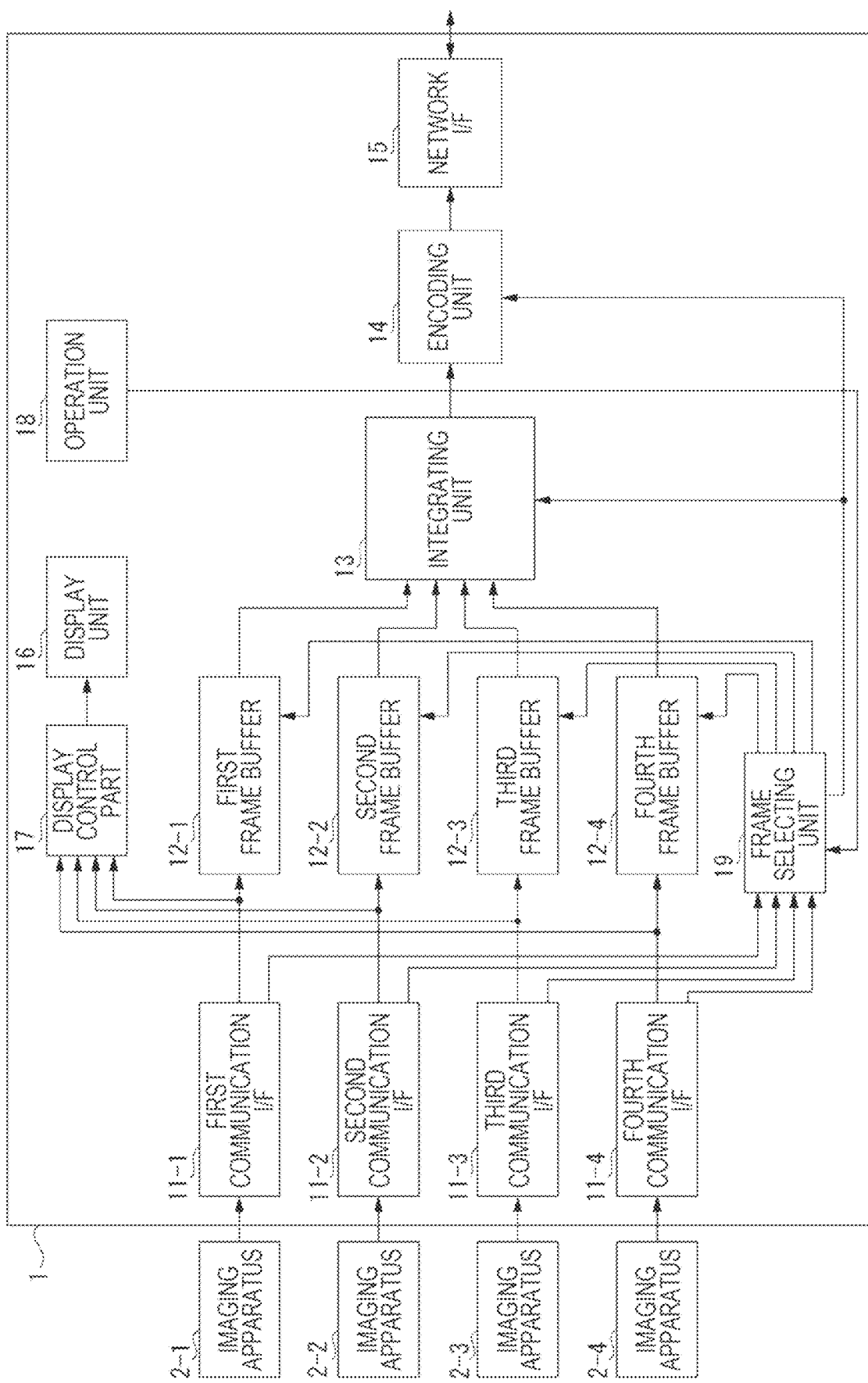
FIG. 5 is a block diagram illustrating an internal configuration of an image transfer apparatus as an embodiment.

FIG. 5 is a block diagram illustrating an internal configuration of the image transfer apparatus 1. Note that, in FIG. 5, the imaging apparatuses 2-1 to 2-4 are also illustrated together.

As communication I/Fs 11, which are communication interfaces for receiving moving image data from an external apparatus, the image transfer apparatus 1 includes four communication I/Fs corresponding to the respective imaging apparatuses 2, namely, a first communication I/F 11-1, a second communication I/F 11-2, a third communication I/F 11-3, and a fourth communication I/F 11-4. An HDMI interface is adopted as each communication I/F 11 in correspondence to the communication I/F 26 in the imaging apparatus 2.

As illustrated in FIG. 5, the moving image data from the imaging apparatus 2-1 is received by the first communication I/F 11-1, the moving image data from the imaging apparatus 2-2 is received by the second communication I/F 11-2, the moving image data from the imaging apparatus 2-3 is received by the third communication I/F 11-3, and the moving image data from the imaging apparatus 2-4 is received by the fourth communication I/F 11-4.

The frame image data item G (G-1) of the moving image data received by the first communication I/F 11-1 is buffered in a first frame buffer 12-1. Similarly, the frame image data item G (G-2) of the moving image data received by the second communication I/F 11-2 is buffered in a second frame buffer 12-2, the frame image data item G (G-3) of the moving image data received by the third communication I/F 11-3 is buffered in a third frame buffer 12-3, and the frame image data item G (G-4) of the moving image data received by the fourth communication I/F 11-4 is buffered in a fourth frame buffer 12-4.

Furthermore, the vertical synchronization signal extracted from the moving image data is output from each communication I/F 11 and these output vertical synchronization signals are input to a frame selecting unit 19.

Here, buffering of the frame image data items G by the frame buffers 12 will be described with reference to FIGS. 6 and 7.

Each frame buffer 12 is a ring buffer and has a plurality of buffer areas capable of buffering the frame image data item G. In the present example, each frame buffer 12 has four buffer areas made up of buffer areas 12a to 12d as illustrated in FIG. 6.

Figure 6:
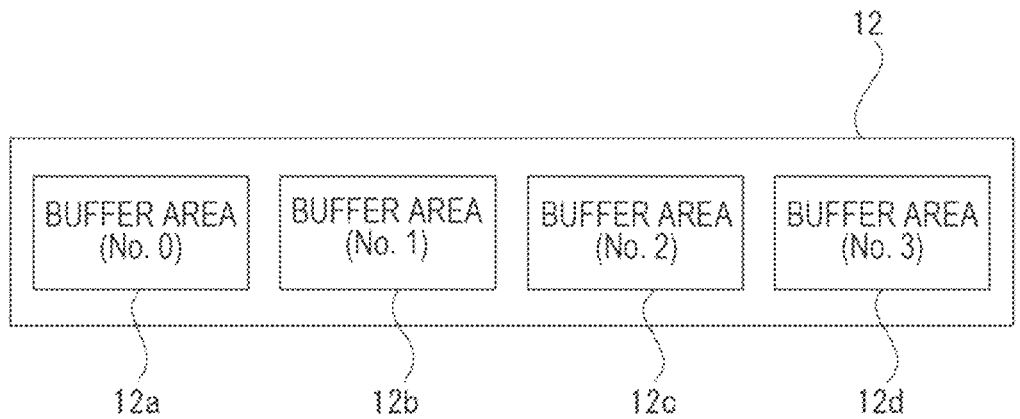
FIG. 6 is a diagram illustrating a configuration example of frame buffers.

Hereinafter, buffer area numbers (Nos.) for identifying the individual buffer areas 12a to 12d are defined as the buffer area 12a=No. 0, the buffer area 12b=No. 1, the buffer area 12c=No. 2, and the buffer area 12d=No. 3, as illustrated in FIG. 6.

In the present example, the frame selecting unit 19 controls writing and reading of the frame image data item G in each frame buffer 12.

Figure 7:
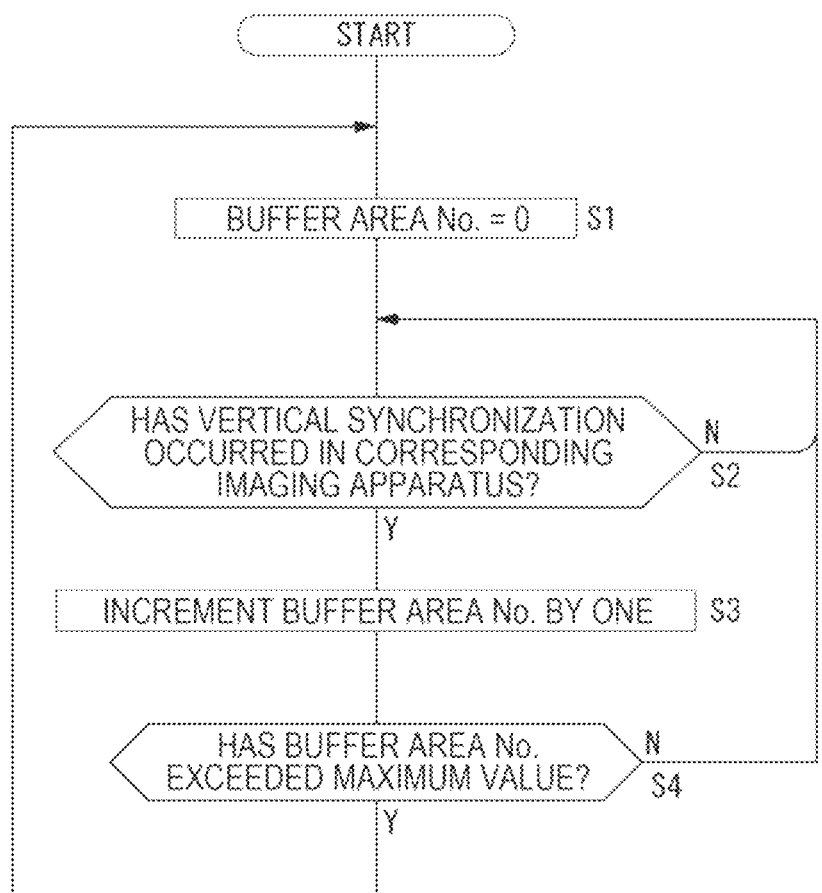
FIG. 7 is a flowchart diagram illustrating a processing procedure for implementing ring buffer control.

A flowchart in FIG. 7 illustrates a process executed by the frame selecting unit 19 to implement writing to such a ring buffer. Note that the frame selecting unit 19 performs the process illustrated in FIG. 7 concurrently for each frame buffer (that is, for each imaging apparatus 2).

First, in step S1, the frame selecting unit 19 sets the buffer area number to "0". In response to confirming the occurrence of the vertical synchronization in the corresponding imaging apparatus 2 in following step S2, the frame selecting unit 19 increments the buffer area number by one (+1) in step S3. Then, in response to performing the above increment process, the frame selecting unit 19 determines whether or not the buffer area number has exceeded a maximum value ("3" in the present example because of the number of buffer areas=4) in step S4. If the buffer area number has not exceeded the maximum value, the process returns to step S2 and the buffer number is incremented by one in response to the occurrence of the vertical synchronization in the corresponding imaging apparatus 2. In a case where the buffer area number has exceeded the maximum value, the process returns to step S1 and the buffer area number is returned to "0".

As described above, the frame selecting unit 19 controls writing of the frame image data item G to each frame buffer 12 in accordance with the buffer area number sequentially updated for each imaging apparatus 2 in response to the occurrence of the vertical synchronization, whereby each frame buffer 12 works as a ring buffer.

In FIG. 5, on the basis of the vertical synchronization signal input from each communication I/F 11, the frame selecting unit 19 selects the frame image data item G to be buffered in one of the buffer areas for each frame buffer 12 and controls such that the selected frame image data item G is read from each frame buffer 12 to an integrating unit 13.

The frame selecting unit 19 performs such a selection process for the frame image data item G in each frame period of the moving image data input from a particular imaging apparatus (a reference imaging apparatus described later) among the imaging apparatuses 2, of which details will be described later in another section.

Furthermore, on the basis of the vertical synchronization signal input from each communication I/F 11, the frame selecting unit 19 of the present example generates a vertical synchronization signal to be used as a reference for the integrating unit 13 and an encoding unit 14 described below to work (hereinafter referred to as "reference vertical synchronization signal"), which will also be described later in another section.

The integrating unit 13 integrates the frame image data item G read from each frame buffer 12 into a single stream. Specifically, the integrating unit 13 of the present example successively performs a process of merging the frame image data items G (G-1 to G-4) successively read from each frame buffer 12 into a square lattice shape as illustrated in FIG. 3.

The encoding unit 14 accepts an input of the image data successively obtained by the above merging process of the integrating unit 13 and generates compressed moving image data including these pieces of the image data as a frame image. Note that, for example, the H.264 format, H.265 format, or the like, can be cited as the compression format of the encoding unit 14.

The compressed moving image data obtained by the encoding unit 14 is output to a network I/F 15.

Note that the compressed moving image data obtained by the encoding unit 14 includes an image obtained by integrating the frame image data items G-1 to G-4 from the respective imaging apparatuses 2 as a frame image and thus is hereinafter referred to as "integrated video data U" according to the above meaning.

The network I/F 15 is an interface for performing data communication with an external apparatus via the network 3. The network I/F 15 enables the transmission of the integrated video data U obtained by the encoding unit 14 to the composite video generating apparatus 4 by way of the network 3.

Furthermore, the image transfer apparatus 1 of the present example includes a display unit 16, a display control part 17, and an operation unit 18.

The display control part 17 accepts branched inputs of respective pieces of moving image data output from each communication I/F 11 to each corresponding frame buffer 12 and displays a moving image based on the respective pieces of the input moving image data on the display unit 16.

The operation unit 18 includes an operator for a user to perform an operation input to the image transfer apparatus 1. The operation unit 18 outputs operation input information based on the operation input by the user to the frame selecting unit 19.

In the present example, the operation unit 18 has a touch panel sensor formed on a display screen of the display unit 16.

Note that a process performed by the frame selecting unit 19 on the basis of the operation input information from the operation unit 18 will also be described afterwards in another section.

Figure 8:
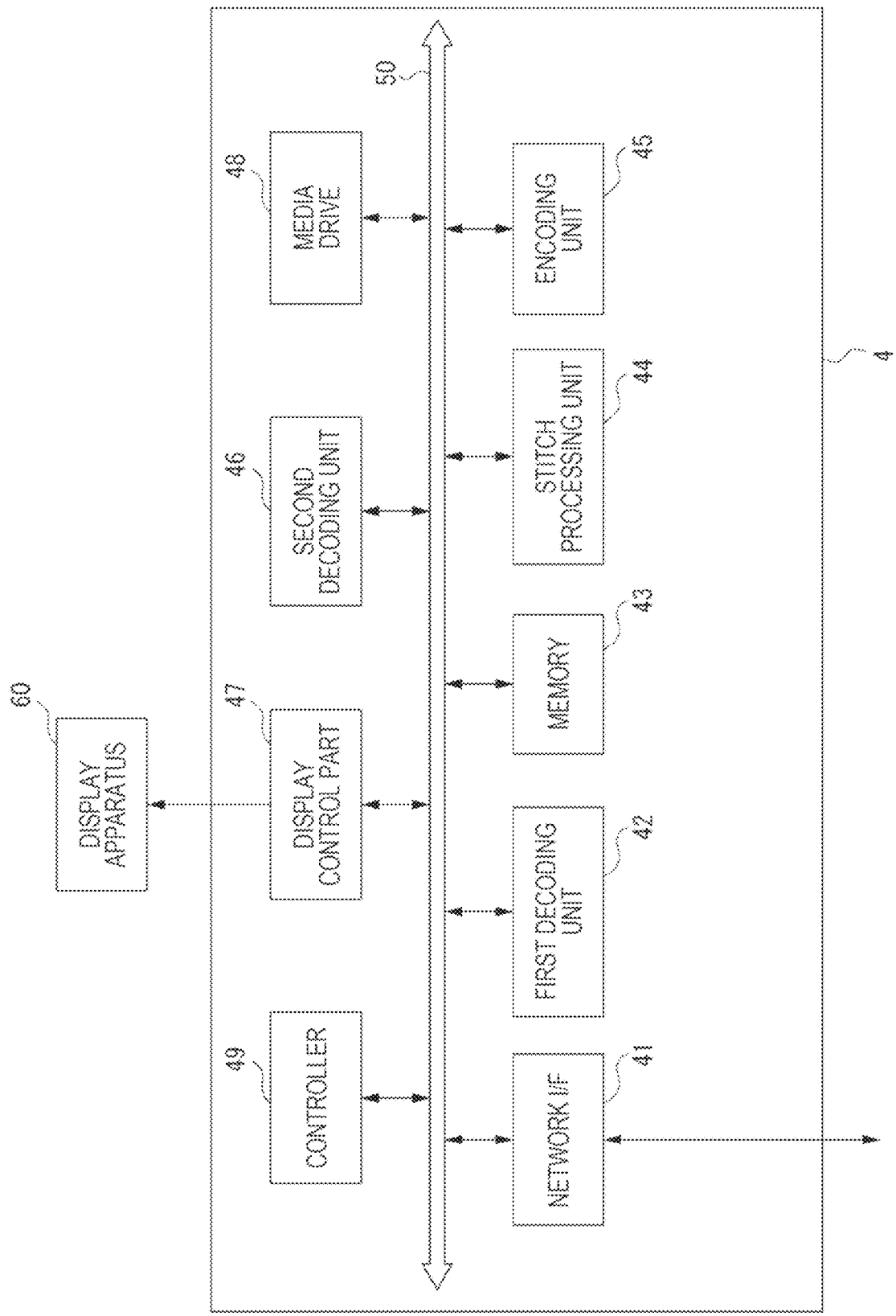
FIG. 8 is a block diagram illustrating an internal configuration of a composite video generating apparatus as an embodiment.

FIG. 8 is a block diagram illustrating an internal configuration of the composite video generating apparatus 4.

The composite video generating apparatus 4 includes a network I/F 41, a first decoding unit 42, a memory 43, a stitch processing unit 44, an encoding unit 45, a display control part 47, a second decoding unit 46, a media drive 48, a controller 49, and a bus 50 that connects these respective units to each other so as to enable data communication.

The network I/F 41 is an interface for performing data communication with an external apparatus via the network 3 and is capable of receiving the integrated video data U sent by the network I/F 15 of the image transfer apparatus 1 by way of the network 3.

The first decoding unit 42 performs a decoding process (expansion process) on the integrated video data U. In other words, the decoding process is performed on the moving image data compressed by the encoding unit 14 in the image transfer apparatus 1, for example, in the H.264 format or H.265 format.

The memory 43 is, for example, a storage apparatus such as a DRAM and is used for temporarily storing various types of data.

The stitch processing unit 44 performs a stitching process for generating the panoramic image data P.

The encoding unit 45 generates the compressed moving image data including the panoramic image data P generated through the stitching process of the stitch processing unit 44 as a frame image, that is, the above-described panoramic video data M.

The second decoding unit 46 is a decoding unit compatible with the video compression format by the encoding unit 45 and performs a decoding process on the compressed moving image data as the panoramic video data M.

The display control part 47 performs display control for a display apparatus 60 connected to the composite video generating apparatus 4.

The media drive 48 performs writing and reading to and from various recording media such as a magnetic disk, an optical disc, a magneto-optical disk, a semiconductor memory, or the like.

The controller 49 has a configuration including a microcomputer having, for example, a CPU, a ROM, a RAM, and the like, and performs overall control of the composite video generating apparatus 4.

In particular, the controller 49 controls the generation of the panoramic video data M based on the moving image data received from the image transfer apparatus 1 and decoded by the first decoding unit 42. Specifically, the controller 49 causes the stitch processing unit 44 to execute the stitching process described with reference to FIG. 2 above on each frame image data item included in the moving image data decoded by the first decoding unit 42, in other words, in the present example, each frame image data item obtained by merging the frame image data items G-1 to G-4 in a square lattice shape as illustrated in FIG. 3, and to successively generate the panoramic image data P. Following the above process, the controller 49 causes the encoding unit 45 to generate the panoramic video data M including the panoramic image data P successively obtained by the above stitching process, as a frame image.

Furthermore, as a display process for the panoramic video data M, the controller 49 causes the display control part 47 to execute display control for displaying the moving image based on the panoramic video data M generated as described above on the display apparatus 60.

With this process, a panoramic moving image obtained by panoramic composition of the moving images captured by the respective imaging apparatuses 2 is output to and displayed on the display apparatus 60.

Note that, in the above description, an example in which a display means for the panoramic moving image is externally attached to the composite video generating apparatus 4 has been cited; however, it is also possible for the composite video generating apparatus 4 to have a configuration including a display means for the panoramic moving image.

Furthermore, the controller 49 can cause the media drive 48 to record the panoramic video data M generated by the encoding unit 45 in a required recording medium.

3. FRAME MATCHING TECHNIQUE AS EMBODIMENT

The image transfer apparatus 1 as an embodiment selects the frame image data item G to be merged in the integrating unit 13 to achieve frame synchronization between the images from the respective imaging apparatuses 2 in the panoramic video data M.

Figure 9:
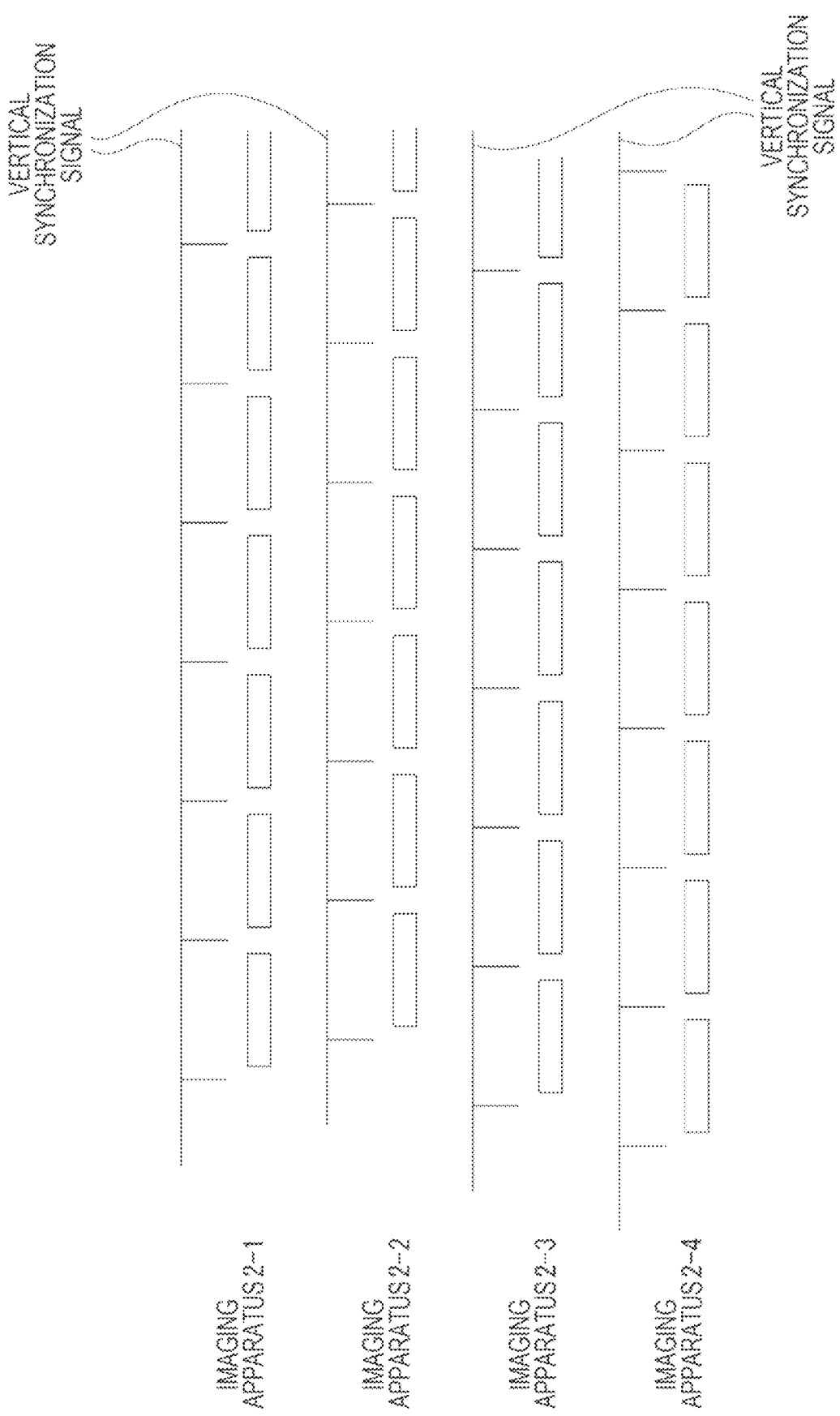
FIG. 9 is a diagram schematically representing a relationship on a time axis between vertical synchronization signals in moving image data from imaging apparatuses and respective frame images.

FIG. 9 schematically represents a relationship on the time axis between the vertical synchronization signals in the moving image data from the respective imaging apparatuses 2 and respective frame images.

In starting the generation of the panoramic moving image, the imaging work of each imaging apparatus 2 is first started; however, the imaging start timings at this time do not necessarily coincide with each other. Furthermore, because of clock errors or the like between the respective imaging apparatuses 2, a temporal difference is produced in vertical synchronization occurrence timings in the respective imaging apparatuses 2.

For this reason, the frame selecting unit 19 performs a frame selection process to ensure that the frame image data items G whose imaging timings are proximate to each other are integrated.

Figure 10:
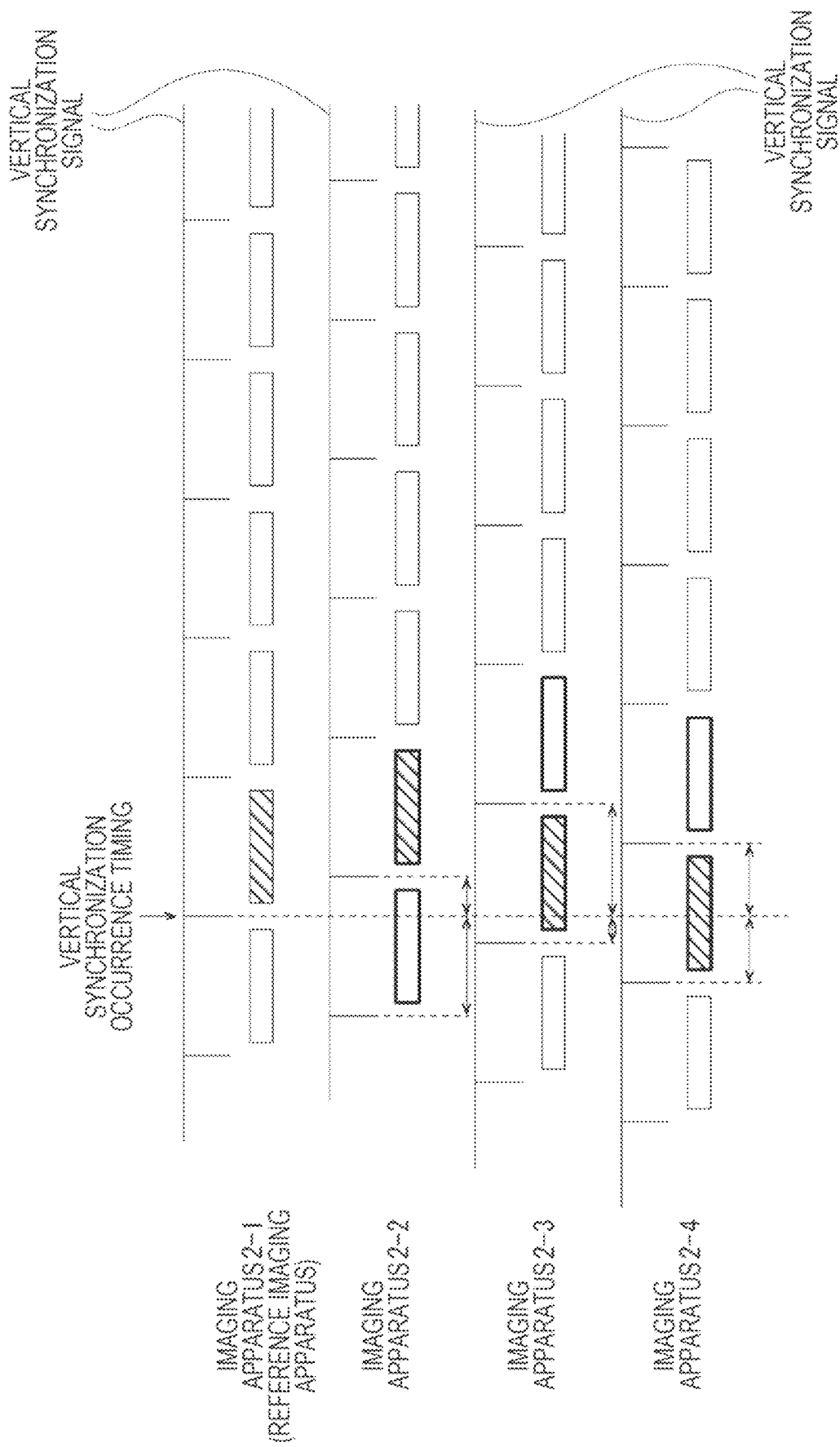
FIG. 10 is an explanatory diagram of a frame selection process by a frame selecting unit.

FIG. 10 is an explanatory diagram of the frame selection process by the frame selecting unit 19.

First, in the explanation of FIG. 10, the imaging apparatus 2-1 among the imaging apparatuses 2 is assumed as the reference imaging apparatus serving as a reference in frame matching. With regard to the moving image data of the reference imaging apparatus, the frame selecting unit 19 selects each frame image. In other words, with regard to the moving image data of the reference imaging apparatus, skipping or repeating of the frame image due to the frame matching are not caused.

In response to the occurrence of the vertical synchronization in the imaging apparatus 2-1 assigned as the reference imaging apparatus, the frame selecting unit 19 selects, for each imaging apparatus 2 other than the reference imaging apparatus, a frame image whose exposure start timing is most proximate to the exposure start timing of the selected frame image at this time of the reference imaging apparatus.

The frame image whose exposure start timing is most proximate to the exposure start timing of the selected frame image of the reference imaging apparatus is one of two frame images of which frame periods overlap with the frame period of the selected frame image (represented by thick rectangles in FIG. 10).

Therefore, among these two frame images, a frame image whose exposure start timing is closer to the exposure start timing of the selected frame image of the reference imaging apparatus is selected.

Here, in the example in FIG. 10, a difference in the exposure start timing with respect to the selected frame image of the reference imaging apparatus is represented as a difference between the vertical synchronization occurrence timings; however, the difference in the exposure start timing can also be found on the basis of a signal other than the vertical synchronization signal. For example, it is also possible to input a signal distinct from the vertical synchronization signal representing the exposure start timing from each imaging apparatus 2 and to find the difference in the exposure start timing on the basis of this distinct signal.

The frame selecting unit 19 of the present example performs the frame image selection process as described above for each frame of the moving image data of the reference imaging apparatus.

With this approach, the effect of suppressing a timing shift between the moving images can be enhanced.

Here, the image transfer apparatus 1 of the present example has a function of switching the reference imaging apparatus.

The reference imaging apparatus is switched by the frame selecting unit 19, for example, on the basis of the operation input information from the operation unit 18 illustrated in FIG. 5.

Figure 11:
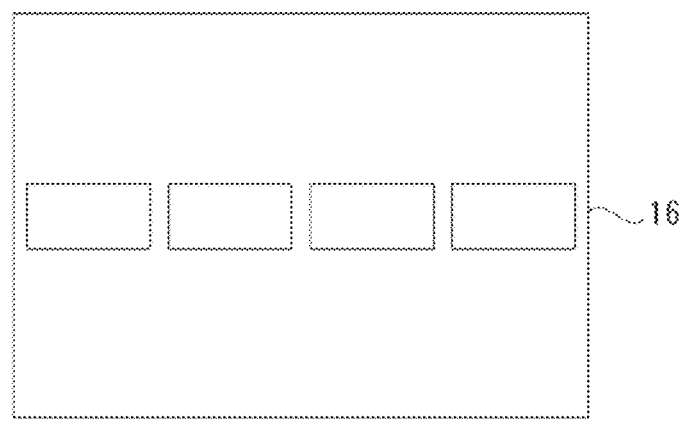
FIG. 11 is a diagram for explaining an example of switching operation for a reference imaging apparatus.

As an example, as illustrated in FIG. 11, the moving images input from the respective imaging apparatuses 2 are displayed on the display unit 16 and the imaging apparatus 2 that is the input source of a moving image selected from among the displayed moving images in response to operation is set as the reference imaging apparatus. For example, the selection operation for the moving image at this time can be an operation of touching the display area of the moving image using the touch panel function provided in the operation unit 18, or the like.

With such switching of the reference imaging apparatus based on operation input, the user can switch the reference imaging apparatus to an arbitrary imaging apparatus.

When the reference imaging apparatus is switched, the reference vertical synchronization signal input to the integrating unit 13 and the encoding unit 14 should be switched to the vertical synchronization signal by the switching destination imaging apparatus 2.

Figure 12:
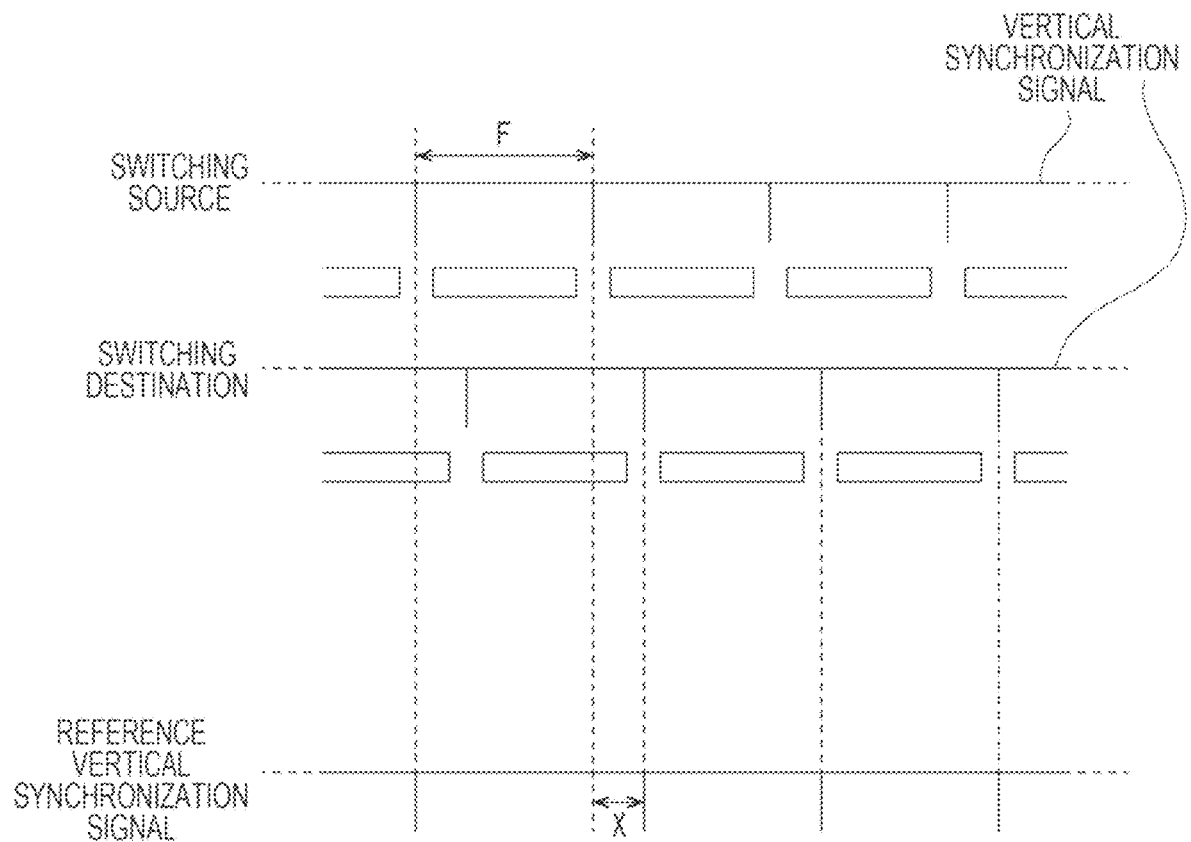
FIG. 12 is a diagram exemplifying a relationship between a vertical synchronization signal and a reference vertical synchronization signal in each of a switching source imaging apparatus and a switching destination imaging apparatus.

FIG. 12 is a diagram exemplifying a relationship between the vertical synchronization signal and the reference vertical synchronization signal in each of a switching source imaging apparatus 2 and a switching destination imaging apparatus 2.

For example, it is assumed that a switching condition for the reference imaging apparatus is satisfied (in the present example, input of switching operation) at any timing during a frame period indicated by "F" in FIG. 12.

In response to the satisfaction of the switching condition for the reference imaging apparatus, the frame selecting unit 19 of the present example promptly switches the vertical synchronization signal to be output as the reference vertical synchronization signal, from the vertical synchronization signal by the switching source imaging apparatus 2, which has been output until then, to the vertical synchronization signal by the switching destination imaging apparatus 2.

At this time, the timing at which the switching condition for the reference imaging apparatus is satisfied is sometimes proximate to the start timing of a frame period subsequent to the frame period F, in other words, the vertical synchronization occurrence timing of this subsequent frame period. In such a case, if a delay is caused in switching of the reference vertical synchronization signal, the vertical synchronization occurrence timing of this subsequent frame period is accidentally included as the vertical synchronization occurrence timing in the reference vertical synchronization signal.

As described above, when the vertical synchronization occurrence timing by the switching source imaging apparatus 2 is included as the vertical synchronization occurrence timing represented by the reference vertical synchronization signal, the reference vertical synchronization signal has a possibility that the vertical synchronization occurrence timing by the switching source imaging apparatus 2 and the vertical synchronization occurrence timing by the switching destination imaging apparatus 2 are proximate to each other, as indicated by "X" in FIG. 12.

When the vertical synchronization occurrence timings are produced proximately to each other in the reference vertical synchronization signal, there is a possibility that malfunction of the integrating unit 13 and the encoding unit 14 is induced.

In the present example, the vertical synchronization signal by the switching source imaging apparatus 2 is promptly switched to the vertical synchronization signal by the switching destination imaging apparatus 2 as described above, whereby the vertical synchronization occurrence timings can be properly prevented from being produced proximately in the reference vertical synchronization signal.

Consequently, it is possible to properly prevent the occurrence of a phenomenon that system malfunction is induced due to enabling the switching of the reference imaging apparatus 2.

Note that the technique for properly preventing the vertical synchronization occurrence timings from being made proximate to each other in the reference vertical synchronization signal is not limited to the above technique. For example, it is also possible to employ a technique of promptly masking the vertical synchronization signal by the switching source imaging apparatus 2 in response to the satisfaction of the switching condition for the reference imaging apparatus. With this technique, some time lag is permitted in switching the vertical synchronization signal from the switching source to the switching destination.

4. PROCESSING PROCEDURE

A specific processing procedure for implementing the above frame matching technique as an embodiment will be described with reference to a flowchart in FIG. 13.

First, in step S101, the frame selecting unit 19 determines whether or not the switching condition for the reference imaging apparatus has been satisfied. That is, in the present example, it is determined whether or not an operation for switching the reference imaging apparatus has been performed as an operation on the operation unit 18.

In a case where the switching condition for the reference imaging apparatus has been satisfied, the frame selecting unit 19 switches the reference imaging apparatus in step S102 and also switches the reference vertical synchronization signal in following step S103. In other words, the vertical synchronization signal to be output as the reference vertical synchronization signal is switched from the vertical synchronization signal of the switching source imaging apparatus 2 to the vertical synchronization signal of the switching destination imaging apparatus 2.

In response to performing the switching in step S103, the frame selecting unit 19 proceeds to step S104.

On the other hand, in a case where it is determined in step S101 that the switching condition for the reference imaging apparatus has not been satisfied, the frame selecting unit 19 passes through steps S102 and S103 and proceeds to step S104.

In step S104, the frame selecting unit 19 waits for the occurrence of the vertical synchronization in the reference imaging apparatus and, in response to the occurrence of the vertical synchronization, sets an imaging apparatus identification value n to "1" in step S105 to proceed to step S106.

Here, the imaging apparatus identification value n is a value for identifying the imaging apparatus 2 other than the reference imaging apparatus and, in the present example, a maximum value nMAX="3" is assumed.

In step S106, the frame selecting unit 19 finds a time difference Vd from the occurrence of the vertical synchronization in the reference imaging apparatus at this time to the occurrence of the immediately previous vertical synchronization in an n-th imaging apparatus.

Here, for each imaging apparatus 2 other than the reference imaging apparatus, the frame selecting unit 19 of the present example measures the length of time (counts time) from the vertical synchronization occurrence timing of each imaging apparatus 2 to the vertical synchronization occurrence timing of the reference imaging apparatus that arrives earliest after the vertical synchronization occurrence timing of each imaging apparatus 2. In this case, the process in step S106 is a process of acquiring the length of time measured for the n-th imaging apparatus 2 as the time difference Vd, from among lengths of time measured for every imaging apparatus 2 as described above.

In following step S107, the frame selecting unit 19 determines whether or not the time difference Vd is less than a half frame period ($1/120$ seconds in the present example).

If the time difference Vd is less than the half frame period, the frame selecting unit 19 proceeds to step S108 and selects a frame image of the n-th imaging apparatus in the current frame period.

The current frame period means a frame period including the vertical synchronization occurrence timing of the reference imaging apparatus detected by the process in step S104 this time, within the period thereof.

Specifically, as the process in step S107, the frame selecting unit 19 selects, from among the buffer areas of the frame buffer 12 corresponding to the n-th imaging apparatus among the first frame buffer 12-1 to the fourth frame buffer 12-4, the frame image data item G being buffered in a buffer area represented by the buffer area number being selected in the ring buffer process illustrated in FIG. 7.

On the other hand, if the time difference Vd is not less than the half frame period, the frame selecting unit 19 proceeds to step S109 and selects a frame image of the n-th imaging apparatus in the subsequent frame period. The subsequent frame period means a frame period subsequent to the current frame period described above.

Specifically, the frame selecting unit 19 selects, from among the buffer areas of the frame buffer 12 corresponding to the n-th imaging apparatus among the first frame buffer 12-1 to the fourth frame buffer 12-4, the frame image data item G to be buffered in a buffer area represented by the buffer area number to be selected next to the currently selected buffer area number in the ring buffer process in FIG. 7.

In response to executing the process in step S108 or S109, the frame selecting unit 19 proceeds to step S110 and determines whether or not the imaging apparatus identification value n is equal to or greater than the maximum value nMAX. In other words, it is determined whether or not the processes in and after step S106 have been executed for all the imaging apparatuses 2 other than the reference imaging apparatus.

If the imaging apparatus identification value n is not equal to or greater than the maximum value nMAX, the frame selecting unit 19 increments the imaging apparatus identification value n by one in step S111 and then returns to step S106.

On the other hand, if the imaging apparatus identification value n is equal to or greater than the maximum value nMAX, the frame selecting unit 19 returns to step S101. With this procedure, the process for the frame matching of each moving image is performed for each frame of the reference imaging apparatus.

Here, as can be understood with reference to the processes in steps S106 to S109, in the present example, as the frame selection for each imaging apparatus other than the reference imaging apparatus, it is determined, for one frame image among two frame images whose frame periods overlap with the frame period of a frame image selected for the reference imaging apparatus (hereinafter referred to as "reference frame image"), whether or not the exposure start timing difference with respect to the reference frame image is less than the half frame period; if the exposure start timing difference is less than the half frame period, the one frame image is selected and, if the exposure start timing difference is not less than the half frame period, the other frame image is selected.

This eliminates the need to measure the exposure start timing difference with respect to the reference frame image for the other frame image out of the two frame images to be selected.

Accordingly, a reduction in the processing load can be achieved.

5. ABOUT IMAGE READING PROCESS AT COMPOSITE VIDEO GENERATION

As described above, the composite video generating apparatus 4 receives the integrated video data U sent from the image transfer apparatus 1 and generates the panoramic image data P on the basis of the frame image data item of the integrated video data U, in other words, the image data obtained by merging the frame image data items G-1 to G-4 from the respective imaging apparatuses 2 in a square lattice shape.

At this time, the following technique can be employed as a technique of reading each piece of pixel data from the frame image data item of the integrated video data U.

Figure 14:
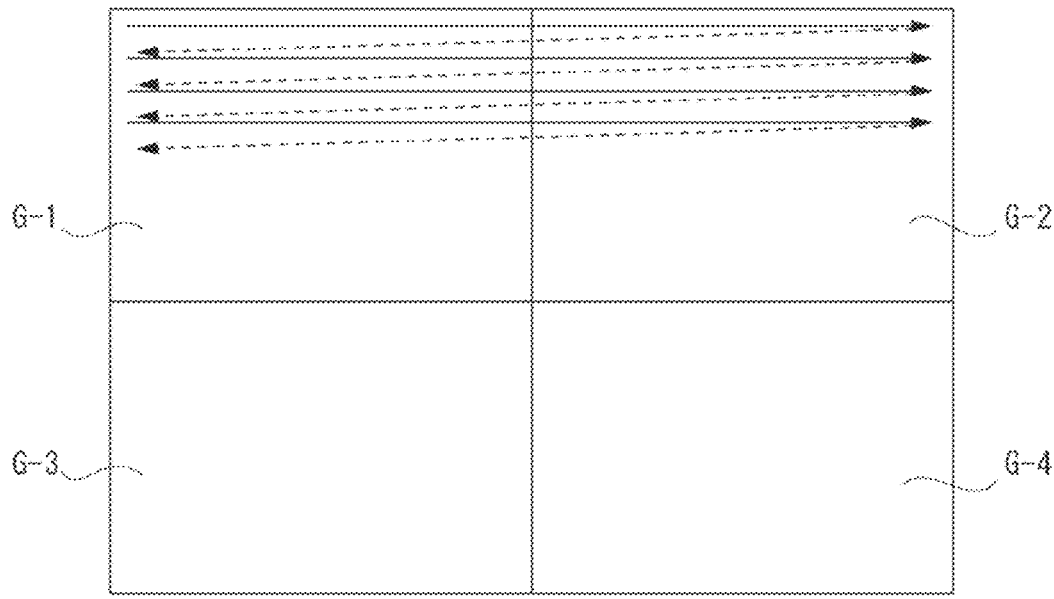
FIG. 14 is a diagram illustrating an ordinary reading technique for a frame image.

FIG. 14 illustrates an ordinary reading technique. In the ordinary reading technique, raster order reading (raster scan) is performed on the frame image data item. In other words, respective horizontal lines are read from left to right in order from a horizontal line located at the uppermost part toward a horizontal line located at the lowermost part.

Figure 15A:
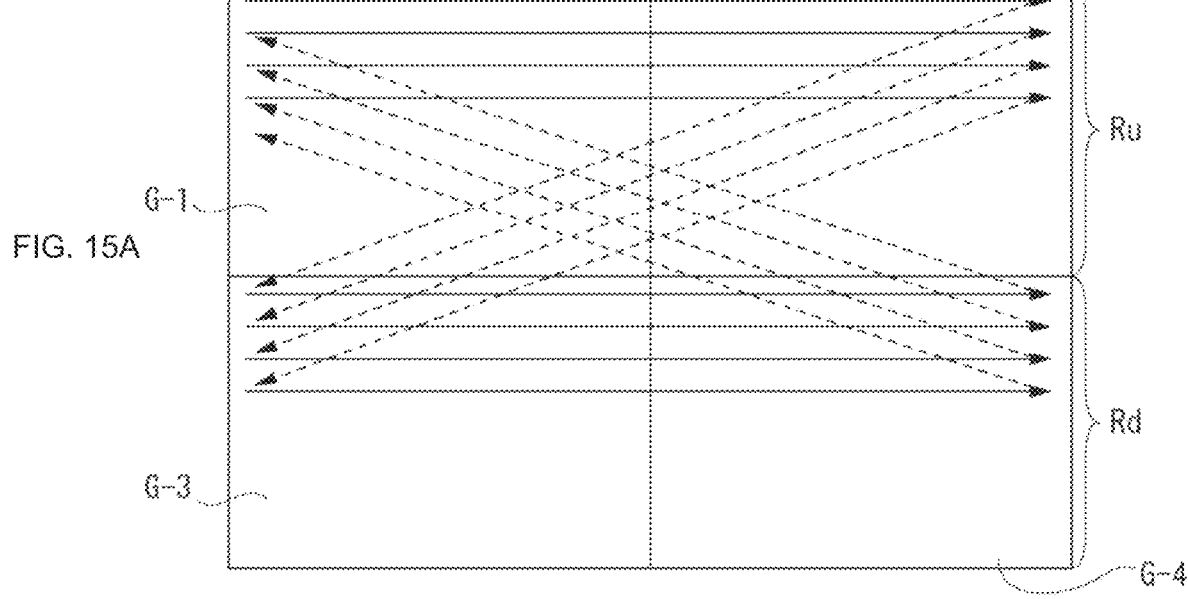
FIGS. 15A and 15B are diagrams for explaining a reading technique for a frame image according to the embodiment.

In contrast to this technique, in the present example, each piece of pixel data is read as illustrated in FIG. 15A.

In other words, in the frame image data item of the integrated video data U in which the frame image data items G-1 to G-4 are arranged in the raster order, when an area at an upper stage where the frame image data items G-1 and G-2 are arranged is assumed as an upper stage area Ru, and an area at a lower stage where the frame image data items G-3 and G-4 are arranged is assumed as a lower stage area Rd, a course of reading one horizontal line in the upper stage area Ru and thereafter reading one horizontal line in the lower stage area Rd is repeated from the uppermost part toward the lowermost part of each area R.

Figure 15B:
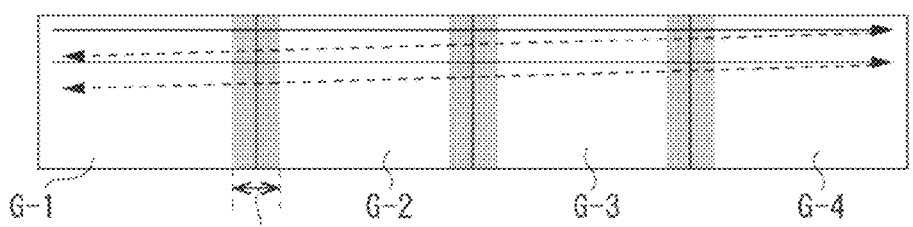

By performing such reading, an amount of data equivalent to one horizontal line in an image layout when merged as a panorama can be read at once, as illustrated in FIG. 15B.

The above reading technique is implemented as an image reading technique from the memory 43 to the stitch processing unit 44 illustrated in FIG. 8. In other words, the memory 43 is used as a frame memory for the integrated video data U and, for the frame image data item of the integrated video data U temporarily held in the memory 43, the stitch processing unit 44 reads the pixel data by the above reading technique.

6. VARIOUS MODIFICATIONS

[6-1. First Modification]

Various modifications will be described below. Note that, in the following description, the same reference numerals and the same step numbers will be given to similar parts to already described parts and the explanation thereof will be omitted.

In the above example, the frame selection process for frame matching is performed for each frame; as a first modification, however, the frame selection process can also be performed with a time interval longer than one frame period.

For example, as illustrated in FIG. 16, a certain time longer than one frame period is designated beforehand and the subsequent frame selection process is executed on condition that the designated certain time has elapsed after the frame selection process is performed.

With this approach, the number of times of the frame matching process is decreased and a reduction in the processing load can be achieved.

Normally, it takes about several tens of seconds for the vertical synchronization signal of each imaging apparatus 2 to cause a shift by one frame period. If the above-mentioned time is assumed as "X" and a frame shift allowance amount with respect to the reference imaging apparatus is assumed as a half frame period, the above-described certain time can be set to a time represented by "X/2".

Note that an arbitrary time longer than one frame period, such as one second, or the like, can be set as the above-described certain time.

Figure 17:
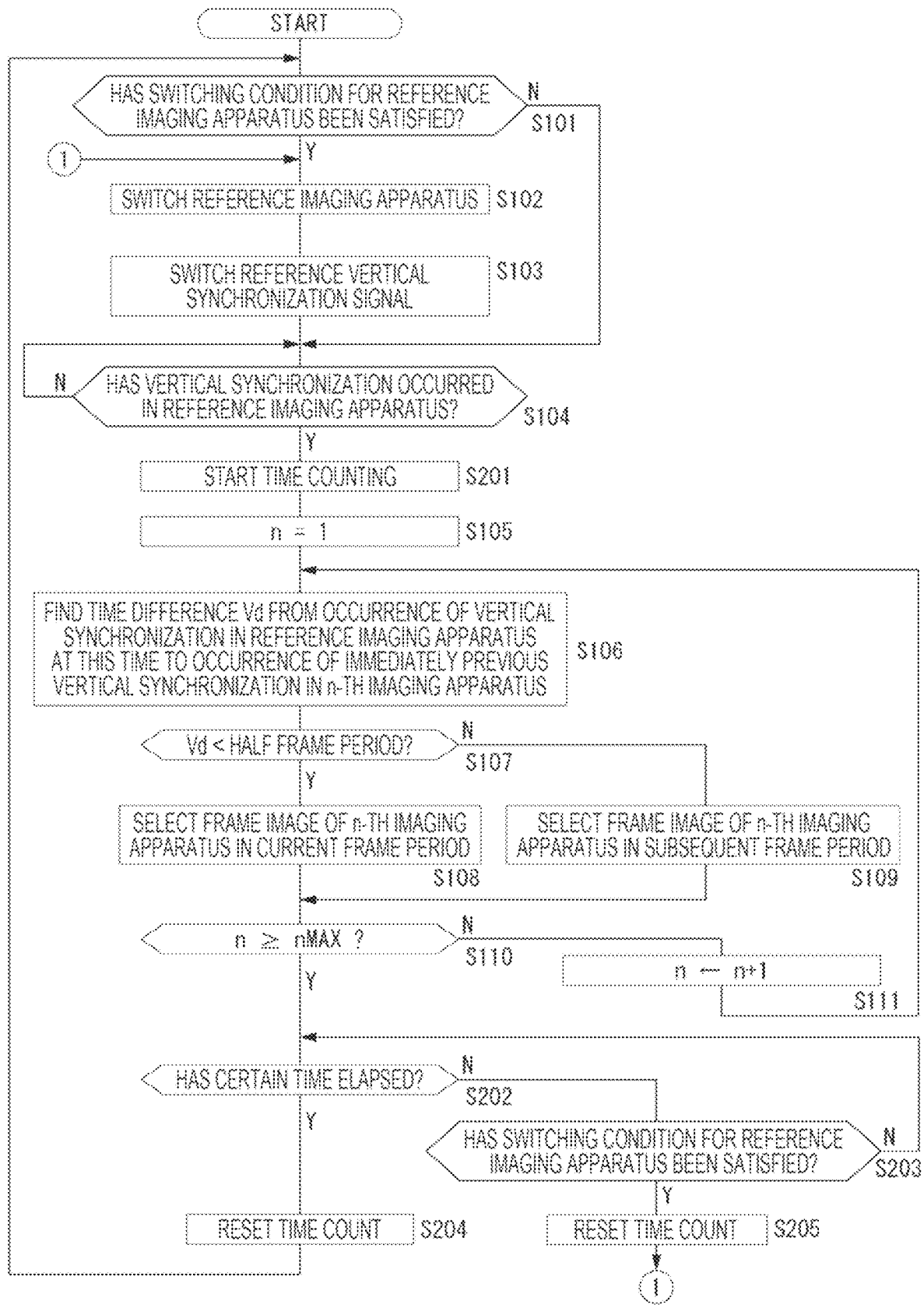
FIG. 17 is a flowchart illustrating a processing procedure for implementing the frame matching technique as the first modification.

FIG. 17 is a flowchart illustrating a specific processing procedure for implementing the frame selection as the first modification described above.

Figure 13:
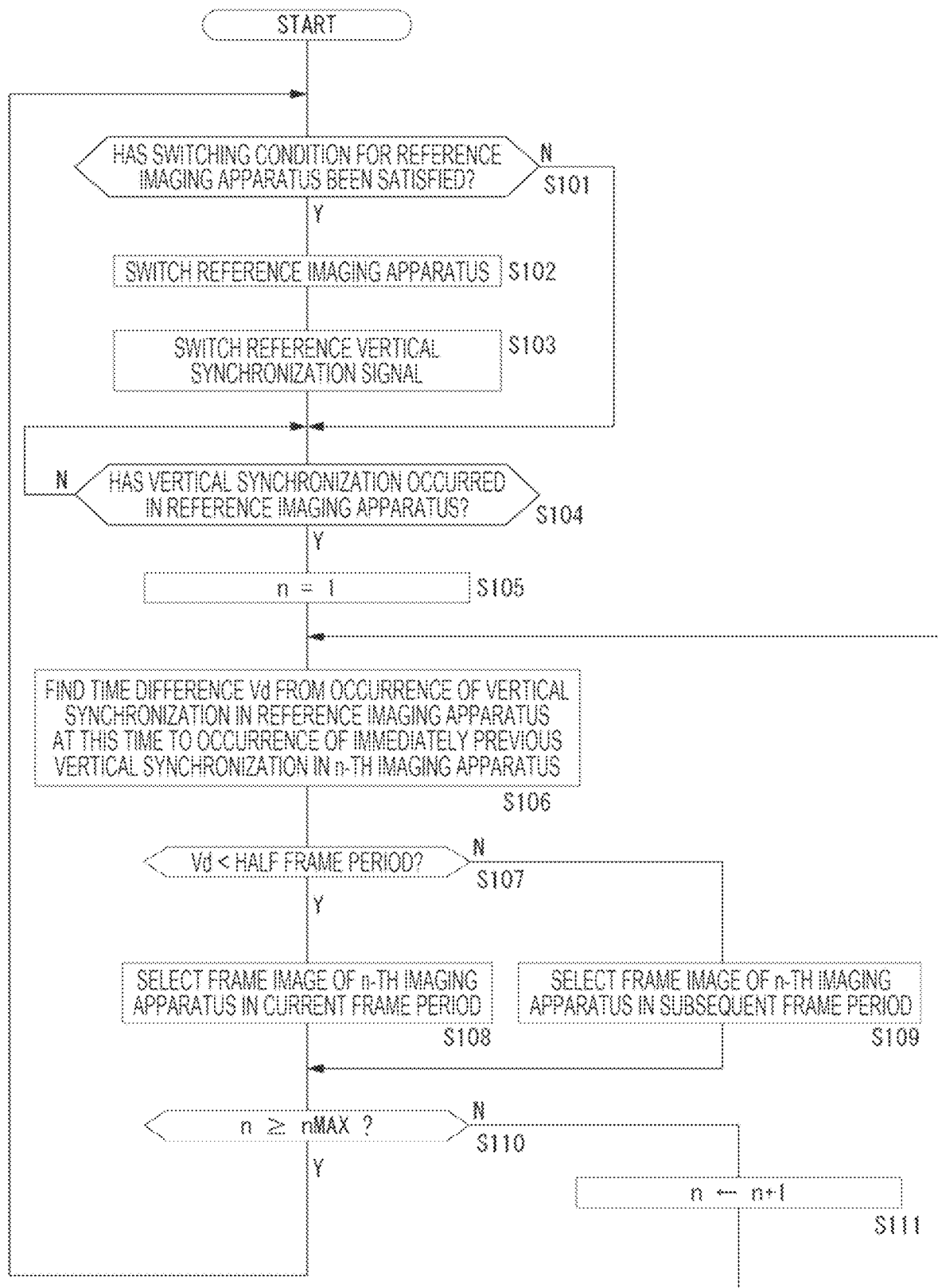
FIG. 13 is a flowchart illustrating a processing procedure for implementing a frame matching technique as an embodiment.

The difference from previous FIG. 13 is that processes in steps S201 to S204 are added.

Specifically, in response to confirming the occurrence of the vertical synchronization in the reference imaging apparatus in step S104, the frame selecting unit 19 in this case starts time counting in step S201 and proceeds to step S105.

Furthermore, in a case where it is determined in step S110 that the imaging apparatus identification value n is equal to or greater than the maximum value nMAX, the frame selecting unit 19 in this case waits until either one of the lapse of the certain time or the satisfaction of the switching condition for the reference imaging apparatus happens, by processes in steps S202 and S203.

In a case where it is determined in step S202 that the certain time has elapsed, the frame selecting unit 19 resets the time count in step S204 and then returns to step S101. On the other hand, in a case where it is determined in step S203 that the switching condition for the reference imaging apparatus has been satisfied, the frame selecting unit 19 resets the time count in step S205 and then returns to step S102.

With this procedure, the process for the frame selection in steps S106 to S109 is repeatedly executed on condition that the vertical synchronization in the reference imaging apparatus has occurred after the certain time has elapsed from the first execution.

[6-2. Second Modification]

Figure 18:
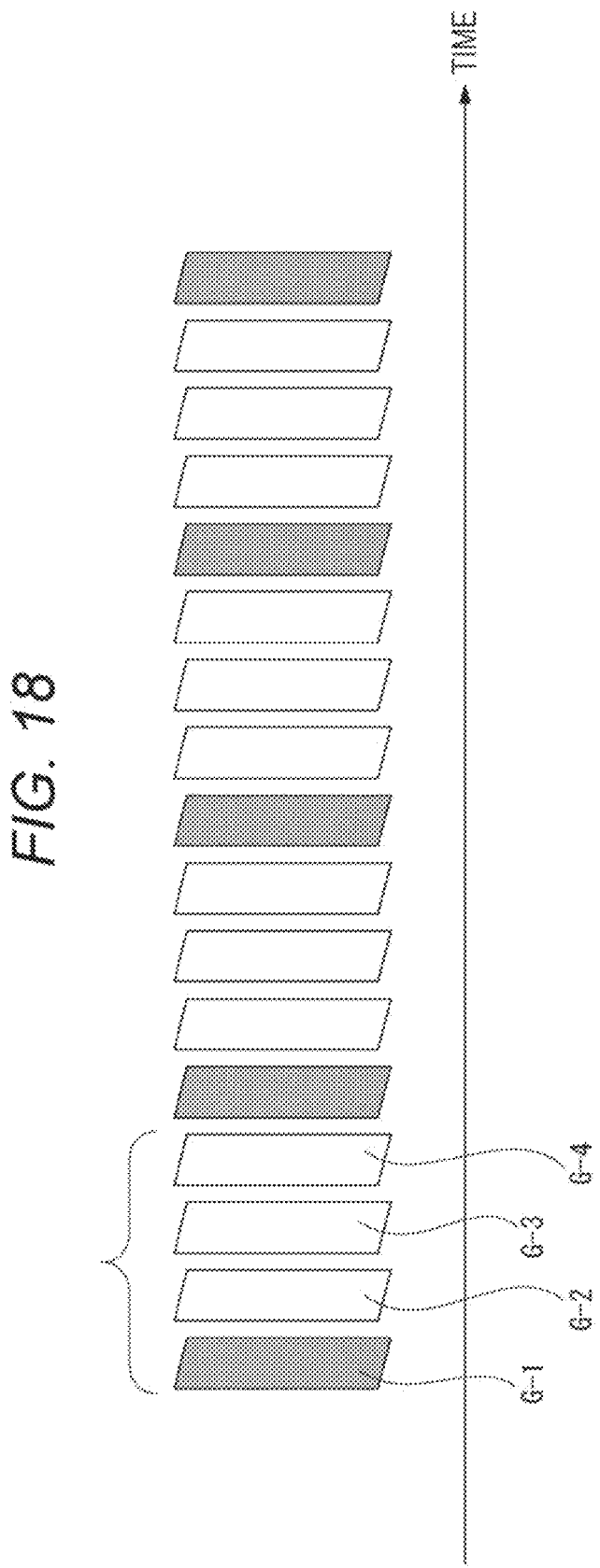
FIG. 18 is an explanatory diagram of an image integrating technique as a second modification.

In a second modification, the frame image data items G-1 to G-4 from respective imaging apparatus 2 are not integrated into one piece of image data but are integrated in a time axis direction as illustrated in FIG. 18.

For example, when it is premised that the frame rate of the panoramic video data M is 60 fps and the panoramic image data P uses four images as in the present example, moving image data at 240 fps is generated as the moving image data including the individual frame image data items G-1, G-2, G-3, and G-4 as a frame image. Note that, in the case of the present example, the image size of the above moving image data is, for example, the full HD size.

Figure 19:
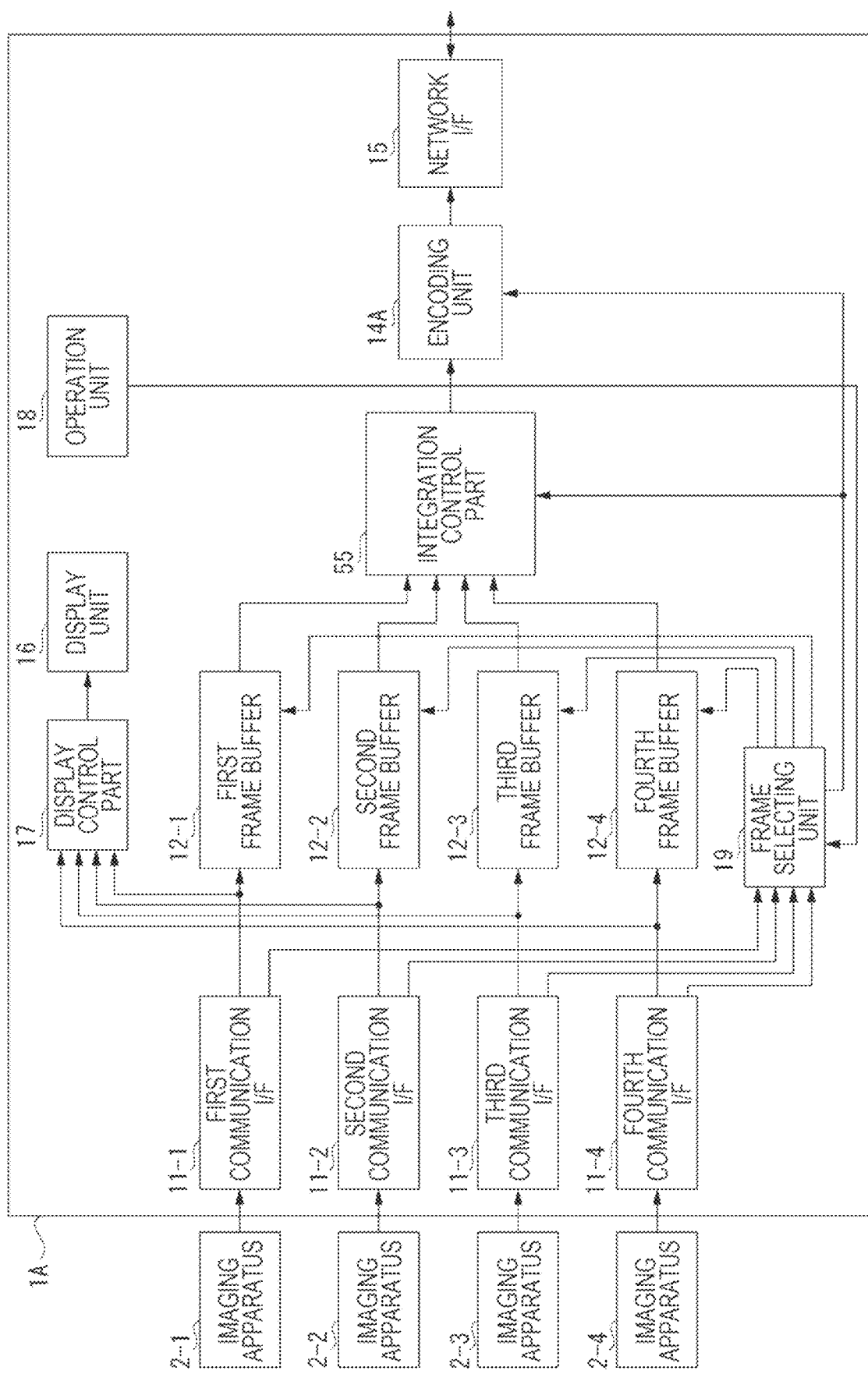
FIG. 19 is a block diagram illustrating an internal configuration of an image transfer apparatus as the second modification.

In this case, in the configuration of an apparatus on the integration side, an integration control part 55 is provided in place of the integrating unit 13, and an encoding unit 14A is provided in place of the encoding unit 14, as in an image transfer apparatus 1A illustrated in FIG. 19.

The encoding unit 14A generates moving image data (compressed moving image data) at a high frame rate (240 fps in the present example) of the full HD image size, instead of the moving image data of the 4K image size.

The integration control part 55 controls such that the frame image data items G-1 to G-4 are arrayed in a predetermined order on the inter-axis axis in the moving image data generated by the encoding unit 14A. Specifically, in the present example, the order of images selected and output from each frame buffer 12 is controlled such that the frame image data items G-1, G-2, G-3, and G-4 are arrayed in this order on the time axis, as exemplified in FIG. 18.

Here, in accordance with an instruction from the integration control part 55, the encoding unit 14A adds information representing a delimiter per frame unit made up of the frame image data items G-1 to G-4, to the moving image data to be generated. In other words, delimiter information Dv representing a delimiter per unit of integration of the frame image data items G is added to stream data as a single stream.

Figure 20:
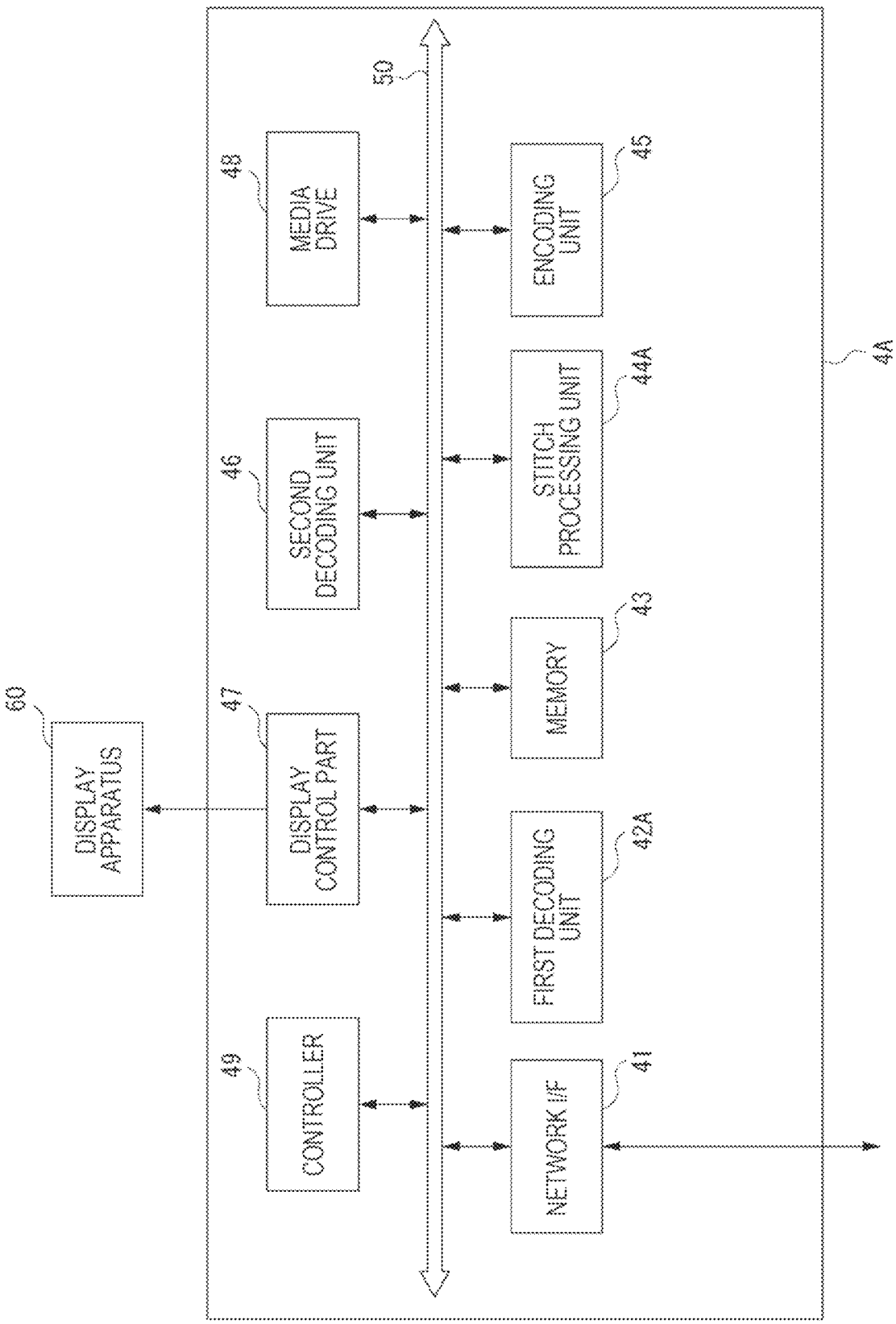
FIG. 20 is a block diagram illustrating an internal configuration of a composite video generating apparatus as the second modification.

Meanwhile, in the configuration of an apparatus on the panoramic composition side, a first decoding unit 42A is provided in place of the first decoding unit 42, and a stitch processing unit 44A is provided in place of the stitch processing unit 44, as illustrated as a composite video generating apparatus 4A in FIG. 20.

The first decoding unit 42A has a decoding function for the above-mentioned moving image data at the high frame rate.

The stitch processing unit 44A generates the panoramic image data P on the basis of the moving image data decoded by the first decoding unit 42A. At this time, on the basis of the delimiter information Dv included in the moving image data decoded by the first decoding unit 42A, the stitch processing unit 44A identifies a set of the frame image data items G (frame unit) used for generating one piece of the panoramic image data P.

At this time, since the frame image data items G-1 to G-4 are arrayed in a predetermined order on the time axis in the moving image data decoded by the first decoding unit 42A, the stitch processing unit 44A can perform the stitching process on each exact image combination. Specifically, for every four frame image data items G distinguished by the delimiter information Dv, the stitch processing unit 44A in this case performs the stitching process on each of a portion between the frame image data item G (G-1) located at the first position and the frame image data item G (G-2) located at the second position, a portion between this frame image data item G located at the second position and the frame image data item G (G-3) located at the third position, and a portion between this frame image data item G located at the third position and the frame image data item G (G-4) located at the fourth position on the time axis.

With this process, it is possible to generate the panoramic image data P with the exact image array illustrated in FIG. 2.

Note that, in consideration of a case where, for example, the moving image data is transferred in real time via the network 3, the frame rate of the moving image data to be transferred to the side of the composite video generating apparatus 4A can also be restrained, for example, to 120 fps. In this case, the frame rate of the panoramic video data M is given as 30 fps. Therefore, frame thinning is performed on the moving image data from each imaging apparatus 2 at the time of integration. That is, in the present example, half of the frame image data items G input at 60 frames per second from each imaging apparatus 2 is thinned out.

Here, the frame rate of the panoramic video data M is not limited to the rate exemplified above.

[6-3. Third Modification]

A third modification is a modification associated with switching of the reference imaging apparatus.

Switching of the reference imaging apparatus is not restricted to the above-described switching based on the operation input, but can be performed on the basis of an amount of motion in the moving image data input from each imaging apparatus 2.

Figure 21:
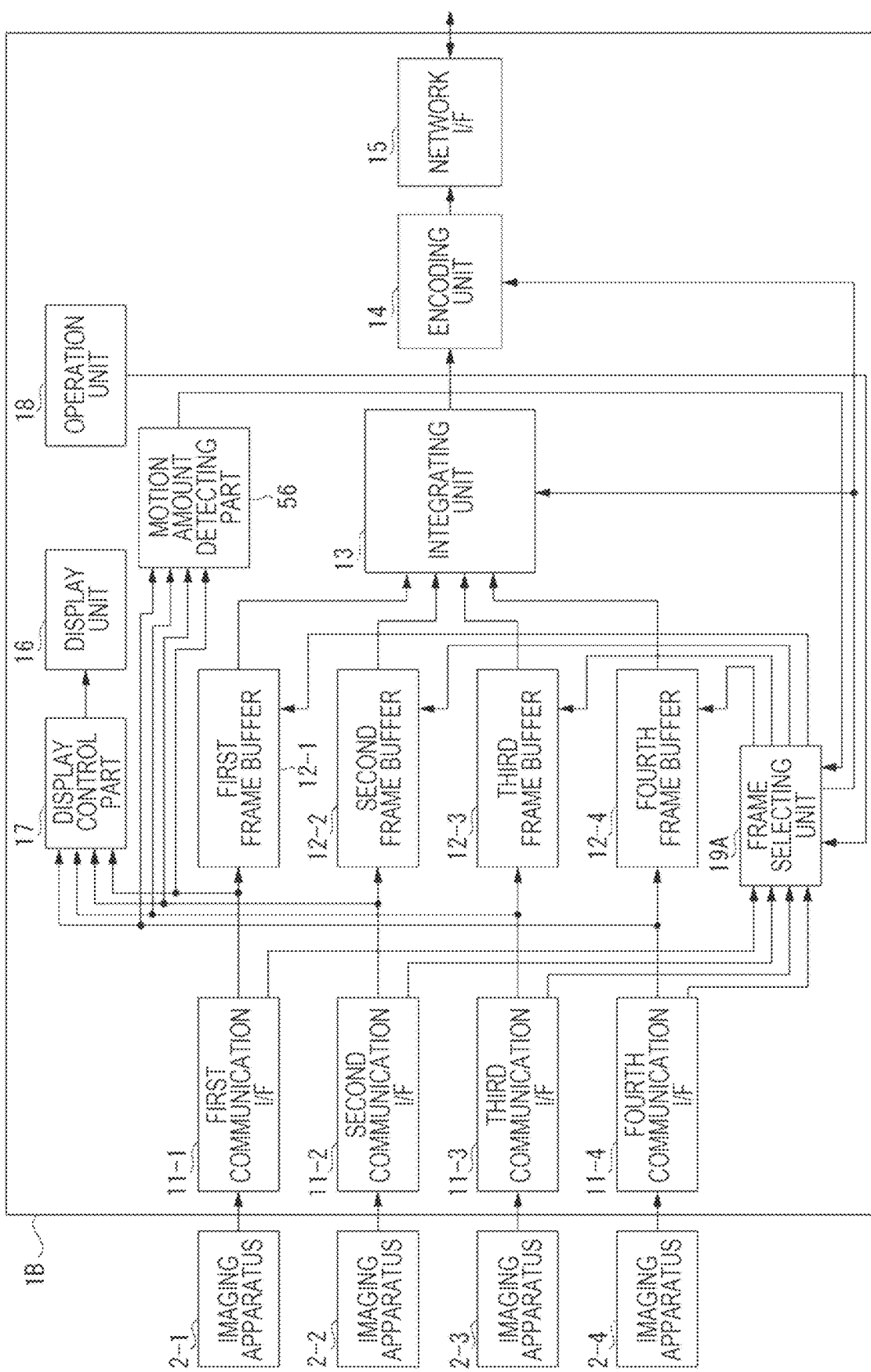
FIG. 21 is a block diagram illustrating an internal configuration of an image transfer apparatus as a third modification.

FIG. 21 is a block diagram illustrating an internal configuration of an image transfer apparatus 1B as the third modification (the respective imaging apparatuses 2 are also illustrated together).

In the image transfer apparatus 1B, a frame selecting unit 19A is provided in place of the frame selecting unit 19, and a motion amount detecting part 56 that detects the amount of motion in each piece of the moving image data input from each imaging apparatus 2 is further provided.

The frame selecting unit 19A switches the reference imaging apparatus on the basis of the amount of motion in each piece of the moving image data detected by the motion amount detecting part 56. Specifically, for example, the imaging apparatus 2 that is the input source of the moving image data including a subject with the largest amount of motion is switched to the reference imaging apparatus.

Alternatively, it is also possible to switch the imaging apparatus 2 that is the input source of the moving image data having the largest average value of the amount of motion in the entire image, to the reference imaging apparatus. Moreover, it is also conceivable to switch the imaging apparatus 2 that is the input source of the moving image data having the largest total area of image fields with the amount of motion equal to or greater than a certain amount, to the reference imaging apparatus.

By switching the reference imaging apparatus based on the amount of motion as described above, the imaging apparatus 2 imaging a subject with a high probability of being watched by an observer can be automatically switched to the reference imaging apparatus. Accordingly, a reduction in the operation load of the user associated with the switching of the reference imaging apparatus can be achieved.

[6-4. Fourth Modification]

A fourth modification is a modification suitable in the case of performing panoramic composition in a longitudinal direction.

Figure 22:
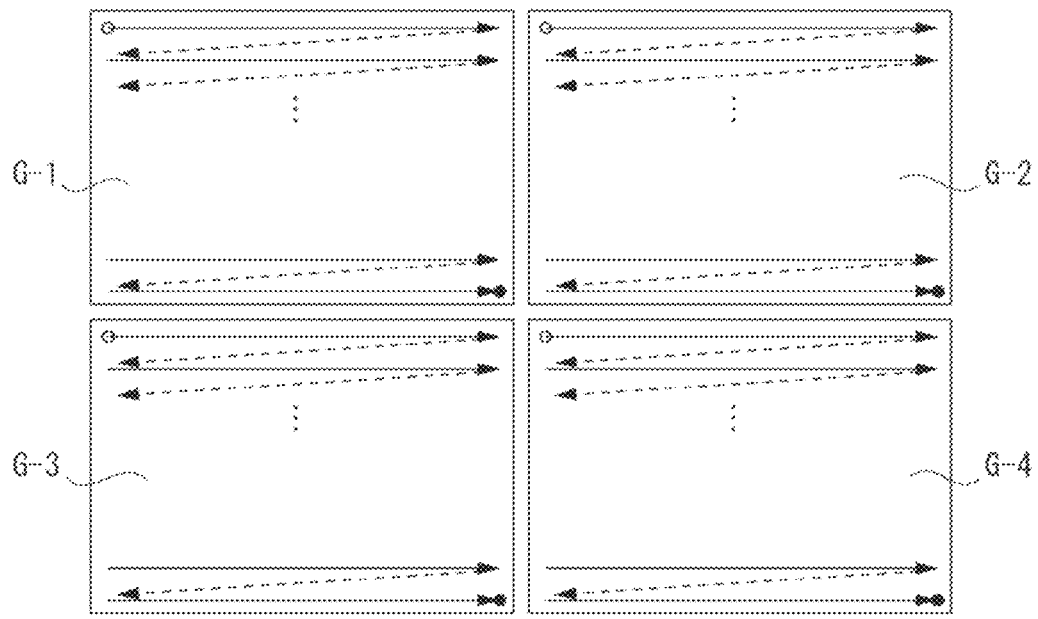
FIG. 22 is a diagram illustrating an arrangement example of respective images in a panoramic image as a premise in a fourth modification.

FIG. 22 is a diagram illustrating an arrangement example of respective images in a panoramic image as a premise in the fourth modification.

In the panoramic image data P in this case, the frame image data items G-1 to G-4 from the respective imaging apparatuses 2 are arranged in a square lattice shape. Specifically, the frame image data item G-1 is arranged at the upper left position, the frame image data item G-2 is arranged at the upper right position, the frame image data item G-3 is arranged at the lower left position, and the frame image data item G-4 is arranged at the lower right position.

Here, in the case of panoramic composition of the frame image data items G in the longitudinal direction, such as the composition of the frame image data items G-1 and G-3 and the composition of the frame image data items G-2 and G-4 in FIG. 22, care should be taken in a case where the imaging element of the imaging apparatus 2 is an imaging element adopting a rolling shutter scheme, such as a complementary metal oxide semiconductor (COMS) image sensor or the like. In other words, in this case, if each frame image data item G to be merged is selected with reference to the exposure start timing, there is a possibility that the images are not smoothly joined.

In FIG. 22, the exposure order in each frame image data item G in a case where the rolling shutter scheme is adopted is schematically represented by solid line arrows and dotted line arrows with a white circle as the exposure start timing and a black circle as the exposure end timing; as can be understood from FIG. 22, if the frame matching between respective images to be merged in the longitudinal direction is performed with reference to the exposure start timing, the difference in the exposure start timing becomes larger at junctions between these images. When the exposure start timing difference at the junctions between the images arrayed in the longitudinal direction becomes larger as described above, in particular, in a case where a subject with a large motion is imaged, the position of the subject is shifted between the upper and lower images, resulting in degradation of image quality.

For this reason, as the frame selection process for each piece of the moving image data to be merged in the longitudinal direction, the imaging apparatus 2 that is the input source of one of an upper piece and a lower piece of the moving image data is assigned as the reference imaging apparatus and, for the other of the upper piece and lower piece of the moving image data, a frame image whose exposure start timing is closest to the exposure end timing of the selected frame image (reference frame image) of the reference imaging apparatus is selected.

Figure 23:
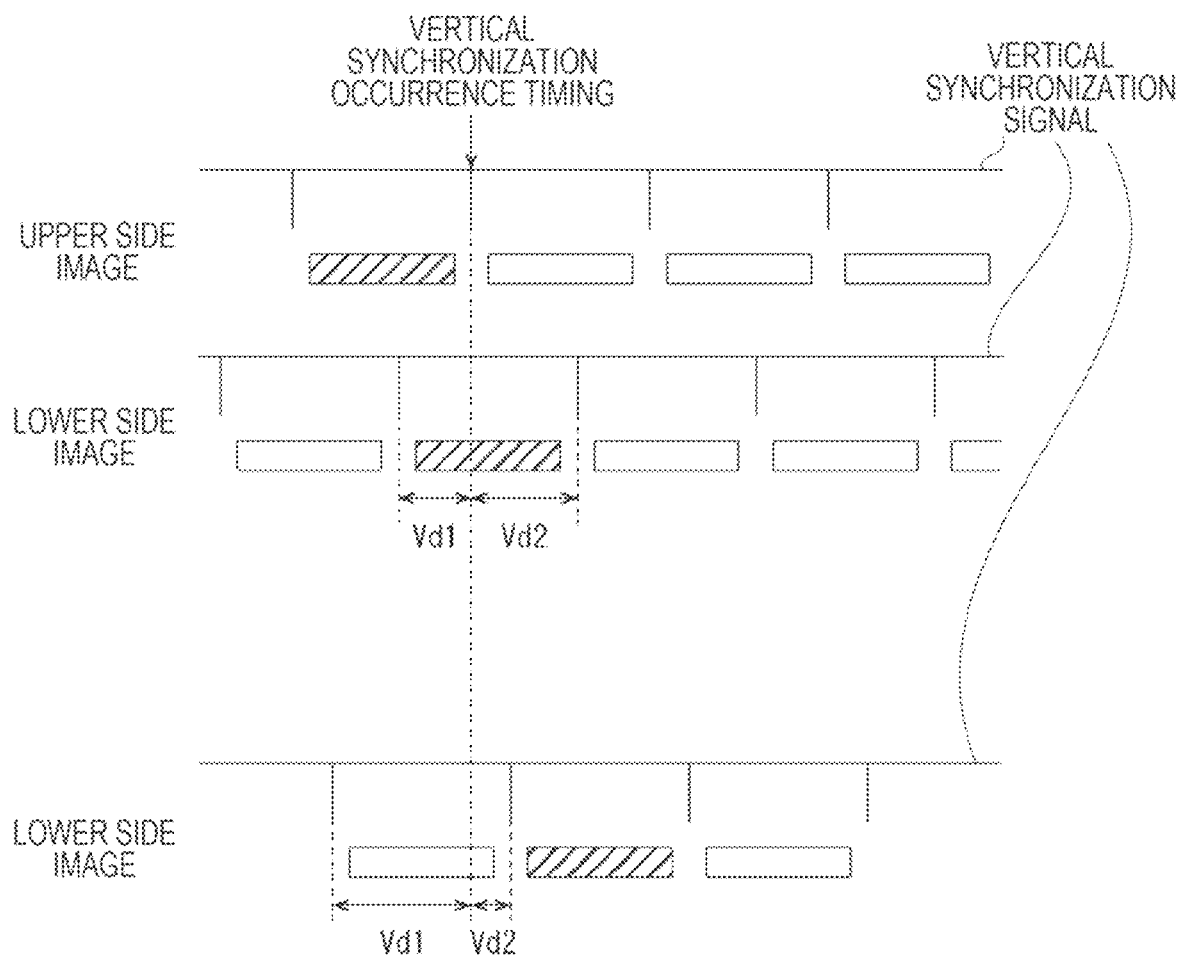
FIG. 23 is a conceptual diagram of the frame selection process performed between respective pieces of moving image data to be merged in a longitudinal direction.

FIG. 23 is a conceptual diagram of the frame selection process performed between respective pieces of moving image data to be merged in the longitudinal direction. Note that FIG. 23 exemplifies a case where the imaging apparatus 2 positioned on the upper side among the imaging apparatuses 2 arrayed in the up-down direction is assigned as the reference imaging apparatus.

In the frame selection process in this case, since the exposure end timing of the reference frame image is used as a reference instead of the exposure start timing, the vertical synchronization occurrence timing used as the reference in the frame selection is not the vertical synchronization occurrence timing in the frame period of the reference frame image but the vertical synchronization occurrence timing in a frame period subsequent to the frame period of the reference frame image (refer to the relationship between a shaded frame image in the "upper side image" and a vertical synchronization occurrence timing with an arrow).

With regard to the moving image data input from the lower side imaging apparatus 2, a frame image data item G whose vertical synchronization occurrence timing is closest to this vertical synchronization occurrence timing used as the reference is selected.

As a specific process, at every vertical synchronization occurrence timing in the moving image data from the lower side imaging apparatus 2, the frame selecting unit 19 (or 19A) in this case measures a time difference Vd1 from the vertical synchronization occurrence timing of the lower side imaging apparatus 2 to the vertical synchronization occurrence timing of the reference imaging apparatus that arrives earliest after that vertical synchronization occurrence timing of the lower side imaging apparatus 2. Then, it is determined whether or not the time difference Vd1 is less than a half frame period. If the time difference Vd1 is less than the half frame period, the frame image data item G in the current frame period, that is, the frame image data item G whose frame period start timing is the vertical synchronization occurrence timing taken as the beginning point of the measurement of the time difference Vd1, is selected. Furthermore, If the time difference Vd1 is not less than the half frame period, the frame image data item G in a frame period subsequent to the current frame period is selected.

Note that, in the above description, the frame selection is performed on the basis of the time difference Vd1; however, the frame selection can also be performed on the basis of a time difference Vd2 in FIG. 23, in other words, a time difference from the exposure end timing of the reference frame image to the vertical synchronization occurrence timing of the lower side imaging apparatus 2 immediately after that exposure end timing of the reference frame image. Specifically, if the time difference Vd2 is not less than the half frame period, the frame image data item G in the current frame period is selected and, if the time difference Vd2 is less than the half frame period, the frame image data item G in the frame period subsequent to the current frame period is selected.

Note that, in the above description, the vertical synchronization occurrence timing (frame period start timing) of the frame period subsequent to the reference frame image is used as the exposure end timing of the reference frame image; however, the exposure end timing can also be found on the basis of a signal other than the vertical synchronization signal. For example, a signal distinct from the vertical synchronization signal representing the exposure end timing can be input from each imaging apparatus 2 such that the exposure end timing is found on the basis of this distinct signal.

Here, in the example in FIG. 22, with regard to the images to be merged in a lateral direction (G-1 and G-2, and G-3 and G-4), any one of the imaging apparatuses 2 arrayed in the lateral direction is assigned as the reference imaging apparatus such that the frame selection for the moving image data from the other imaging apparatuses 2 can be performed with reference to the exposure start timing. Specifically, it suffices to select a frame image whose exposure start timing is closest to the exposure start timing of the reference frame image.

At this time, it is only necessary to designate at least one of all the imaging apparatuses 2 as the reference imaging apparatus. That is, in the example in FIG. 22, for example, the imaging apparatus 2 as the input source of the frame image data item G-1 is solely assigned as the reference imaging apparatus, and the frame selection for the other imaging apparatuses 2 is performed in such a manner that a frame image whose exposure start timing is closest to the exposure start timing of the reference frame image (that is, the frame image data item G-1) is selected.

Note that, in the case of panoramic composition of three or more frame images in the longitudinal direction, the frame selection can be performed by a technique similar to the technique described with reference to FIG. 23 for each set of two frame images adjacent in the up-down direction. For example, in FIG. 22, in a case where there is a frame image (to be referred to as frame image a) to be further merged on a lower side of the frame image data item G-3, the imaging apparatus 2 as the input source of the frame image data item G-3 is assigned as the reference imaging apparatus and the frame selection for the moving image data input from the imaging apparatus 2 as the input source of the frame image a is performed by a technique similar to the technique described with reference to FIG. 23.

[6-5. Other Modifications]

In the above description, an example of generating the panoramic video data M obtained by panoramic composition of the moving image data input from the four imaging apparatuses 2 has been cited; however, the number of the imaging apparatuses 2 to be used, in other words, the number of images to be merged is not limited to "4" and at least "2" or more images are only required.

Figure 24:
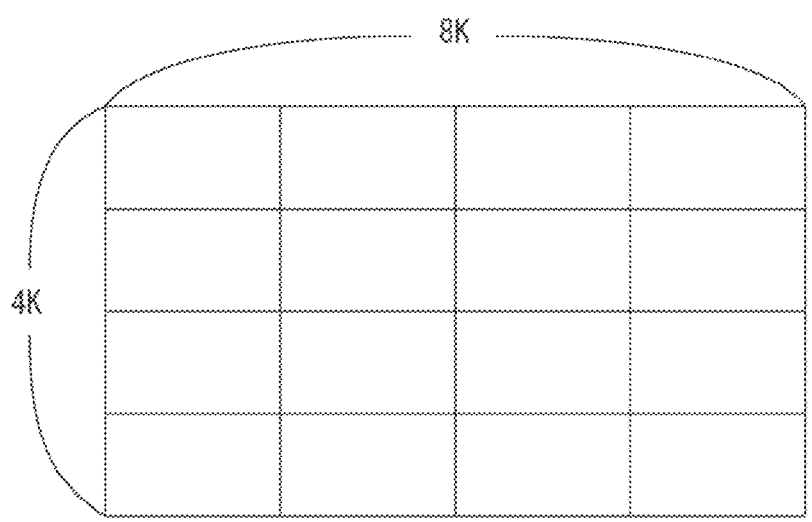
FIG. 24 is a diagram illustrating an example of generating panoramic video data using 16 imaging apparatuses.

FIG. 24 illustrates an example of generating the panoramic video data M using 16 imaging apparatuses 2. Specifically, FIG. 24 illustrates an example of generating the panoramic video data M in a format in which 16 images are organized in four rows in the longitudinal direction with four images in the lateral direction as one row.

In this case, the image size of the integrated video data U to be sent in one stream can be given as a so-called 8K (8K4K) image size, and it becomes possible to use general-purpose encoding unit and decoding unit compatible with the 8K image size as the encoding unit provided in the image transfer apparatus 1 (or 1A or 1B) and the decoding unit provided in the composite video generating apparatus 4 (or 4A).

Furthermore, in the above description, an example in which the operation unit for instructing switching of the reference imaging apparatus is provided in the image transfer apparatus 1 has been cited (the operation unit 18); however, the operation unit can also be provided at the side of the composite video generating apparatus 4. In this case, the operation input information is transferred to the side of the image transfer apparatus 1 via the network 3.

With this configuration, the observer of the panoramic video data M can arbitrarily instruct the image transfer apparatus 1 to switch the reference imaging apparatus.

Moreover, in the above description, the case of performing panoramic composition of the moving image data input from the plurality of imaging apparatuses 2 and presenting the composite panorama to the observer is exemplified as practical usage; however, panoramic composition is not indispensable. For example, as a case of transferring moving image data from each imaging apparatus 2 by way of the network 3 and presenting the transferred moving image data to the observer, a case where respective pieces of the moving image data are output and displayed on individual screens is also conceivable. In this case, by applying the transfer technology for one stream moving image data accompanying the frame selection process according to the present technology, it is possible to achieve suppression of timing shifts between the respective moving images to be presented.

That is, the present technology can be widely and suitably applied to practical usage of transferring respective pieces of moving image data in which synchronous reproduction is premised by way of a network and presenting the transferred moving image data to an observer.

7. SUMMARY OF EMBODIMENTS

As described above, the image transfer apparatus (1, 1A, or 1B) as an embodiment includes: a frame selecting unit (19 or 19A) that uses a vertical synchronization signal input from a particular imaging apparatus (reference imaging apparatus) among a plurality of imaging apparatuses (2) that capture moving images as a reference to select frame image data items from moving image data input from the plurality of imaging apparatuses; and an integrating and sending unit (the integrating unit 13 and the encoding unit 14, or the integration control part 55 and the encoding unit 14A) that integrates the frame image data items selected by the frame selecting unit into a single stream and sending the integrated single stream.

With this configuration, even in a case where the plurality of imaging apparatuses captures videos asynchronously, it becomes possible to select, from the respective moving images, frame images with a small imaging timing difference on the basis of the vertical synchronization signal of the particular imaging apparatus.

Furthermore, since a plurality of images is integrated into a single stream and sent, synchronization between the respective images will not become difficult as in the case of parallel transmission in individual streams.

Accordingly, it becomes possible to use an inexpensive imaging apparatus having no synchronization support function by a time code or the like, and to cut down a system cost, in synchronizing respective moving images in the case of outputting and displaying moving images input from a plurality of imaging apparatuses through network transmission.

Furthermore, in the image transfer apparatus as an embodiment, the frame selecting unit selects one of the frame image data items from the moving image data of another imaging apparatus among the imaging apparatuses excluding the particular imaging apparatus, on the basis of an exposure start timing difference with respect to reference frame image data, which is one of the frame image data items selected from the moving image data of the particular imaging apparatus.

This makes it possible to select a frame image data item whose exposure start timing is proximate to the exposure start timing of the reference frame image data, as the frame image data item of the imaging apparatus other than the particular imaging apparatus.

Accordingly, it is possible to achieve synchronization between the respective moving images.

Moreover, in the image transfer apparatus as an embodiment, the frame selecting unit selects a frame image data item whose exposure start timing is closer to the exposure start timing of the reference frame image data, from among two frame image data items of the moving image data of the another imaging apparatus, of which frame periods overlap with the frame period of the reference frame image data.

With this process, a frame image whose imaging timing is closest to the imaging timing of the frame image of the reference imaging apparatus is selected.

Accordingly, it is possible to achieve synchronization between the respective moving images.

Besides, in the image transfer apparatus as an embodiment, the frame selecting unit determines whether or not an exposure start timing difference with respect to the reference frame image data is less than a half frame period, for one frame image data item among the two frame image data items of which the frame periods overlap with the frame period of the reference frame image data, selects the one frame image data item when the exposure start timing difference is less than the half frame period, and selects the other frame image data item when the exposure start timing difference is not less than the half frame period.

This eliminates the need to measure the exposure start timing difference with respect to the reference frame image for the other frame image data item out of the two frame image data items to be selected.

Accordingly, a reduction in the processing load can be achieved.

Furthermore, in the image transfer apparatus as an embodiment, the frame selecting unit selects one of the frame image data items from the moving image data of another imaging apparatus among the imaging apparatuses excluding the particular imaging apparatus, on the basis of a timing difference between an exposure end timing of reference frame image data, which is one of the frame image data items selected from the moving image data of the particular imaging apparatus, and an exposure start timing of the one of the frame image data items of the moving image data of the another imaging apparatus.

This makes it possible to select a frame image data item whose exposure start timing is proximate to the exposure end timing of the reference frame image data, as the frame image data item of another imaging apparatus.

Accordingly, in the case of panoramic composition in the longitudinal direction of images captured by the rolling shutter scheme, it is possible to suppress the exposure timing difference at the junction between the images and to achieve improvement of the image quality.

Moreover, in the image transfer apparatus as an embodiment, the frame selecting unit performs the selection for each frame of the moving image data of the particular imaging apparatus.

With this approach, the frame matching process is performed for each frame and the effect of suppressing a timing shift between the moving images can be enhanced.

Besides, in the image transfer apparatus as an embodiment, the frame selecting unit performs the selection at a time interval longer than one frame period of the moving image data of the particular imaging apparatus.

With this approach, the number of times of the frame matching process is decreased and a reduction in the processing load can be achieved.

Furthermore, in the image transfer apparatus as an embodiment, the frame selecting unit has a switching function for the particular imaging apparatus.

This makes it possible to switch the particular imaging apparatus that does not cause skipping or repeating of the frame image due to the frame matching process.

If switching of the particular imaging apparatus is disabled, for example, in a case where an imaging apparatus imaging a subject easily watched by an observer in terms of the amount of motion or the like is not assigned as the particular imaging apparatus, skipping or repeating of the frame image is more easily perceived. In other words, deterioration in image quality is easily perceived.

By enabling the switching of the particular imaging apparatus as described above, skipping or repeating of the frame image due to the frame matching process can be made difficult to perceive and suppression of deterioration in image quality can be achieved.

Moreover, in the image transfer apparatus as an embodiment, the frame selecting unit switches the particular imaging apparatus on the basis of operation input information.

This enables the user to arbitrarily switch the particular imaging apparatus.

Besides, in the image transfer apparatus as an embodiment, the frame selecting unit (19A) switches the particular imaging apparatus on the basis of an amount of motion in the moving image data input from each of the imaging apparatuses.

This makes it possible to automatically switch an imaging apparatus imaging a subject easily watched by an observer to the particular imaging apparatus.

Accordingly, a reduction in the operation load of the user associated with the switching of the reference imaging apparatus can be achieved.

Furthermore, in the image transfer apparatus as an embodiment, the frame selecting unit outputs the vertical synchronization signal of the particular imaging apparatus to the integrating and sending unit (the integrating unit 13 and the encoding unit 14, or the integration control part 55 and the encoding unit 14A) as a reference vertical synchronization signal, and, when switching the particular imaging apparatus, switches the vertical synchronization signal to be output as the reference vertical synchronization signal such that a vertical synchronization occurrence timing immediately after the switching by the vertical synchronization signal of an imaging apparatus as a switching source is not mixed as the vertical synchronization occurrence timing represented by the reference vertical synchronization signal.

If the above mixing is permitted, there is a probability that the vertical synchronization occurrence timing will be repeated in a relatively short time in the reference vertical synchronization signal. If the vertical synchronization occurrence timing is repeated as mentioned above, malfunction may be caused in a post-stage process after frame selection, such as an integration process by the integrating and sending unit.

Therefore, by avoiding the above mixing from being caused, prevention of the occurrence of system malfunction is achieved.

Moreover, in the image transfer apparatus as an embodiment, the integrating and sending unit integrates the frame image data items selected by the frame selecting unit into one piece of image data to send.

This makes it possible to integrate, for example, four frame image data items of HD image size into one piece of image data of 4K image size, such that a codec compatible with a special image size can be made unnecessary.

Besides, in the image transfer apparatus as an embodiment, the integrating and sending unit integrates the frame image data items selected by the frame selecting unit in a time axis direction to send.

This makes it possible to make a codec compatible with a special image size unnecessary.

Furthermore, in the image transfer apparatus as an embodiment, the integrating and sending unit adds delimiter information (Dv) representing a delimiter per unit of integration of the frame image data items to stream data as the single stream.

If the delimiter information is not added, a process of discriminating each image constituting one unit of integration is expected on a receiving side of one piece of stream data, for example, by image decomposition or the like.

Such a process is no longer necessary and a reduction in the processing load on the above receiving side can be achieved.

Furthermore, a moving image generating system (100) as an embodiment includes: a frame selecting unit that uses a vertical synchronization signal input from a particular imaging apparatus among a plurality of imaging apparatuses that capture moving images as a reference to select frame image data items from moving image data input from the plurality of imaging apparatuses; an integrating and sending unit that integrates the frame image data items selected by the frame selecting unit into a single stream and sending the integrated single stream; and a moving image generating unit (the stitch processing unit 44 or 44A and the encoding unit 45) that generates moving image data including, as a frame image, the frame image data items included in the single stream sent by the integrating and sending unit.

Also with such a moving image generating system, a similar effect to the effect of the above-described image transfer apparatus as an embodiment can be obtained.

Furthermore, in the moving image generating system as an embodiment, the moving image generating unit performs panoramic composition of the frame image data items included in the single stream, and generates moving image data including a composite image obtained by the panoramic composition as a frame image.

With this configuration, it becomes possible to use an inexpensive imaging apparatus having no synchronization support function by a time code or the like, and to cut down a system cost, in synchronizing respective moving images in the case of performing panoramic composition of moving images input from a plurality of imaging apparatuses and outputting and displaying the composite panorama through network transmission.

Note that the effects described in the present description merely serve as examples and not construed to be limited. There may be another effect as well.

8. APPLICATION EXAMPLES

8-1. First Application Example

The technology according to the present disclosure can be applied to a variety of products. For example, the technology according to the present disclosure may be applied to a surgery room system.

Figure 25:
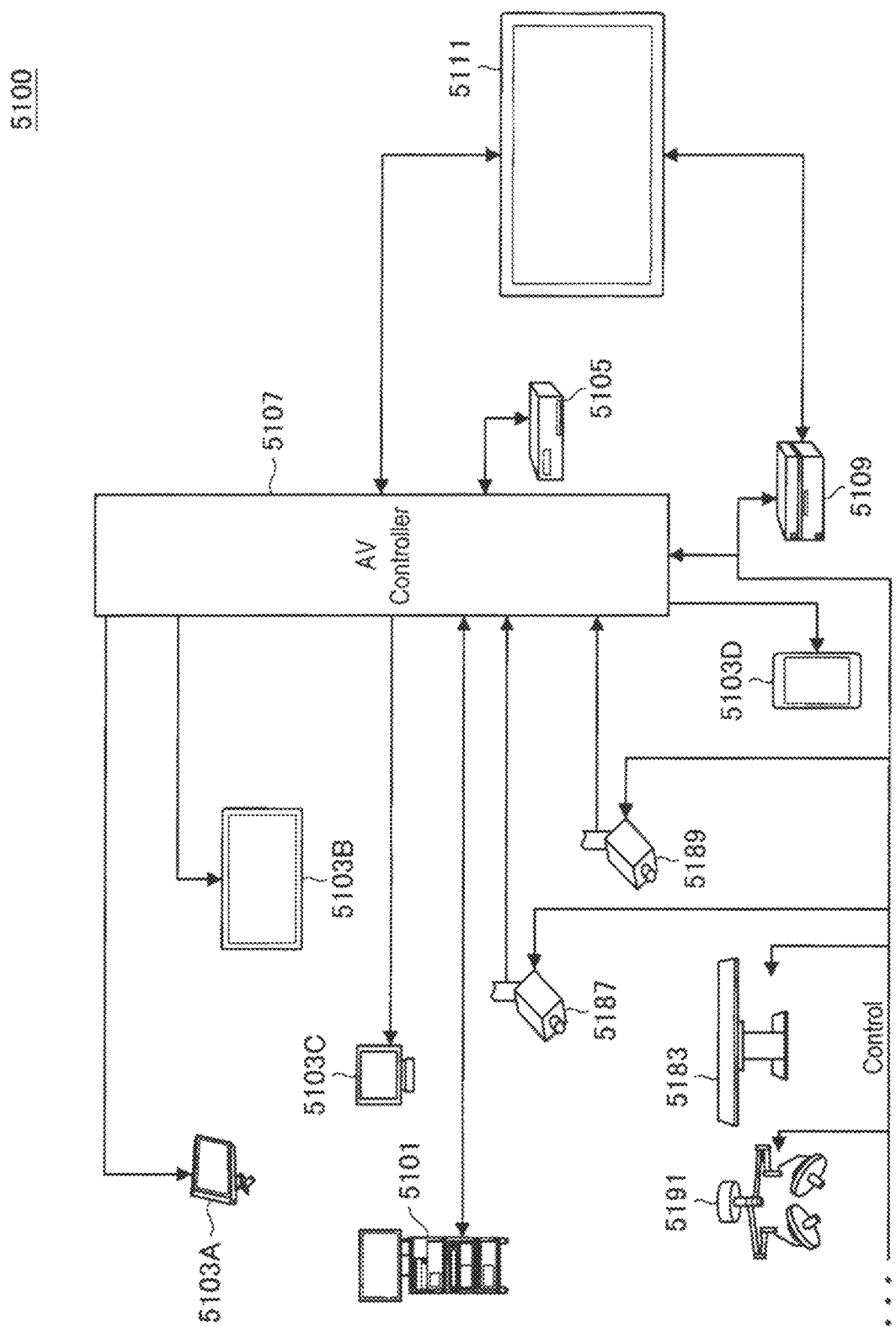
FIG. 25 is a diagram illustrating an outline of the overall configuration of a surgery room system.

FIG. 25 illustrates an outline of the overall configuration of the surgery room system 5100 to which the technology according to the present disclosure can be applied. Referring to FIG. 25, the surgery room system 5100 is configured such that a group of apparatuses installed in a surgery room are connected to each other so as to be able to cooperate via an audio-visual controller (AV controller) 5107 and a surgery room control apparatus 5109.

A variety of apparatuses can be installed in the surgery room. FIG. 25 illustrates, as an example, an apparatus group 5101 of various types for a surgery through an endoscope, a ceiling camera 5187 provided on the ceiling of the surgery room to image the area around the hands of a surgeon, a surgical field camera 5189 provided on the ceiling of the surgery room to image events in the entire surgery room, a plurality of display apparatuses 5103A to 5103D, a recorder 5105, a patient bed 5183, and an illumination 5191.

Here, among these apparatuses, the apparatus group 5101 belongs to an endoscopic surgery system 5113 to be described later and includes an endoscope and a display apparatus or the like that displays an image captured by the endoscope. Each apparatus belonging to the endoscopic surgery system 5113 is also called as a medical instrument. Meanwhile, the display apparatuses 5103A to 5103D, the recorder 5105, the patient bed 5183, and the illumination 5191 are apparatuses situated, for example, in the surgery room apart from the endoscopic surgery system 5113. Each of these apparatuses not belonging to the endoscopic surgery systems 5113 is also called as a non-medical instrument. The audio-visual controller 5107 and/or the surgery room control apparatus 5109 control working of these medical instruments and non-medical instruments cooperatively with each other.

The audio-visual controller 5107 comprehensively controls processes relating to image display in the medical instruments and non-medical instruments. Specifically, among the apparatuses included in the surgery room system 5100, the apparatus group 5101, the ceiling camera 5187, and the surgical field camera 5189 can be apparatuses (hereinafter also called as distribution source apparatuses) having a function of distributing information (hereinafter also referred to as display information) to be displayed during surgery. Furthermore, the display apparatuses 5103A to 5103D can be apparatuses (hereinafter also called as output destination apparatuses) to which the display information is output. In addition, the recorder 5105 can be an apparatus fulfilling both of the distribution source apparatus and the output destination apparatus. The audio-visual controller 5107 controls working of the distribution source apparatuses and the output destination apparatuses and has a function of acquiring the display information from the distribution source apparatuses and transmitting the acquired display information to the output destination apparatuses to display or record the acquired display information on the output destination apparatuses. Note that the display information includes various images captured during surgery, various types of information regarding surgery (for example, body information on a patient, information about past examination results and surgical procedures, and the like), and the like.

Specifically, information about the image of the surgical site in the body cavity of the patient captured by an endoscope can be transmitted to the audio-visual controller 5107 from the apparatus group 5101 as the display information. Furthermore, information about the image of the area around the hands of the surgeon captured by the ceiling camera 5187 can be transmitted from this ceiling camera 5187 as the display information. In addition, information about the image indicating events in the entire surgery room captured by the surgical field camera 5189 can be transmitted from this surgical field camera 5189 as the display information. Note that, in a case where the surgery room system 5100 contains another apparatus having the imaging function, the audio-visual controller 5107 may acquire information about the image captured by the another apparatus also from the another apparatus as the display information.

Alternatively, for example, information about these images captured in the past is recorded in the recorder 5105 by the audio-visual controller 5107. The audio-visual controller 5107 can acquire information about these images captured in the past from the recorder 5105 as the display information. Note that also various types of information regarding surgery may be recorded in the recorder 5105 beforehand.

The audio-visual controller 5107 displays the acquired display information (in other words, images photographed during surgery or various types of information regarding surgery) on at least one of the display apparatuses 5103A to 5103D, which are the output destination apparatuses. In the illustrated example, the display apparatus 5103A is a display apparatus installed by being suspended from the ceiling of the surgery room, the display apparatus 5103B is a display apparatus installed on the wall surface of the surgery room, the display apparatus 5103C is a display apparatus installed on a desk in the surgery room, and the display apparatus 5103D is a mobile instrument having a display function (for example, a tablet personal computer (PC)).

Furthermore, although illustration is omitted in FIG. 25, the surgery room system 5100 may include an apparatus outside the surgery room. Apparatuses outside the surgery room can be, for example, servers connected to a network constructed inside and outside the hospital, PCs used by medical staff, projectors installed in conference rooms of the hospital, and the like. In a case where such external apparatuses are located outside the hospital, the audio-visual controller 5107 can also display the display information on a display apparatus of another hospital via a television conference system or the like for remote medical treatment.

The surgery room control apparatus 5109 comprehensively controls processes other than processes relating to image display in the non-medical instruments. For example, the surgery room control apparatus 5109 controls driving of the patient bed 5183, the ceiling camera 5187, the surgical field camera 5189, and the illumination 5191.

A centralized operation panel 5111 is provided in the surgery room system 5100, and a user can give an instruction about image display to the audio-visual controller 5107 or can give an instruction about working of the non-medical instruments to the surgery room control apparatus 5109 via this centralized operation panel 5111. The centralized operation panel 5111 is configured in such a manner that a touch panel is provided on a display surface of the display apparatus.

Figure 26:
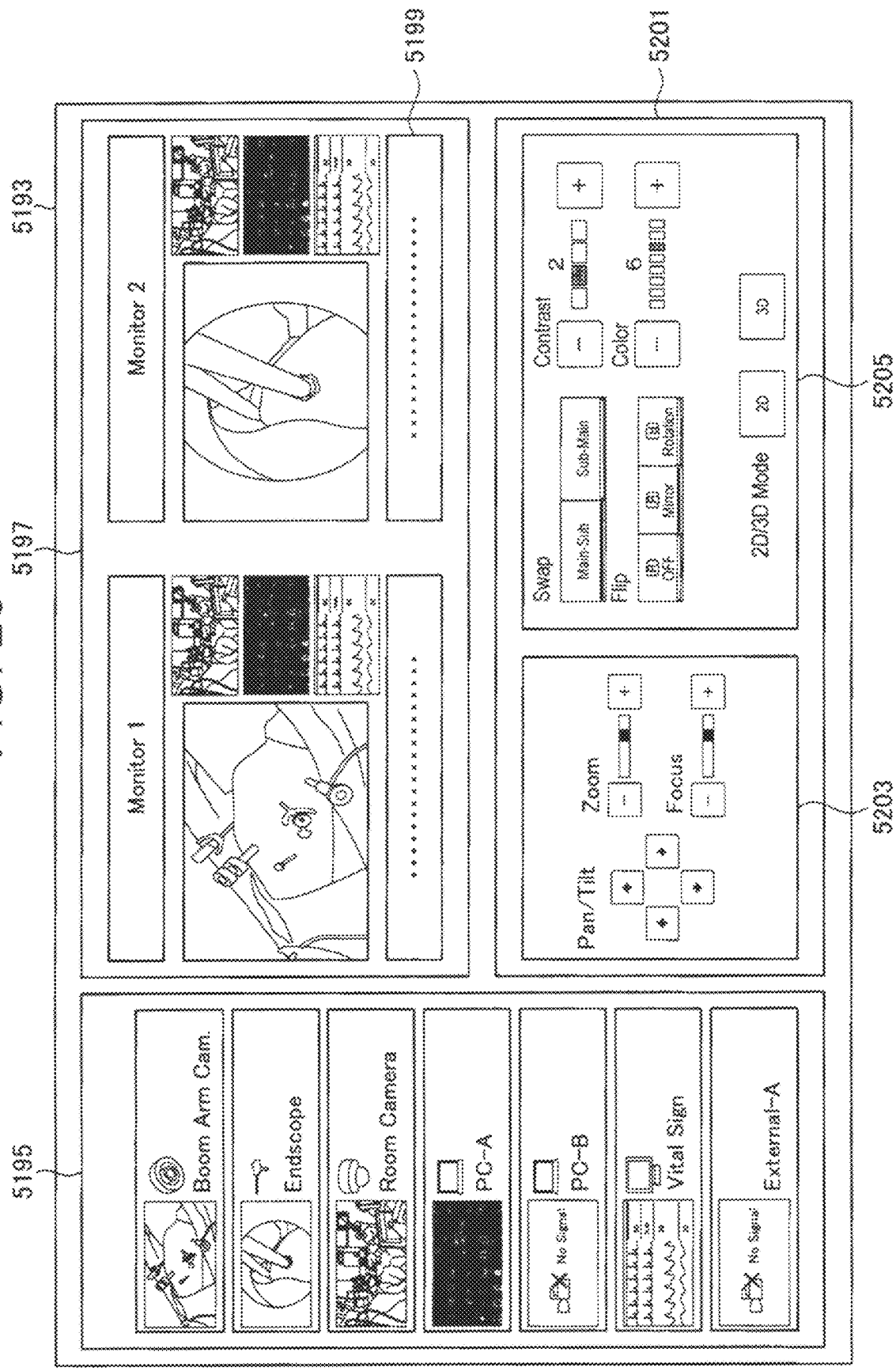
FIG. 26 is a diagram illustrating a display example of an operation screen on a centralized operation panel.

FIG. 26 is a diagram illustrating a display example of an operation screen on the centralized operation panel 5111. As an example, FIG. 26 illustrates an operation screen corresponding to a case where two display apparatuses are provided as the output destination apparatuses in the surgery room system 5100. Referring to FIG. 26, the operation screen 5193 is provided with a distribution source selection area 5195, a preview area 5197, and a control area 5201.

In the distribution source selection area 5195, distribution source apparatuses included in the surgery room system 5100 and thumbnail screens representing the display information kept by these distribution source apparatuses are linked and displayed. The user can select display information to be displayed on the display apparatus from any one of the distribution source apparatuses displayed in the distribution source selection area 5195.

In the preview area 5197, previews of screens displayed on the two display apparatuses (Monitor 1 and Monitor 2), which are the output destination apparatuses, are displayed. In the illustrated example, four images are displayed as a picture-in-picture (P-in-P) display on one display apparatus. These four images correspond to the display information distributed from the distribution source apparatus selected in the distribution source selection area 5195. Among the four images, one is displayed relatively large as a main image and the remaining three images are displayed relatively small as sub images. The user can interchange the main image with the sub images by appropriately selecting areas in which the four images are displayed. Furthermore, a status display area 5199 is provided under the areas in which the four images are displayed, and the status relating to the surgery (for example, the elapsed time of the surgery, the body information on the patient, and the like) can be appropriately displayed in this area.

The control area 5201 is provided with a distribution source operation area 5203 in which a graphical user interface (GUI) component for performing operations on the distribution source apparatus is displayed, and an output destination operation area 5205 in which a GUI component for performing operations on the output destination apparatus is displayed. In the illustrated example, GUI components for performing various operations (panning, tilting, and zooming) on a camera of the distribution source apparatus having the imaging function are provided in the distribution source operation area 5203. By appropriately selecting these GUI components, the user can operate working of the camera of the distribution source apparatus. Note that, although illustration is omitted, in a case where the distribution source apparatus being selected in the distribution source selection area 5195 is a recorder (in other words, in a case where an image recorded in the recorder in the past is displayed in the preview area 5197), GUI components for performing operations such as reproduction, reproduction stop, rewind, and fast forward of this past recorded image can be provided in the distribution source operation area 5203.

Furthermore, the output destination operation area 5205 is provided with GUI components for performing various operations (swap, flip, color adjustment, contrast adjustment, switching between two-dimensional (2D) display and three-dimensional (3D) display) with respect to display on the display apparatus, which is the output destination apparatus. By appropriately selecting these GUI components, the user can operate display on the display apparatus.

Note that the operation screen displayed on the centralized operation panel 5111 is not limited to the example illustrated in FIG. 26 and the user can be allowed to input, via the centralized operation panel 5111, operations to each apparatus that is included in the surgery room system 5100 and can be controlled by the audio-visual controller 5107 and the surgery room control apparatus 5109.

Figure 27:
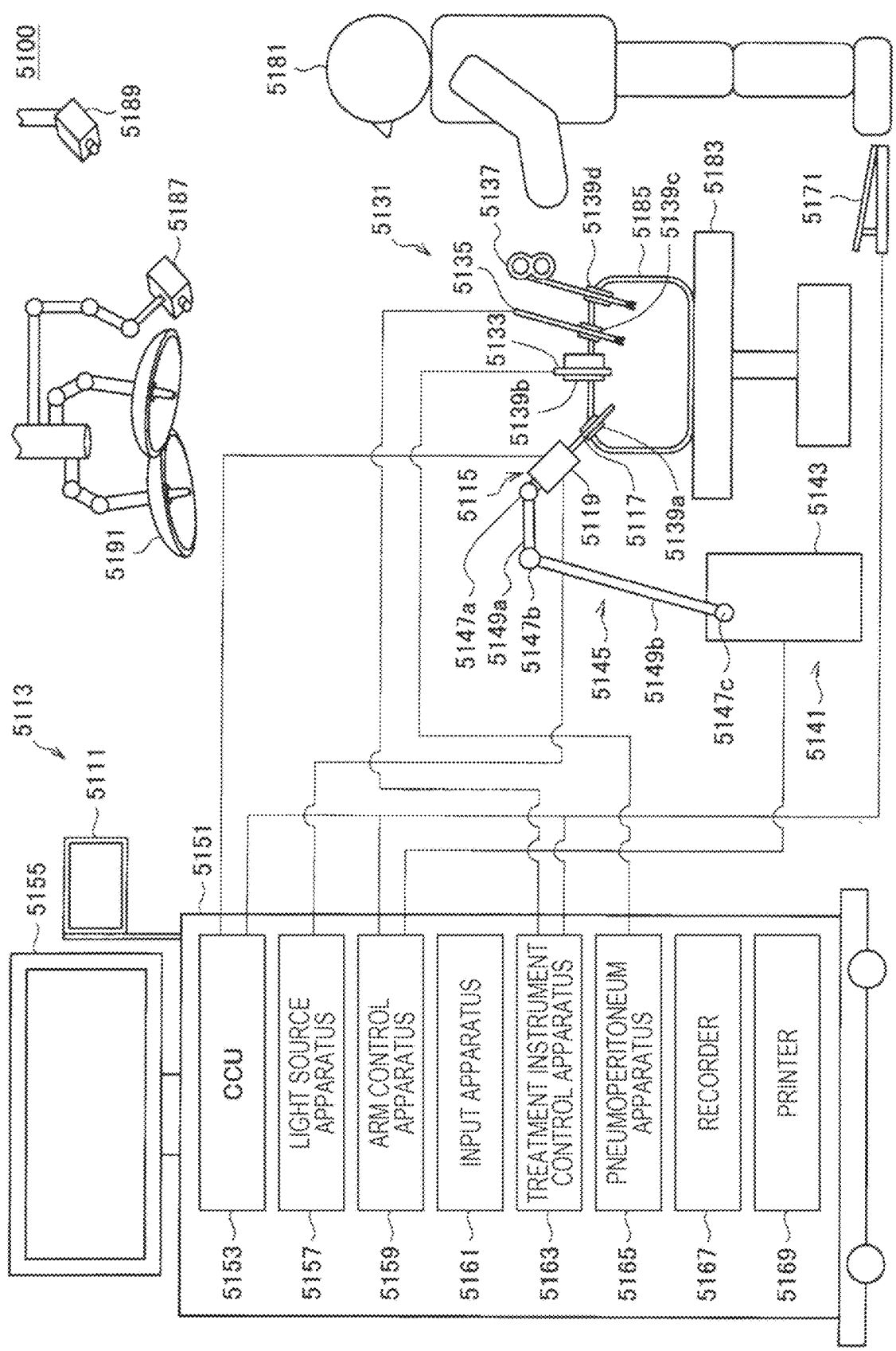
FIG. 27 is a diagram illustrating an example of how a surgery is conducted while the surgery room system is applied.

FIG. 27 is a diagram illustrating an example of how a surgery is conducted while the surgery room system described above is applied. The ceiling camera 5187 and the surgical field camera 5189 are provided on the ceiling of the surgery room and can photograph the area around the hands of a surgeon (physician) 5181 performing the treatment on an affected part of a patient 5185 on the patient bed 5183, and events in the entire surgery room. The ceiling camera 5187 and the surgical field camera 5189 can be provided with a magnification adjustment function, a focal length adjustment function, a photographing direction adjustment function, and the like. The illumination 5191 is provided on the ceiling of the surgery room and irradiates at least the area around the hands of the surgeon 5181. The illumination 5191 can be capable of appropriately adjusting its irradiation light amount, wavelength (color) of the irradiation light, light irradiation direction, and the like.

As illustrated in FIG. 25, the endoscopic surgery system 5113, the patient bed 5183, the ceiling camera 5187, the surgical field camera 5189, and the illumination 5191 are connected to each other so as to be able to cooperate via the audio-visual controller 5107 and the surgery room control apparatus 5109 (not illustrated in FIG. 27). The centralized operation panel 5111 is provided in the surgery room and, as described above, the user can appropriately operate these apparatuses located in the surgery room via this centralized operation panel 5111.

Hereinafter, the configuration of the endoscopic surgery system 5113 will be described in detail. As illustrated in FIG. 27, the endoscopic surgery system 5113 is constituted by an endoscope 5115, other surgical tools 5131, a support arm apparatus 5141 supporting the endoscope 5115, and a cart 5151 in which various apparatuses for surgery through the endoscope are placed.

In endoscopic surgery, instead of cutting the abdominal wall and opening the abdomen, a plurality of cylindrical puncture tools called trocars 5139a to 5139d is punctured into the abdominal wall. Then, a lens barrel 5117 of the endoscope 5115 and other surgical tools 5131 are inserted into the body cavity of the patient 5185 through the trocars 5139*a* to 5139*d*. In the illustrated example, a pneumoperitoneum tube 5133, an energy treatment instrument 5135, and a forceps 5137 are inserted into the body cavity of the patient 5185 as the other surgical tools 5131. Furthermore, the energy treatment instrument 5135 is a treatment instrument that performs incision and detachment of tissue, sealing of a blood vessel, and the like by high-frequency current or ultrasonic vibration. However, the illustrated surgical tools 5131 are merely an example and various surgical tools generally used for surgery through the endoscope, such as a thumb forceps, a retractor, and the like, can be used as the surgical tools 5131.

The image of the surgical site in the body cavity of the patient 5185 photographed by the endoscope 5115 is displayed on a display apparatus 5155. The surgeon 5181 performs treatment, for example, such as cutting off the affected part using the energy treatment instrument 5135 and the forceps 5137 while viewing the image of the surgical site displayed on the display apparatus 5155 in real time. Note that, although illustration is omitted, the pneumoperitoneum tube 5133, the energy treatment instrument 5135, and the forceps 5137 are supported by the surgeon 5181 or an assistant or the like during surgery.

(Support Arm Apparatus)

The support arm apparatus 5141 includes an arm portion 5145 extending from a base portion 5143. In the illustrated example, the arm portion 5145 is constituted by joint portions 5147*a*, 5147*b*, and 5147*c*, and links 5149*a* and 5149*b* and is driven under the control of an arm control apparatus 5159. The endoscope 5115 is supported by the arm portion 5145 such that the position and posture of the endoscope 5115 are controlled. With this configuration, fixing of the position of the endoscope 5115 can be implemented in a stable manner.

(Endoscope)

The endoscope 5115 is constituted by the lens barrel 5117 of which an area of a predetermined length from the distal end is inserted into the body cavity of the patient 5185, and a camera head 5119 connected to the proximal end of the lens barrel 5117. In the illustrated example, the endoscope 5115 configured as a so-called rigid endoscope having the rigid lens barrel 5117 is illustrated; however, the endoscope 5115 may be configured as a so-called flexible endoscope having the flexible lens barrel 5117.

An opening portion into which an objective lens is fitted is provided at the distal end of the lens barrel 5117. A light source apparatus 5157 is connected to the endoscope 5115; light generated by this light source apparatus 5157 is guided to the distal end of the lens barrel 5117 by a light guide provided extending inside this lens barrel, and is radiated toward an object to be observed in the body cavity of the patient 5185 via the objective lens. Note that the endoscope 5115 may be a forward-viewing endoscope, a forward-oblique viewing endoscope, or a side-viewing endoscope.

An optical system and an imaging element are provided inside the camera head 5119 and reflected light (observation light) from the object to be observed is converged on this imaging element by this optical system. The observation light is photoelectrically converted by the imaging element and an electrical signal corresponding to the observation light, in other words, an image signal corresponding to the observation image is generated. This image signal is transmitted as RAW data to a camera control unit (CCU) 5153. Note that the camera head 5119 is equipped with a function of adjusting the magnification and focal length by appropriately driving the optical system thereof.

In addition, for example, in order to cope with stereoscopic viewing (3D display) or the like, a plurality of imaging elements may be provided in the camera head 5119. In this case, a plurality of relay optical systems is provided inside the lens barrel 5117 in order to guide the observation light to each of the plurality of imaging elements.

(Various Apparatuses Placed in Cart)

The CCU 5153 is constituted by a central processing unit (CPU), graphics processing unit (GPU), or the like and comprehensively controls working of the endoscope 5115 and the display apparatus 5155. Specifically, the CCU 5153 carries out various image processes for displaying an image based on the image signal accepted from the camera head 5119, such as a developing process (demosaic process) or the like, on this image. The CCU 5153 provides the image signal on which these image processes have been carried out to the display apparatus 5155. Furthermore, the audio-visual controller 5107 illustrated in FIG. 25 is connected to the CCU 5153. The CCU 5153 also provides the image signal on which the image processes have been carried out to the audio-visual controller 5107. In addition, the CCU 5153 transmits a control signal to the camera head 5119 and controls driving of the camera head 5119. This control signal can include information regarding imaging conditions such as magnification and focal length. This information regarding the imaging conditions may be input via an input apparatus 5161 or may be input via the above-described centralized operation panel 5111.

The display apparatus 5155 displays an image based on the image signal on which the image processes have been carried out by the CCU 5153, under the control of the CCU 5153. In a case where the endoscope 5115 is compatible with high resolution photographing such as 4K photographing (the number of horizontal pixels 3840×the number of vertical pixels 2160), 8K photographing (the number of horizontal pixels 7680×the number of vertical pixels 4320), or the like, and/or is compatible with 3D display, a display apparatus capable of high resolution display and/or capable of 3D display can be used as the display apparatus 5155 so as to cope with each case. In a case where the endoscope 5115 is compatible with high resolution photographing such as 4K or 8K photographing, a more immersive feeling can be obtained by using a display apparatus 5155 having a size of 55 inches or more. Furthermore, a plurality of display apparatuses 5155 with different resolutions and sizes may be provided depending on the practical usage.

The light source apparatus 5157 is constituted, for example, by a light source such as a light emitting diode (LED) and supplies irradiation light used when the surgical site is photographed to the endoscope 5115.

The arm control apparatus 5159 is constituted, for example, by a processor such as a CPU and works in accordance with a predetermined program to control driving of the arm portion 5145 of the support arm apparatus 5141 in accordance with a predetermined control scheme.

The input apparatus 5161 is an input interface to the endoscopic surgery system 5113. The user can input various types of information and input instructions to the endoscopic surgery system 5113 via the input apparatus 5161. For example, the user inputs various types of information regarding surgery, such as body information on the patient and information about the surgical procedure of the surgery, via the input apparatus 5161. Furthermore, for example, the user inputs an instruction to drive the arm portion 5145, an instruction to change the imaging conditions (the type of irradiation light, the magnification, the focal length, and the like) for the endoscope 5115, an instruction to drive the energy treatment instrument 5135, and the like via the input apparatus 5161.

The type of the input apparatus 5161 is not limited and the input apparatus 5161 can be various known input apparatuses. For example, a mouse, a keyboard, a touch panel, a switch, a foot switch 5171, a lever, and/or the like, can be applied as the input apparatus 5161. In a case where a touch panel is used as the input apparatus 5161, the touch panel may be provided on the display surface of the display apparatus 5155.

Alternatively, the input apparatus 5161 is a device worn by the user, such as a glasses-type wearable device, a head mounted display (HMD), or the like, and various inputs are made according to the gesture and the line of sight of the user detected by these devices. Furthermore, the input apparatus 5161 includes a camera capable of detecting the motion of the user and various inputs are made according to the gesture and the line of sight of the user detected from a moving picture captured by the camera. Moreover, the input apparatus 5161 includes a microphone capable of picking up the voice of the user and various inputs are made by sound via the microphone. In this manner, by configuring the input apparatus 5161 so as to be able to input various types of information in a non-contact manner, particularly a user (for example, the surgeon 5181) belonging to a clean area is allowed to operate an instrument belonging to a non-clean area in a non-contact manner. In addition, since the user can operate the instrument without releasing his/her hand from the holding surgical tool, the user's convenience is improved.

A treatment instrument control apparatus 5163 controls driving of the energy treatment instrument 5135 for cauterization and incision of tissue, or sealing of a blood vessel, or the like. For the purpose of securing a visual field of the endoscope 5115 and securing a working space for the surgeon, a pneumoperitoneum apparatus 5165 delivers a gas into the body cavity of the patient 5185 via the pneumoperitoneum tube 5133 in order to inflate the body cavity. A recorder 5167 is an apparatus capable of recording various types of information regarding surgery. A printer 5169 is an apparatus capable of printing various types of information regarding surgery in various formats such as text, image, or graph.

Hereinafter, a particularly characteristic configuration of the endoscopic surgery system 5113 will be described in more detail.

(Support Arm Apparatus)

The support arm apparatus 5141 includes the base portion 5143 as a pedestal and the arm portion 5145 extending from the base portion 5143. In the illustrated example, the arm portion 5145 is constituted by the plurality of joint portions 5147a, 5147b, and 5147c, and the plurality of links 5149a and 5149b coupled by the joint portion 5147b; in FIG. 27, however, for the sake of simplicity, the configuration of the arm portion 5145 is illustrated in a simplified manner. Actually, the shapes, the number, and the arrangement of the joint portions 5147a to 5147c and the links 5149a and 5149b, as well as the directions of the rotation axes of the joint portions 5147a to 5147c, and the like can be appropriately set such that the arm portion 5145 has a desired degree of freedom. For example, the arm portion 5145 can be suitably configured so as to have degrees of freedom equal to or greater than six degrees of freedom. This allows the endoscope 5115 to freely move within the movable range of the arm portion 5145, such that the lens barrel 5117 of the endoscope 5115 can be inserted into the body cavity of the patient 5185 in a desired direction.

Actuators are provided in the joint portions 5147a to 5147c and the joint portions 5147a to 5147c are configured so as to be rotatable around predetermined rotation axes by driving of these actuators. Driving of the actuators is controlled by the arm control apparatus 5159, such that the rotation angle of each of the joint portions 5147a to 5147c is controlled and then driving of the arm portion 5145 is controlled. With this configuration, the control of the position and posture of the endoscope 5115 can be implemented. At this time, the arm control apparatus 5159 can control driving of the arm portion 5145 by various known control schemes such as force control or position control.

For example, the position and posture of the endoscope 5115 can be controlled in such a manner that the surgeon 5181 appropriately makes an operation input via the input apparatus 5161 (including the foot switch 5171) and in turn the arm control apparatus 5159 appropriately controls driving of the arm portion 5145 according to the operation input. With this control, the endoscope 5115 at the distal end of the arm portion 5145 can be moved from an arbitrary position to another arbitrary position and thereafter can be fixedly supported at that position after the movement. Note that the arm portion 5145 may be operated by a so-called master slave scheme. In this case, the arm portion 5145 can be remotely operated by the user via the input apparatus 5161 installed at a place away from the surgery room.

Furthermore, in a case where the force control is applied, the arm control apparatus 5159 may perform so-called power assist control in which the actuators of the respective joint portions 5147a to 5147c are driven in response to an external force from the user such that the arm portion 5145 moves smoothly in proportion to the external force. With this control, when the user moves the arm portion 5145 while directly touching the arm portion 5145, the arm portion 5145 can be moved with a relatively light force. Accordingly, it becomes possible to more intuitively move the endoscope 5115 with a simpler operation and user's convenience can be improved.

Here, in general surgery through the endoscope, the endoscope 5115 has been supported by a medical doctor called a scopist. In contrast to this, using the support arm apparatus 5141 makes it possible to reliably fix the position of the endoscope 5115 without manual operation, such that the image of the surgical site can be stably obtained and surgery can be performed smoothly.

Note that the arm control apparatus 5159 is not necessarily provided in the cart 5151. Furthermore, the arm control apparatus 5159 is not necessarily one apparatus. For example, the arm control apparatus 5159 may be provided in each of the joint portions 5147a to 5147c of the arm portion 5145 of the support arm apparatus 5141 such that control of driving of the arm portion 5145 is implemented by the plurality of arm control apparatuses 5159 collaborating with each other.

(Light Source Apparatus)

The light source apparatus 5157 supplies the endoscope 5115 with irradiation light when the surgical site is photographed. The light source apparatus 5157 is constituted by, for example, an LED, a laser light source, or a white light source constituted by a combination thereof. At this time, in a case where the white light source is configured by a combination of RGB laser light sources, the output intensity and the output timing of each color (each wavelength) can be controlled with high precision and accordingly the white balance of the captured image can be adjusted in the light source apparatus 5157. Furthermore, in this case, by irradiating an object to be observed with a laser beam from each of the RGB laser light sources by time sharing and controlling driving of the imaging element of the camera head 5119 in synchronization with the irradiation timing, it is also possible to capture an image correspond to each of RGB by time sharing. According to this method, a color image can be obtained without providing a color filter in the imaging element.

In addition, driving of the light source apparatus 5157 may be controlled such that the intensity of light to be output is changed for every predetermined time span. By controlling driving of the imaging element of the camera head 5119 in synchronism with the timing of the change of the intensity of light to acquire images by time sharing and merging these images, an image of a high dynamic range without blocked up shadows and blown out highlights can be generated.

Furthermore, the light source apparatus 5157 may be configured such that light of a predetermined wavelength band compatible with special light observation can be supplied from the light source apparatus 5157. In the special light observation, for example, by utilizing the wavelength dependence of light absorption in body tissue, so-called narrow band light observation (narrow band imaging) is performed in which, by radiating narrow band light compared with the irradiation light at the time of ordinary observation (in other words, white light), predetermined tissue such as a blood vessel at a mucosal surface layer is photographed with high contrast. Alternatively, in the special light observation, fluorescence observation for obtaining an image by fluorescence produced by radiating excitation light may be performed. In the fluorescence observation, for example, fluorescence observation in which body tissue is irradiated with excitation light and fluorescence from the body tissue is observed (autofluorescence observation), or fluorescence observation in which a reagent such as indocyanine green (ICG) is locally administered to body tissue and at the same time, the body tissue is irradiated with excitation light corresponding to a fluorescence wavelength of the reagent to obtain a fluorescent image can be performed. The light source apparatus 5157 can be configured such that narrow band light and/or excitation light compatible with such special light observation can be supplied from the light source apparatus 5157.

(Camera Head and CCU)

Figure 28:
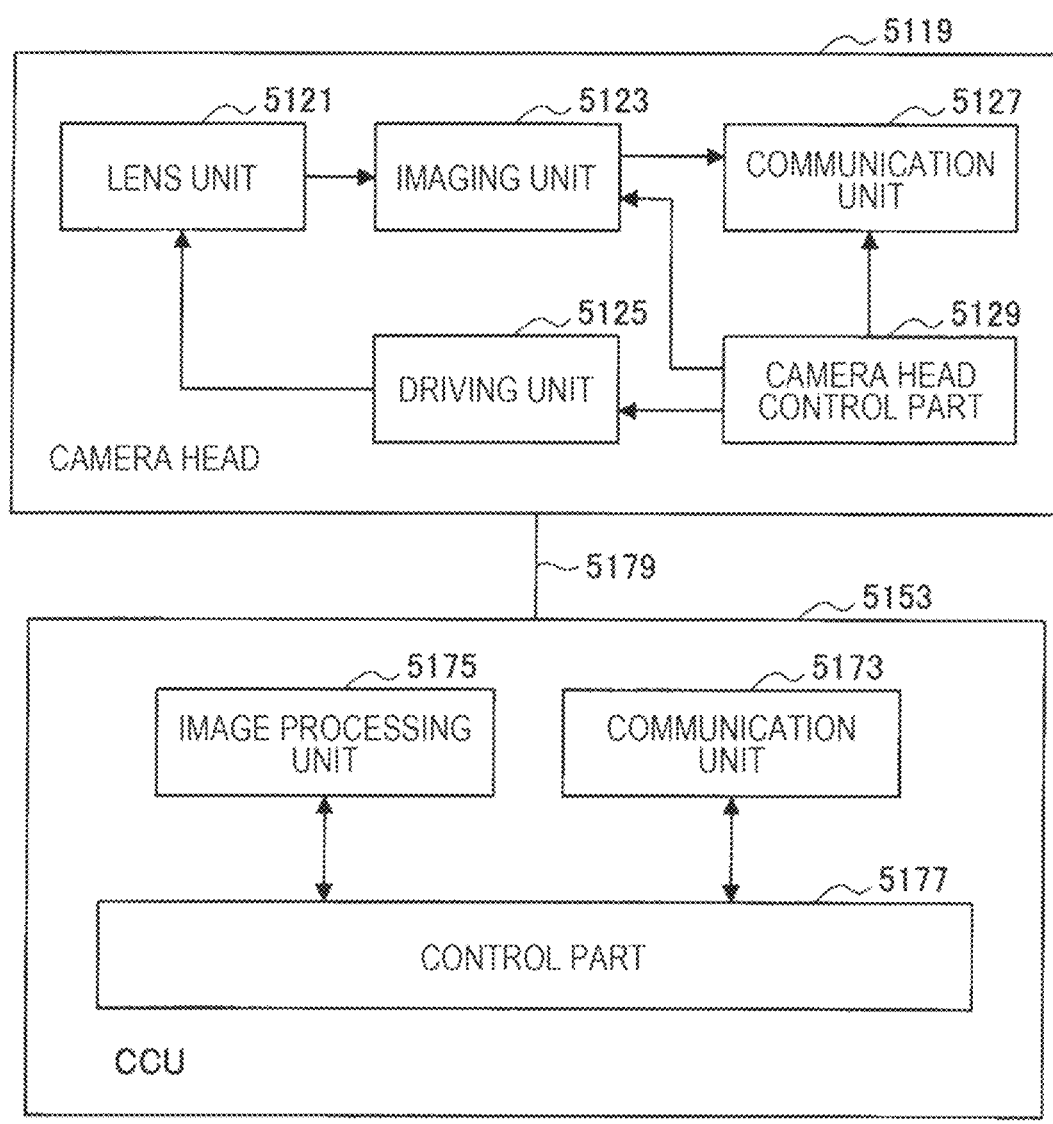
FIG. 28 is a block diagram illustrating an example of functional configurations of a camera head and a camera control unit (CCU) illustrated in FIG. 27.

Referring to FIG. 28, functions of the camera head 5119 and the CCU 5153 of the endoscope 5115 will be described in more detail. FIG. 28 is a block diagram illustrating an example of functional configurations of the camera head 5119 and the CCU 5153 illustrated in FIG. 27.

Referring to FIG. 28, the camera head 5119 has a lens unit 5121, an imaging unit 5123, a driving unit 5125, a communication unit 5127, and a camera head control part 5129 as functions thereof. Furthermore, the CCU 5153 has a communication unit 5173, an image processing unit 5175, and a control part 5177 as functions thereof. The camera head 5119 and the CCU 5153 are connected via a transmission cable 5179 so as to be able to communicate bidirectionally.

First, the functional configuration of the camera head 5119 will be described. The lens unit 5121 is an optical system provided at a connecting portion with the lens barrel 5117. The observation light taken in from the distal end of the lens barrel 5117 is guided to the camera head 5119 and is incident on the lens unit 5121. The lens unit 5121 is constituted by combining a plurality of lenses including a zoom lens and a focus lens. The optical characteristics of the lens unit 5121 are adjusted so as to converge the observation light on a light receiving surface of the imaging element of the imaging unit 5123. Furthermore, the zoom lens and the focus lens are configured such that their positions on an optical axis can move in order to adjust the magnification and focus of the captured image.

The imaging unit 5123 is constituted by the imaging element and is arranged at a subsequent stage of the lens unit 5121. The observation light having passed through the lens unit 5121 is converged on the light receiving surface of the imaging element and an image signal corresponding to the observation image is generated by photoelectric conversion. The image signal generated by the imaging unit 5123 is provided to the communication unit 5127.

For example, an image sensor of the complementary metal oxide semiconductor (CMOS) type capable of photographing a color image having a Bayer array is used as the imaging element constituting the imaging unit 5123. Note that, for example, an imaging element capable of coping with photographing of a high resolution image of 4K or more may be used as the imaging element. Since the image of the surgical site is obtained with high resolution, the surgeon 5181 can grasp how the surgical site is in more detail and can progress the surgery more smoothly.

Furthermore, the imaging element constituting the imaging unit 5123 is configured such that the imaging element constituting the imaging unit 5123 has a pair of imaging elements for separately acquiring image signals for right eye and left eye compatible with the 3D display. Owing to that the 3D display is performed, the surgeon 5181 can more accurately grasp the depth of the living tissue in the surgical site. Note that, in a case where the imaging unit 5123 is configured as a multi-plate type, the lens units 5121 are also provided as a plurality of systems corresponding to respective imaging elements.

Furthermore, the imaging unit 5123 is not necessarily provided in the camera head 5119. For example, the imaging unit 5123 may be provided inside the lens barrel 5117 immediately behind the objective lens.

The driving unit 5125 is constituted by an actuator and moves the zoom lens and the focus lens of the lens unit 5121 by a predetermined distance along the optical axis under the control of the camera head control part 5129. With this movement, the magnification and the focus of the captured image by the imaging unit 5123 can be appropriately adjusted.

The communication unit 5127 is constituted by a communication apparatus for transmitting and receiving various types of information to and from the CCU 5153. The communication unit 5127 transmits the image signal obtained from the imaging unit 5123 as RAW data to the CCU 5153 via the transmission cable 5179. At this time, in order to display the captured image of the surgical site with low latency, it is preferred that the image signal be transmitted by optical communication. This is because the surgeon 5181 performs surgery while observing the state of the affected part with the captured image and thus, for more safe and reliable surgery, the moving image of the surgical site is required to be displayed in real time as much as possible during surgery. In a case where optical communication is performed, a photoelectric conversion module that converts the electrical signal into an optical signal is provided in the communication unit 5127. The image signal is converted into an optical signal by the photoelectric conversion module and then transmitted to the CCU 5153 via the transmission cable 5179.

Furthermore, the communication unit 5127 receives the control signal for controlling driving of the camera head

5119 from the CCU 5153. This control signal may include information regarding imaging conditions, such as information to specify a frame rate of the captured image, information to specify an exposure value at the time of imaging, information to specify the magnification and focus of the captured image, and/or the like. The communication unit 5127 provides the received control signal to the camera head control part 5129. Note that the control signal from the CCU 5153 may also be transmitted by optical communication. In this case, the communication unit 5127 is provided with a photoelectric conversion module that converts the optical signal into an electrical signal; the control signal is converted into an electrical signal by this photoelectric conversion module and then provided to the camera head control part 5129.

Note that the above-mentioned imaging conditions such as the frame rate, exposure value, magnification, and focus are automatically set by the control part 5177 of the CCU 5153 on the basis of the acquired image signal. That is, so-called auto exposure (AE) function, auto focus (AF) function, and auto white balance (AWB) function are equipped in the endoscope 5115.

The camera head control part 5129 controls driving of the camera head 5119 on the basis of the control signal received from the CCU 5153 via the communication unit 5127. For example, the camera head control part 5129 controls driving of the imaging element of the imaging unit 5123 on the basis of information to specify the frame rate of the captured image and/or information to specify exposure at the time of imaging. Furthermore, for example, the camera head control part 5129 appropriately moves the zoom lens and the focus lens of the lens unit 5121 via the driving unit 5125 on the basis of information to specify the magnification and focus of the captured image. The camera head control part 5129 may further include a function of storing information for identifying the lens barrel 5117 and the camera head 5119.

Note that, by arranging constituents such as the lens unit 5121 and the imaging unit 5123 in a hermetically sealed structure having high airtightness and waterproofness, the camera head 5119 is enabled to have resistance to an autoclave sterilization process.

Next, the functional configuration of the CCU 5153 will be described. The communication unit 5173 is constituted by a communication apparatus for transmitting and receiving various types of information to and from the camera head 5119. The communication unit 5173 receives the image signal transmitted from the camera head 5119 via the transmission cable 5179. At this time, as described above, the image signal can be suitably transmitted by optical communication. In this case, a photoelectric conversion module that converts the optical signal into an electrical signal is provided in the communication unit 5173 so as to be compatible with the optical communication. The communication unit 5173 provides the image signal converted into the electrical signal to the image processing unit 5175.

Furthermore, the communication unit 5173 transmits the control signal for controlling driving of the camera head 5119 to the camera head 5119. This control signal can also be transmitted by optical communication.

The image processing unit 5175 carries out various image processes on the image signal, which is RAW data transmitted from the camera head 5119. Examples of these image processes include various known signal processes such as a developing process, a high image quality process (a band enhancement process, a super resolution process, a noise reduction (NR) process, a camera shake correction process, and/or the like), an enlargement process (electronic zoom process), and/or the like. Furthermore, the image processing unit 5175 performs a wave sensing process on the image signal for performing AE, AF, and AWB.

The image processing unit 5175 is constituted by a processor such as a CPU and a GPU and the above-described image processes and wave sensing process can be performed by this processor working in accordance with a predetermined program. Note that, in a case where the image processing unit 5175 is constituted by a plurality of GPUs, the image processing unit 5175 appropriately divides the information associated with the image signal and performs the image processes in parallel by the plurality of GPUs.

The control part 5177 performs various types of control relating to imaging of the surgical site by the endoscope 5115 and display of the captured image obtained by the imaging. For example, the control part 5177 generates a control signal for controlling driving of the camera head 5119. At this time, in a case where the imaging conditions have been input by the user, the control part 5177 generates the control signal on the basis of the input by the user. Alternatively, in a case where the AE function, the AF function, and the AWB function are equipped in the endoscope 5115, the control part 5177 appropriately calculates the optimum exposure value, focal length, and white balance according to the result of the wave sensing process by the image processing unit 5175 and generates the control signal.

Furthermore, the control part 5177 displays the image of the surgical site on the display apparatus 5155 on the basis of the image signal on which the image processes have been carried out by the image processing unit 5175. At this time, the control part 5177 recognizes various objects in the image of the surgical site using various image recognition technologies. For example, the control part 5177 detects the shape, color, and the like of the edge of an object included in the image of the surgical site, thereby being able to recognize a surgical tool such as the forceps, a particular living body part, bleeding, a mist at the time of using the energy treatment instrument 5135, and the like. When displaying the image of the surgical site on the display apparatus 5155, the control part 5177 displays various types of surgery support information superimposed onto this image of the surgical site using results of the recognition. Since the surgery support information is displayed superimposed and presented to the surgeon 5181, surgery can be advanced more safely and reliably.

The transmission cable 5179 connecting the camera head 5119 and the CCU 5153 is an electrical signal cable compatible with communication of electrical signals, an optical fiber compatible with optical communication, or a composite cable thereof.

Here, in the illustrated example, communication is performed by wire using the transmission cable 5179; however, communication between the camera head 5119 and the CCU 5153 may be performed wirelessly. In a case where the communication between the camera head 5119 and the CCU 5153 is performed wirelessly, it is no longer necessary to lay the transmission cable 5179 in the surgery room, such that the situation in which the movement of the medical staff in the surgery room is hindered by the transmission cable 5179 can be solved.

An example of the surgery room system 5100 to which the technology according to the present disclosure can be applied has been described thus far. Note that, as an example, a case where a medical system to which the surgery room system 5100 is applied is the endoscopic surgery system 5113 has been described here; however, the configuration of the surgery room system 5100 is not limited to this example. For example, the surgery room system 5100 may be applied to a flexible endoscope system for examination or a microscope surgery system instead of the endoscopic surgery system 5113.

Among the above-described constituents, the technology according to the present disclosure can be suitably applied to an image captured by an imaging apparatus such as the surgical field camera 5189, the ceiling camera 5187, or the like.

For example, in the surgery room system 5100 described above, it is conceivable that a plurality of surgical field cameras 5189 is provided and images captured by the respective surgical field cameras 5189 are used for analysis of the situation in the surgery room (for example, analysis of movement of persons in the surgery room, or the like) or observation of the patient. More specifically, it is conceivable that the plurality of surgical field cameras 5189 separately images the movement of a person in the surgery room, the arrangement of the instruments, and the like, and the situation in the surgery room is analyzed on the basis of an image obtained by merging or interpolating a plurality of captured images obtained by the imaging.

In this case, for example, the present technology can be applied to the plurality of surgical field cameras 5189 as "plurality of imaging apparatuses" and the audio-visual controller 5107, for example, as "frame selecting unit" and "integrating and sending unit".

Furthermore, in the surgery room system 5100 described above, a captured image of a camera put on a surgeon or a medical staff can be used for analysis of the situation in the surgery room and observation of the patient. In this case, the present technology can be applied to a plurality of cameras put on the surgeon and the medical staff as "plurality of imaging apparatuses" and the audio-visual controller 5107, for example, as "frame selecting unit" and "integrating and sending unit".

Furthermore, in the above description, an example of merging a plurality of captured images captured by a plurality of cameras has been cited; however, a plurality of captured images captured at different timings by a single camera can be merged and used for medical analysis. For example, in pathological image analysis such as digital pathology imaging (DPI), a plurality of captured images at different timings is obtained by a single camera in such a manner that the single camera that images a table for placing a pathological specimen (for example, a slide with a pathological section put down thereon) is fixedly arranged and the table side is moved, or alternatively, a plurality of captured images at different timings is obtained by fixing the table side and moving the camera side; in this case, this plurality of captured images at different timings can be merged and used for pathological image analysis. Note that, in the DPI, a plurality of images obtained by scanning a pathological section with a camera as described above is stitched to obtain an overhead view image and the pathological image analysis can be performed on the basis of this overhead view image.

8-2. Second Application Example

The technology according to the present disclosure may be implemented as an apparatus to be equipped in any type of moving body such as automobile, electric automobile, hybrid electric automobile, motorcycle, bicycle, personal mobility, airplane, drone, ship, robot, construction machine, and agricultural machine (tractor).

Figure 29:
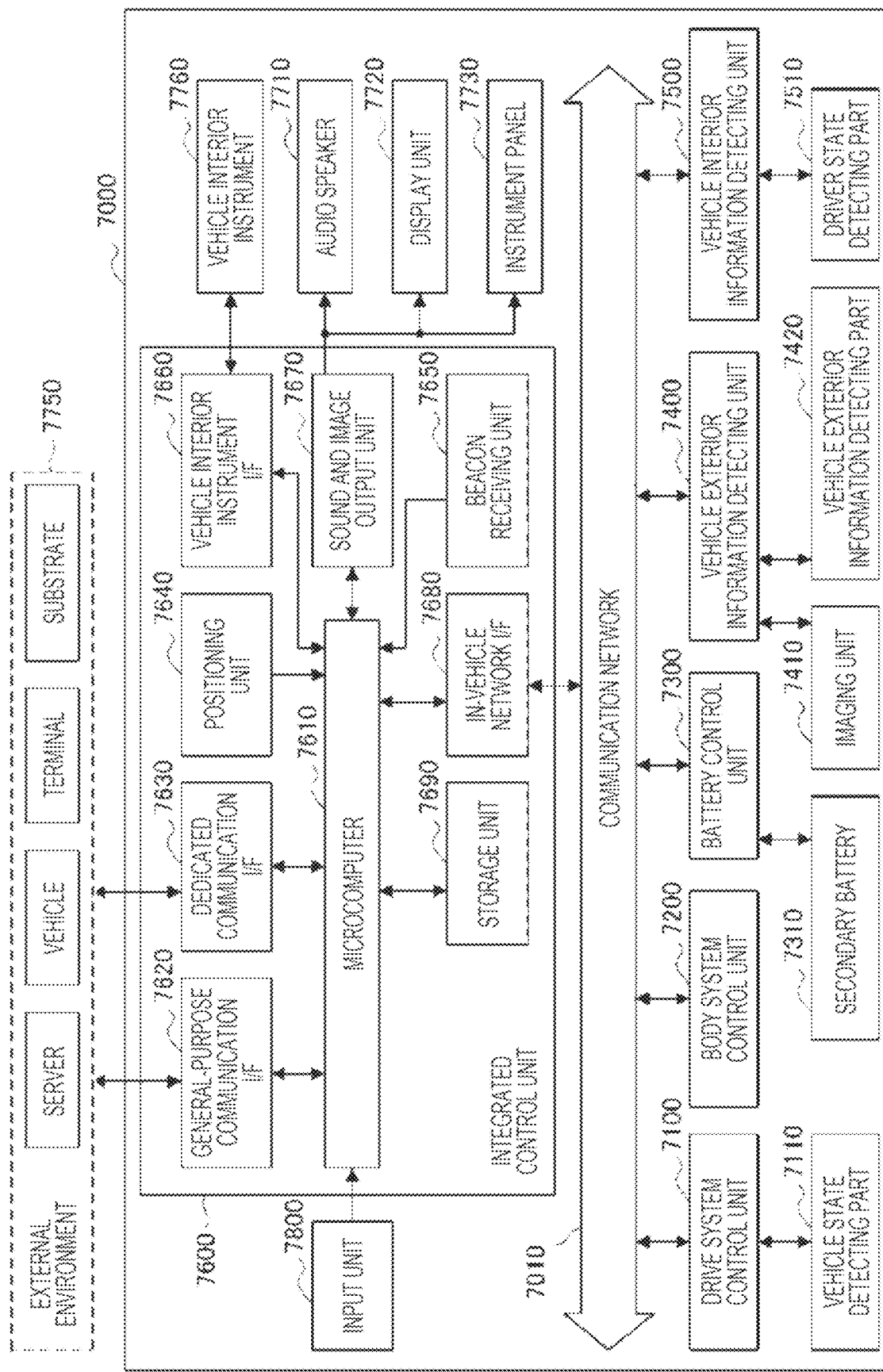
FIG. 29 is a block diagram illustrating an example of an outline of the configuration of a vehicle control system.

FIG. 29 is a block diagram illustrating an outline of a configuration example of a vehicle control system 7000, which is an example of a moving body control system to which the technology according to the present disclosure can be applied. The vehicle control system 7000 includes a plurality of electronic control units connected via a communication network 7010. In the example illustrated in FIG. 29, the vehicle control system 7000 includes a drive system control unit 7100, a body system control unit 7200, a battery control unit 7300, a vehicle exterior information detecting unit 7400, a vehicle interior information detecting unit 7500, and an integrated control unit 7600. The communication network 7010 connecting this plurality of control units can be an in-vehicle communication network conforming to an arbitrary standard such as a controller area network (CAN), a local interconnect network (LIN), a local area network (LAN), FlexRay (registered trademark), and the like.

Each control unit includes a microcomputer that performs computational processes in accordance with various programs, a storage unit that stores programs executed by the microcomputer or parameters used for various computational tasks, and the like, and a drive circuit that drives various apparatuses to be controlled. Each control unit includes a network I/F for communicating with another control unit via the communication network 7010 and also includes a communication I/F for performing communication with apparatuses or a sensor or the like inside and outside the vehicle by wired communication or wireless communication. In FIG. 29, a microcomputer 7610, a general-purpose communication I/F 7620, a dedicated communication I/F 7630, a positioning unit 7640, a beacon receiving unit 7650, a vehicle interior instrument I/F 7660, a sound and image output unit 7670, an in-vehicle network I/F 7680, and a storage unit 7690 are illustrated as a functional configuration of the integrated control unit 7600. Similarly, the other control units each include a microcomputer, a communication I/F, a storage unit, and the like.

The drive system control unit 7100 controls working of an apparatus related to a drive system of the vehicle in accordance with various programs. For example, the drive system control unit 7100 functions as a driving force generating apparatus for generating a driving force of the vehicle, such as an internal combustion engine or a driving motor, a driving force transmitting mechanism for transmitting a driving force to wheels, a steering mechanism that regulates a steer angle of the vehicle, and a control apparatus such as a braking apparatus that generates a braking force of the vehicle. The drive system control unit 7100 may have a function as a control apparatus such as an antilock brake system (ABS) or an electronic stability control (ESC).

A vehicle state detecting part 7110 is connected to the drive system control unit 7100. For example, the vehicle state detecting part 7110 includes a gyro sensor that detects an angular velocity of the axial rotational motion of a vehicle body, an acceleration sensor that detects the acceleration of the vehicle, or at least one of sensors for detecting an operation amount of an accelerator pedal, an operation amount of a brake pedal, a steering angle of a steering wheel, engine speed, a rotation speed of the wheel, and the like. The drive system control unit 7100 performs computational processes using a signal input from the vehicle state detecting part 7110 and controls the internal combustion engine, the driving motor, an electric power steering apparatus, a brake apparatus, or the like.

The body system control unit 7200 controls working of various apparatuses mounted in the vehicle body in accordance with various programs. For example, the body system control unit 7200 functions as a keyless entry system, a smart key system, a power window apparatus, or a control apparatus for various lamps such as a headlamp, a back lamp, a brake lamp, a turn signal lamp, a fog lamp, or the like. In this case, the body system control unit 7200 can accept input of a radio wave distributed from a portable device that substitutes a key or signals from various switches. The body system control unit 7200 accepts input of the above-mentioned radio wave or signals and controls a door lock apparatus, the power window apparatus, the lamp, and the like of the vehicle.

The battery control unit 7300 controls a secondary battery 7310, which is a power supply source of the driving motor, in accordance with various programs. For example, information such as a battery temperature, a battery output voltage, a remaining capacity of the battery, or the like is input to the battery control unit 7300 from a battery apparatus including the secondary battery 7310. The battery control unit 7300 performs computational processes using these signals and controls temperature regulation for the secondary battery 7310 or a cooling apparatus or the like included in the battery apparatus.

The vehicle exterior information detecting unit 7400 detects information outside the vehicle equipped with the vehicle control system 7000. For example, at least one of an imaging unit 7410 or a vehicle exterior information detecting part 7420 is connected to the vehicle exterior information detecting unit 7400. The imaging unit 7410 includes at least one of a time-of-flight (ToF) camera, a stereo camera, a monocular camera, an infrared camera, and other cameras. The vehicle exterior information detecting part 7420 includes at least one of, for example, an environmental sensor for detecting the current weather or meteorology, or an ambient information detecting sensor for detecting another vehicle, an obstacle, a pedestrian, and the like around the vehicle equipped with the vehicle control system 7000.

The environmental sensor can be, for example, at least one of a raindrop sensor for detecting rain, a fog sensor for detecting fog, a sunshine sensor for detecting sunshine degree, or a snow sensor for detecting snowfall. The ambient information detecting sensor can be at least one of an ultrasonic sensor, a radar apparatus, or a light detection and ranging or laser imaging detection and ranging (LIDAR) apparatus. The imaging unit 7410 and the vehicle exterior information detecting part 7420 described above may be each provided as independent sensors or apparatuses, or may be provided as an apparatus in which a plurality of sensors or apparatuses is integrated.

Figure 30:
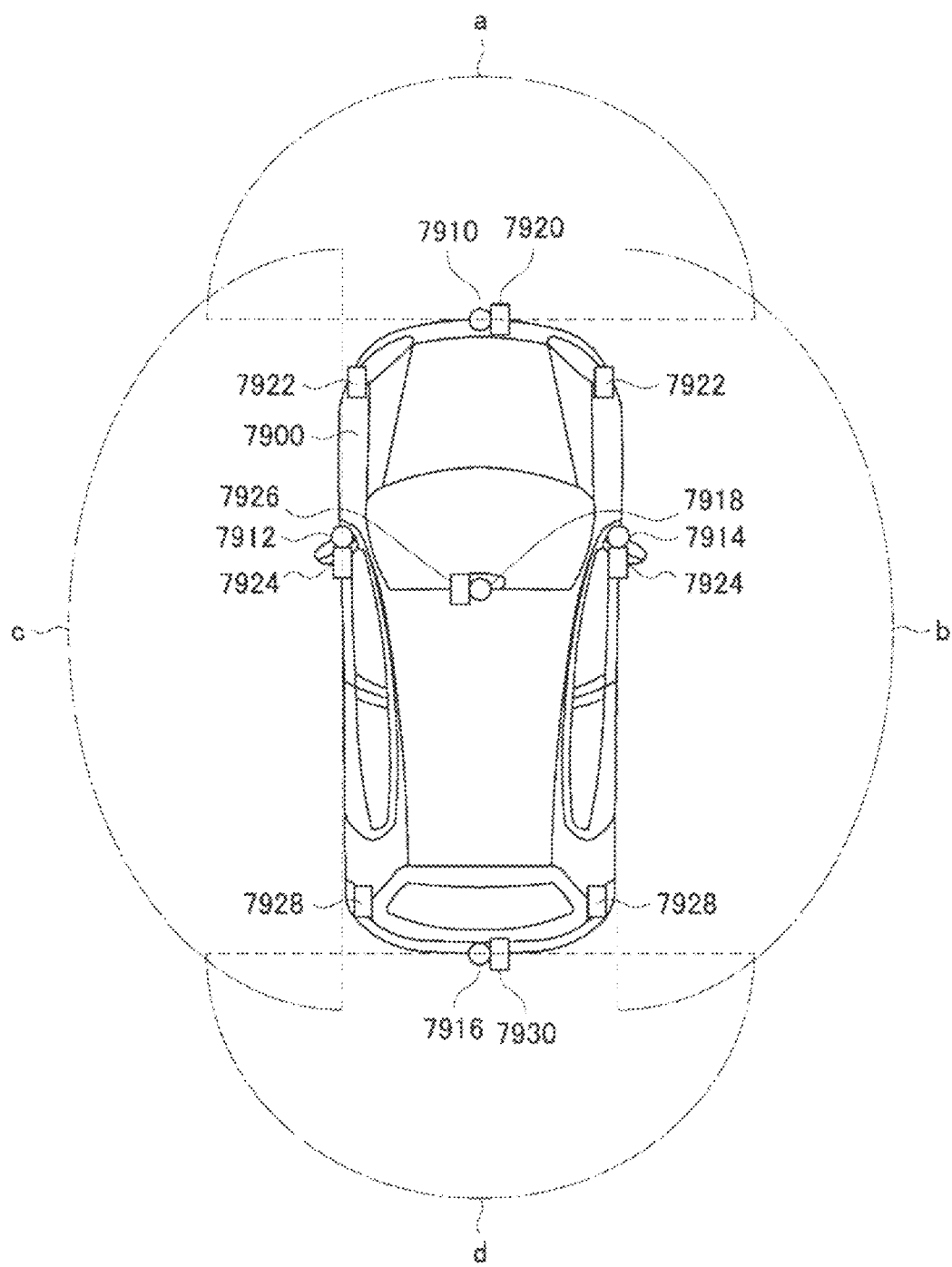
FIG. 30 is an explanatory diagram illustrating an example of installation positions of vehicle exterior information detecting parts and imaging units.

Here, FIG. 30 illustrates an example of installation positions of the imaging units 7410 and the vehicle exterior information detecting parts 7420. For example, imaging units 7910, 7912, 7914, 7916, and 7918 are provided at at least one position of a front nose, a side mirror, a rear bumper, a back door, and an upper portion of a windshield in a passenger compartment of a vehicle 7900. The imaging unit 7910 provided at the front nose and the imaging unit 7918 provided at the upper portion of the windshield in the passenger compartment mainly acquire an image ahead of the vehicle 7900. The imaging units 7912 and 7914 provided at the side mirrors mainly acquire images of the sides of the vehicle 7900. The imaging unit 7916 provided at the rear bumper or the back door mainly acquires an image behind the vehicle 7900. The imaging unit 7918 provided at the upper portion of the windshield in the passenger compartment is mainly used for detecting a preceding vehicle, a pedestrian, an obstacle, a traffic signal, a traffic sign, a lane, or the like.

Note that FIG. 30 illustrates an example of photographing ranges of the respective imaging units 7910, 7912, 7914, and 7916. An imaging range a indicates an imaging range of the imaging unit 7910 provided at the front nose, imaging ranges b and c indicate imaging ranges of the imaging units 7912 and 7914 provided at the side mirrors, respectively, and an imaging range d indicates an imaging range of the imaging unit 7916 provided at the rear bumper or the back door. For example, by overlapping image data captured by the imaging units 7910, 7912, 7914, and 7916, an overhead view image of the vehicle 7900 viewed from above is obtained.

Vehicle exterior information detecting parts 7920, 7922, 7924, 7926, 7928, and 7930 provided at the front, rear, sides, corners, and the upper portion of the windshield in the passenger compartment of the vehicle 7900 can be, for example, ultrasonic sensors or radar apparatuses. The vehicle exterior information detecting parts 7920, 7926, and 7930 provided at the front nose, the rear bumper or the back door, and the upper portion of the windshield in the passenger compartment of the vehicle 7900 can be, for example, LIDAR apparatuses. These vehicle exterior information detecting parts 7920 to 7930 are mainly used for detecting a preceding vehicle, a pedestrian, an obstacle, or the like.

Returning to FIG. 29, the explanation will be continued. The vehicle exterior information detecting unit 7400 causes the imaging unit 7410 to capture an image of the outside of the vehicle and receives the captured image data. Furthermore, the vehicle exterior information detecting unit 7400 receives detection information from the connected vehicle exterior information detecting part 7420. In a case where the vehicle exterior information detecting part 7420 is an ultrasonic sensor, radar apparatus or a LIDAR apparatus, the vehicle exterior information detecting unit 7400 causes the vehicle exterior information detecting part 7420 to distribute ultrasonic waves, electromagnetic waves, or the like, and receives information on reflected waves that have been received. The vehicle exterior information detecting unit 7400 may perform an object detection process or a distance detection process for a person, a car, an obstacle, a sign, a character on a road surface, or the like on the basis of the received information. The vehicle exterior information detecting unit 7400 may perform an environment recognition process for recognizing rainfall, fog, road surface condition, or the like on the basis of the received information. The vehicle exterior information detecting unit 7400 may calculate a distance to an object outside the vehicle on the basis of the received information.

Furthermore, the vehicle exterior information detecting unit 7400 may perform an image recognition process or a distance detection process for recognizing a person, a car, an obstacle, a sign, a character on a road surface, or the like on the basis of the received image data. The vehicle exterior information detecting unit 7400 may perform processes such as distortion correction or registration on the received image data and also merge the image data captured by different imaging units 7410 to generate an overhead view image or a panoramic image. The vehicle exterior information detecting unit 7400 may perform a viewpoint conversion process using image data captured by different imaging units 7410.

The vehicle interior information detecting unit 7500 detects information inside the vehicle. For example, a driver state detecting part 7510 that detects the state of the driver is connected to the vehicle interior information detecting unit 7500. The driver state detecting part 7510 may include a camera that images the driver, a biometric sensor that detects biological information on the driver, a microphone that collects sound in the passenger compartment, and the like. The biometric sensor is provided, for example, on a seating surface or a steering wheel or the like and detects biometric information on an occupant sitting on a seat or the driver gripping the steering wheel. The vehicle interior information detecting unit 7500 may calculate the degree of fatigue or the degree of concentration of the driver or may discriminate whether the driver is dozing off, on the basis of detection information input from the driver state detecting part 7510. The vehicle interior information detecting unit 7500 may perform a process such as a noise canceling process on the collected sound signal.

The integrated control unit 7600 controls the whole working of the vehicle control system 7000 in accordance with various programs. An input unit 7800 is connected to the integrated control unit 7600. The input unit 7800 is implemented by an apparatus that can be operated by an occupant to input, such as a touch panel, a button, a microphone, a switch, a lever, or the like. The integrated control unit 7600 may accept data obtained by performing sound recognition on sound input by the microphone. The input unit 7800 may be, for example, a remote control apparatus using infrared rays or other radio waves, or an external connection instrument compatible with the operation of the vehicle control system 7000, such as a mobile phone or a personal digital assistant (PDA). The input unit 7800 may be, for example, a camera, in which case the occupant can input information by gesture. Alternatively, data obtained by detecting the motion of the wearable apparatus worn by the occupant may be input. Moreover, the input unit 7800 may include, for example, an input control circuit or the like that generates an input signal on the basis of information input by the occupant or the like using the above-described input unit 7800 and outputs the generated input signal to the integrated control unit 7600. By operating this input unit 7800, the occupant or the like inputs various types of data to the vehicle control system 7000 or instructs the vehicle control system 7000 on processing working.

The storage unit 7690 may include a read only memory (ROM) that stores various programs to be executed by the microcomputer, and a random access memory (RAM) that stores various parameters, computational results, sensor values, and the like. Furthermore, the storage unit 7690 may be implemented by a magnetic storage device such as a hard disc drive (HDD), a semiconductor storage device, an optical storage device, a magneto-optical storage device, or the like.

The general-purpose communication I/F 7620 is a communication I/F for general purposes that mediates communication with a variety of instruments present in an external environment 7750. The general-purpose communication I/F 7620 may be prepared with a cellular communication protocol such as global system of mobile communications (GSM) (registered trademark), WiMAX (registered trademark), long term evolution (LTE) (registered trademark), or LTE-Advanced (LTE-A), or other wireless communication protocols such as wireless LAN (also referred to as Wi-Fi (registered trademark)), or Bluetooth (registered trademark). The general-purpose communication I/F 7620 may connect to an instrument (for example, an application server or a control server) present on an external network (for example, the Internet, a cloud network, or a company's own network) via a base station or an access point, for example. Furthermore, the general-purpose communication I/F 7620 may use, for example, a peer-to-peer (P2P) technology to connect to a terminal present in the vicinity of the vehicle (for example, a terminal of the driver, a pedestrian, or a shop, or a machine type communication (MTC) terminal).

The dedicated communication I/F 7630 is a communication I/F supporting a communication protocol formulated for use in a vehicle. For example, the dedicated communication I/F 7630 can be prepared with a standard protocol such as wireless access in vehicle environment (WAVE) or dedicated short range communications (DSRC), which are a combination of the lower layer IEEE 802.11p and the upper layer IEEE 1609, or a cellular communication protocol. Typically, the dedicated communication I/F 7630 realizes vehicle-to-everything (V2X) communication, which is a concept including one or more of vehicle-to-vehicle communication, vehicle-to-infrastructure communication, vehicle-to-home communication, and vehicle-to-pedestrian communication.

For example, the positioning unit 7640 receives a global navigation satellite system (GNSS) signal from a GNSS satellite (for example, a global positioning system (GPS) signal from a GPS satellite) to execute positioning and generates position information including the latitude, longitude, and altitude of the vehicle. Note that the positioning unit 7640 may distinguish the current position by exchanging signals with a wireless access point or may acquire the position information from a terminal having a positioning function, such as a mobile phone, a personal handy-phone system (PHS), or a smartphone.

The beacon receiving unit 7650 receives, for example, radio waves or electromagnetic waves distributed from a wireless station or the like installed on the road and acquires information on the current position, congestion, road closure, required time, or the like. Note that the function of the beacon receiving unit 7650 may be included in the dedicated communication I/F 7630 described above.

The vehicle interior instrument I/F 7660 is a communication interface that mediates connection between the microcomputer 7610 and a variety of vehicle interior instruments 7760 present in the vehicle. The vehicle interior instrument I/F 7660 may establish a wireless connection using a wireless communication protocol such as wireless LAN, Bluetooth (registered trademark), near field communication (NFC), or wireless USB (WUSB). Furthermore, the vehicle interior instrument I/F 7660 may establish a wired connection such as a universal serial bus (USB), high-definition multimedia interface (HDMI) (registered trademark), or mobile high-definition link (MHL), via a connection terminal (not illustrated) (and a cable, if necessary). The vehicle interior instruments 7760 may include, for example, at least one of a mobile instrument or a wearable instrument carried by an occupant, or an information instrument brought in or attached to the vehicle. In addition, the vehicle interior instruments 7760 may include a navigation apparatus that searches for a route to an arbitrary destination. The vehicle interior instrument I/F 7660 exchanges control signals or data signals with these vehicle interior instruments 7760.

The in-vehicle network I/F 7680 is an interface that mediates communication between the microcomputer 7610 and the communication network 7010. The in-vehicle network I/F 7680 transmits and receives signals and the like in compliance with a predetermined protocol supported by the communication network 7010.

The microcomputer 7610 of the integrated control unit 7600 controls the vehicle control system 7000 in accordance with various programs on the basis of information acquired via at least one of the general-purpose communication I/F 7620, the dedicated communication I/F 7630, the positioning unit 7640, the beacon receiving unit 7650, the vehicle interior instrument I/F 7660, and the in-vehicle network I/F 7680. For example, the microcomputer 7610 may compute a control target value for the driving force generating apparatus, the steering mechanism, or the braking apparatus on the basis of the acquired information inside and outside the vehicle, and output a control command to the drive system control unit 7100. For example, the microcomputer 7610 may perform coordinative control for the purpose of implementing the function of advanced driver assistance system (ADAS) including vehicle collision avoidance or impact mitigation, follow-up running based on inter-vehicle distance, vehicle speed maintenance running, vehicle collision warning, vehicle lane departure warning, or the like. Furthermore, the microcomputer 7610 may control the driving force generating apparatus, the steering mechanism, the braking apparatus, or the like on the basis of the acquired information around the vehicle so as to perform coordinative control for the purpose of, for example, the automatic driving in which the vehicle autonomously runs without depending on the operation by the driver.

On the basis of information acquired via at least one of the general-purpose communication I/F 7620, the dedicated communication I/F 7630, the positioning unit 7640, the beacon receiving unit 7650, the vehicle interior instrument I/F 7660, and the in-vehicle network I/F 7680, the microcomputer 7610 may generate three-dimensional distance information between the vehicle and a surrounding structure, object such as person, or the like, to create local map information including surrounding information on the current position of the vehicle. Furthermore, the microcomputer 7610 may generate a warning signal by predicting danger such as collision with a vehicle, a pedestrian or the like coming nearer, or entry into a road closed, on the basis of the acquired information. The warning signal may be, for example, a signal for producing a warning sound or for turning on a warning lamp.

The sound and image output unit 7670 transmits an output signal of at least one of a sound and an image to an output apparatus capable of visually or audibly notifying the occupant of the vehicle or the outside of the vehicle of information. In the example in FIG. 29, an audio speaker 7710, a display unit 7720, and an instrument panel 7730 are exemplified as output apparatuses. For example, the display unit 7720 may include at least one of an on-board display and a head-up display. The display unit 7720 may have an augmented reality (AR) display function. The output apparatus can be an apparatus other than the above-mentioned apparatuses, such as a headphone, a wearable device such as a glasses-type display worn by an occupant, a projector, or a lamp. In a case where the output apparatus is a display apparatus, the display apparatus visually displays a result obtained by various processes performed by the microcomputer 7610 or information received from another control unit in a variety of formats such as text, image, table, or graph. Furthermore, in a case where the output apparatus is a sound output apparatus, the sound output apparatus converts an audio signal made up of reproduced sound data, acoustic data, or the like into an analog signal and audibly outputs the converted analog signal.

Note that, in the example illustrated in FIG. 29, at least two control units connected via the communication network 7010 may be unified as one control unit. Alternatively, each control unit may be constituted by a plurality of control units. Moreover, the vehicle control system 7000 may include another control unit not illustrated. Furthermore, in the above description, some or all of the functions allocated to one of the control units may be given to another control unit. That is, as long as information is transmitted and received via the communication network 7010, a predetermined computational process may be performed by one of the control units. Similarly, a sensor or an apparatus connected to one of the control units may be connected to another control unit and also a plurality of control units may transmit and receive detection information with each other via the communication network 7010.

Among the above-described constituents, the technology according to the present disclosure can be suitably applied to an image captured by an imaging apparatus such as the imaging units 7910, 7912, 7914, 7916, and the like.

For example, in the above-described vehicle control system 7000, it is conceivable to employ a configuration for uploading images captured by imaging units 7910, 7912, 7914, and 7916 that capture images around the vehicle, to an information processing apparatus such as a cloud server present in the external environment 7750, via the general-purpose communication I/F 7620. In this case, the information processing apparatus can use a plurality of captured images that has been uploaded for creation of map information or generation of an image for the street view function (a function of providing a panoramic photograph of a landscape along a road). For example, the present technology can be applied to when a plurality of captured images by the imaging units 7910, 7912, 7914, and 7916 is sent in this case. In other words, the present technology can be applied to the imaging units 7910, 7912, 7914, and 7916, for example, as "plurality of imaging apparatuses" and the integrated control unit 7600 or the like, for example, as "frame selecting unit" and "integrating and sending unit".

Furthermore, conceivable functions using an in-vehicle camera include a function of presenting an image obtained by merging an image captured by a camera equipped in an object vehicle (hereinafter referred to as "object vehicle camera"), and an image captured by a camera installed at an intersection or a camera equipped in a vehicle different from the object vehicle (hereinafter referred to as "another vehicle camera"), to a driver of the object vehicle to visualize a blind spot of the driver (for example, an intersection surrounded by a fence, or the like); in this case, the present technology can also be applied to the above-described object vehicle camera and the camera installed at the intersection or the another vehicle camera as "plurality of imaging apparatuses".

9. PROGRAM

In the above description, an example in which working of the image transfer apparatus according to the present technology is implemented by hardware has been cited; however, the working can also be implemented by software processing by an information processing apparatus.

A program that implements the software processing is a program that causes an information processing apparatus to implement: a frame selecting function of using a vertical synchronization signal input from a particular imaging apparatus among a plurality of imaging apparatuses that capture moving images as a reference to select frame image data items from moving image data input from the plurality of imaging apparatuses; and an integrating and sending function of integrating the frame image data items selected by the frame selecting function into a single stream and sending the integrated single stream.

Such a program can be stored in advance in an HDD as a storage medium built in an instrument such as a computer apparatus, a ROM in a microcomputer having a CPU, or the like. Alternatively, the program can be temporarily or permanently retained (stored) in a removable storage medium such as a semiconductor memory, a memory card, an optical disc, a magneto-optical disk, or a magnetic disk. Furthermore, such a removable storage medium can be provided as so-called package software.

In addition, such a program not only can be installed from a removable storage medium into a personal computer or the like, but also can be downloaded from a download site via a network such as a LAN or the Internet.

10. PRESENT TECHNOLOGY

Note that the present technology can be also configured as described below.

(1)
An image transfer apparatus including:
a frame selecting unit that uses a vertical synchronization signal input from a particular imaging apparatus among a plurality of imaging apparatuses that capture moving images as a reference to select frame image data items from moving image data input from the plurality of imaging apparatuses; and an integrating and sending unit that integrates the frame image data items selected by the frame selecting unit into a single stream and sending the integrated single stream.

(2)
The image transfer apparatus according to (1) above, in which
the frame selecting unit selects one of the frame image data items from the moving image data of another imaging apparatus among the imaging apparatuses excluding the particular imaging apparatus, on the basis of an exposure start timing difference with respect to reference frame image data, which is one of the frame image data items selected from the moving image data of the particular imaging apparatus.

(3)
The image transfer apparatus according to (2) above, in which
the frame selecting unit selects a frame image data item whose exposure start timing is closer to the exposure start timing of the reference frame image data, from among two frame image data items of the moving image data of the another imaging apparatus, of which frame periods overlap with the frame period of the reference frame image data.

(4)
The image transfer apparatus according to (3) above, in which
the frame selecting unit determines whether or not an exposure start timing difference with respect to the reference frame image data is less than a half frame period, for one frame image data item among the two frame image data items of which the frame periods overlap with the frame period of the reference frame image data, selects the one frame image data item when the exposure start timing difference is less than the half frame period, and selects the other frame image data item when the exposure start timing difference is not less than the half frame period.

(5)
The image transfer apparatus according to (1) above, in which
the frame selecting unit selects one of the frame image data items from the moving image data of another imaging apparatus among the imaging apparatuses excluding the particular imaging apparatus, on the basis of a timing difference between an exposure end timing of reference frame image data, which is one of the frame image data items selected from the moving image data of the particular imaging apparatus, and an exposure start timing of the one of the frame image data items of the moving image data of the another imaging apparatus.

(6) The image transfer apparatus according to any one of (1) to (5) above, in which
the frame selecting unit performs the selection for each frame of the moving image data of the particular imaging apparatus.

(7)
The image transfer apparatus according to any one of (1) to (5) above, in which
the frame selecting unit performs the selection at a time interval longer than one frame period of the moving image data of the particular imaging apparatus.

(8)
The image transfer apparatus according to any one of (1) to (7) above, in which
the frame selecting units has a switching function for the particular imaging apparatus.

(9)
The image transfer apparatus according to (8) above, in which
the frame selecting unit switches the particular imaging apparatus on the basis of operation input information.

(10)
The image transfer apparatus according to (8) above, in which
the frame selecting unit switches the particular imaging apparatus on the basis of an amount of motion in the moving image data input from each of the imaging apparatuses.

(11)
The image transfer apparatus according to any one of (8) to (10) above, in which
the frame selecting unit:
outputs the vertical synchronization signal of the particular imaging apparatus to the integrating and sending unit as a reference vertical synchronization signal; and
when switching the particular imaging apparatus, switches the vertical synchronization signal to be output as the reference vertical synchronization signal such that a vertical synchronization occurrence timing immediately after the switching by the vertical synchronization signal of an imaging apparatus as a switching source is not mixed as the vertical synchronization occurrence timing represented by the reference vertical synchronization signal.

(12)
The image transfer apparatus according to any one of (1) to (11) above, in which
the integrating and sending unit integrates the frame image data items selected by the frame selecting unit into one piece of image data to send.

(13)
The image transfer apparatus according to any one of (1) to (11) above, in which
the integrating and sending unit integrates the frame image data items selected by the frame selecting unit in a time axis direction to send.

(14)
The image transfer apparatus according to (13) above, in which
the integrating and sending unit adds delimiter information representing a delimiter per unit of integration of the frame image data items to stream data as the single stream.

REFERENCE SIGNS LIST 1, 1A, 1B Image transfer apparatus
2-1 to 2-4 Imaging apparatus
3 Network
4, 4A Composite video generating apparatus
11-1 to 11-4 First communication I/F to fourth communication I/F
12-1 to 12-4 First frame buffer to fourth frame buffer
12a to 12d Buffer area
13 Integrating unit
14, 14A Encoding unit
15 Network I/F
18 Operation unit
19, 19A Frame selecting unit
41 Network I/F
42, 42A First decoding unit
43 Memory
44, 44A Stitch processing unit
55 Integration control part
56 Motion amount detecting part
100 Moving image generating system

The invention claimed is:

1. An image processing apparatus, comprising:
circuitry configured to:
select a frame image data item, as a selected non-reference frame image data item, from non-reference moving image data input from a non-reference imaging apparatus based on a difference between an exposure start timing of a reference frame image data item of reference moving image data input from a reference imaging apparatus and each of an exposure start timing of non-reference frame image data items of the non-reference moving image data; and
integrate the reference frame image data item and the selected non-reference frame image data item into a single stream.

2. The image processing apparatus according to claim 1, wherein
the circuitry is further configured to select the frame image data item from two frame image data items of the non-reference frame image data items,
an exposure start timing of the frame image data item is closer to the exposure start timing of the reference frame image data, with respect to an exposure start timing of other frame image data item of the two frame image data items, and
a frame period of each of the two frame image data items of the non-reference frame image data items overlaps with a frame period of the reference frame image data.

3. The image processing apparatus according to claim 2, wherein the circuitry is further configured to:
determine whether a difference between an exposure start timing of one frame image data item of the two frame image data items and the exposure start timing of the reference frame image data is less than a half frame period;
select the one frame image data item when the difference between the exposure start timing of the one frame image data item of the two frame image data items and the exposure start timing of the reference frame image data is less than the half frame period; and
select, from the two frame image data items, a frame image data item other than the one frame image data item when the difference between the exposure start timing of the one frame image data item of the two frame image data items and the exposure start timing of the reference frame image data is not less than the half frame period.

4. The image processing apparatus according to claim 1, wherein the circuitry is further configured to select each frame of the reference moving image data of the reference imaging apparatus.

5. The image processing apparatus according to claim 1, wherein the circuitry is further configured to select the frame image data item, at a time interval longer than one frame period of the reference moving image data of the reference imaging apparatus.

6. The image processing apparatus according to claim 1, wherein the circuitry is further configured to switch the reference imaging apparatus.

7. The image processing apparatus according to claim 6, wherein the circuitry is further configured to switch the reference imaging apparatus based on an amount of motion in each of the non-reference moving image data and the reference moving image data.

8. The image processing apparatus according to claim 6, wherein
the circuitry is further configured to:
output a vertical synchronization signal of the reference imaging apparatus as a reference vertical synchronization signal; and
switch the vertical synchronization signal based on the switch of the reference imaging apparatus, wherein the switched vertical synchronization signal is output as the reference vertical synchronization signal, and
a vertical synchronization occurrence timing after the switch of the vertical synchronization signal is not mixed as a vertical synchronization occurrence timing represented by the reference vertical synchronization signal.

9. The image processing apparatus according to claim 1, wherein the circuitry is further configured to integrate the reference frame image data item and the selected non-reference frame image data item into one piece of image data.

10. The image processing apparatus according to claim 1, wherein the circuitry is further configured to integrate the reference frame image data item and the selected non-reference frame image data item in a time axis direction.

11. The image processing apparatus according to claim 1, wherein the circuitry further configured to transmit the single stream.

12. The image processing apparatus according to claim 1, wherein the integrated single stream represents a panoramic image.

13. The image processing apparatus according to claim 1, wherein the circuitry further configured to detect the difference based on a vertical synchronization occurrence timing.

14. An image processing method, comprising:
selecting a frame image data item, as a selected non-reference frame image data item, from non-reference moving image data input from a non-reference imaging apparatus based on a difference between an exposure start timing of a reference frame image data item of reference moving image data input from a reference imaging apparatus and each of an exposure start timing of non-reference frame image data items of the non-reference moving image data; and
integrating the reference frame image data item and the selected non-reference frame image data item into a single stream.

15. A non-transitory computer-readable medium having stored thereon computer-executable instructions that, when executed by a processor of an information processing apparatus, cause the processor to execute operations, the operations comprising:

selecting a frame image data item, as a selected non-reference frame image data item, from non-reference moving image data input from a non-reference imaging apparatus based on a difference between an exposure start timing of a reference frame image data item of reference moving image data input from a reference imaging apparatus and each of an exposure start timing of non-reference frame image data items of the non-reference moving image data; and integrating the reference frame image data item and the selected non-reference frame image data item into a single stream.

16. An image processing apparatus, comprising:
circuitry configured to:

select a frame image data item, as a selected non-reference frame image data item, from non-reference moving image data input from a non-reference imaging apparatus based on a difference between an exposure end timing of a reference frame image data item of reference moving image data input from a reference imaging apparatus and each of an exposure start timing of non-reference frame image data items of the non-reference moving image data, and integrate the reference frame image data item and the selected non-reference frame image data item into a single stream.

17. The image processing apparatus according to claim 16, wherein a vertical synchronization occurrence timing is in a frame period subsequent to a frame period of the reference moving image data.

18. The image processing apparatus according to claim 17, wherein a vertical synchronization occurrence timing of the frame image data item is closest to the vertical synchronization occurrence timing of the reference frame image data.

19. The image processing apparatus according to claim 17, wherein the circuitry further configured to transmit the single stream.

20. The image processing apparatus according to claim 17, wherein the integrated single stream represents a panoramic image.

21. The image processing apparatus according to claim 17, wherein the circuitry further configured to detect the difference based on a vertical synchronization occurrence timing.

* * * * *